United States Patent
Ihara et al.

(10) Patent No.: US 11,935,212 B2
(45) Date of Patent: Mar. 19, 2024

(54) IMAGE PROCESSING APPARATUS AND METHOD

(71) Applicant: SONY GROUP CORPORATION, Tokyo (JP)

(72) Inventors: Toshinori Ihara, Tokyo (JP); Takefumi Nagumo, Tokyo (JP); Makoto Daido, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 346 days.

(21) Appl. No.: 17/309,404

(22) PCT Filed: Nov. 21, 2019

(86) PCT No.: PCT/JP2019/045558
§ 371 (c)(1),
(2) Date: May 25, 2021

(87) PCT Pub. No.: WO2020/116178
PCT Pub. Date: Jun. 11, 2020

(65) Prior Publication Data
US 2022/0028040 A1 Jan. 27, 2022

(30) Foreign Application Priority Data
Dec. 5, 2018 (JP) .................. 2018-228312

(51) Int. Cl.
*G06T 9/00* (2006.01)
*G06T 5/00* (2006.01)
*G06T 7/90* (2017.01)

(52) U.S. Cl.
CPC ............... *G06T 5/001* (2013.01); *G06T 7/90* (2017.01); *G06T 9/00* (2013.01); *G06T 2207/20224* (2013.01)

(58) Field of Classification Search
CPC .. G06T 5/001; G06T 7/90; G06T 9/00; G06T 2207/20224; H04N 19/11; H04N 19/136;
(Continued)

(56) References Cited

U.S. PATENT DOCUMENTS 10,743,023 B2 * 8/2020 Morigami ............... H04N 19/80
2007/0242896 A1 * 10/2007 Okumichi ............... H04N 19/86
382/268
(Continued)

FOREIGN PATENT DOCUMENTS

CN 106231158 A 12/2016
EP 3510444 A1 7/2019
(Continued)

OTHER PUBLICATIONS

JP2019161577 translation (Year: 2019).*
(Continued)

*Primary Examiner* — Carol Wang
(74) *Attorney, Agent, or Firm* — CHIP LAW GROUP

(57) ABSTRACT

The present disclosure relates to an image processing apparatus and method that make it possible to suppress increase of a prediction error. Image data is encoded by a method according to a type of pixel. For example, image data is encoded by a method according to whether the pixel is an image plane phase difference detection pixel or a normal pixel. Further, encoded data of image data is decoded by a method according to a type of pixel. For example, encoded data is decoded by a method according to whether the image is an image plane phase difference detection pixel or a normal pixel. The present technology can be applied, for example, to an image processing apparatus, an image encoding apparatus, an image decoding apparatus, an imaging device, an imaging apparatus, or the like.

18 Claims, 40 Drawing Sheets

(58) Field of Classification Search
CPC .. H04N 19/593; H04N 19/182; H04N 19/186; H04N 23/00; H04N 23/60
See application file for complete search history.

(56) References Cited

U.S. PATENT DOCUMENTS

| | | | | |
|---|---|---|---|---|
| 2016/0360136 | A1* | 12/2016 | Katagawa | H04N 19/146 |
| 2020/0396381 | A1* | 12/2020 | Ihara | H04N 23/80 |
| 2022/0337865 | A1* | 10/2022 | Kondo | H04N 19/139 |
| 2022/0417499 | A1* | 12/2022 | Katsumata | H04N 19/587 |

FOREIGN PATENT DOCUMENTS

| | | | |
|---|---|---|---|
| JP | 2010-266517 A | | 11/2010 |
| JP | 2014-145867 A | | 8/2014 |
| JP | 2016-225897 A | | 12/2016 |
| JP | 2017-220828 A | | 12/2017 |
| JP | 2018-040929 A | | 3/2018 |
| JP | 2019161577 A | * | 9/2019 |
| WO | 2018/047632 A1 | | 3/2018 |

OTHER PUBLICATIONS

International Search Report and Written Opinion of PCT Application No. PCT/JP2019/045558, dated Feb. 4, 2020, 10 pages of ISRWO.

* cited by examiner

FIG. 2

| | ENCODING-DECODING METHOD CONTROL ACCORDING TO TYPE OF PIXEL (IMAGE PLANE PHASE DIFFERENCE DETECTION PIXEL, NORMAL PIXEL) TO BE USED FOR COMPRESSION |
|---|---|
| METHOD 1 | CORRECTION, REVERSE CORRECTION OF PIXEL VALUE OF IMAGE PLANE PHASE DIFFERENCE DETECTION PIXEL |
| METHOD 2 | SWITCHING OF PREDICTION METHOD (NORMAL PIXEL) |
| METHOD 2-1 | USE NEAREST SAME COLOR NORMAL PIXEL AS PREDICTION PIXEL |
| METHOD 2-2 | USE IMAGE PLANE PHASE DIFFERENCE DETECTION PIXEL OF ADJACENT SAME COLOR PIXEL WITH PIXEL VALUE CORRECTED AS PREDICTION PIXEL |
| METHOD 3 | SWITCHING OF PREDICTION METHOD (IMAGE PLANE PHASE DIFFERENCE DETECTION PIXEL) |
| METHOD 3-1 | USE NEAREST SAME COLOR IMAGE PLANE PHASE DIFFERENCE DETECTION PIXEL AS PREDICTION PIXEL |
| METHOD 3-2 | USE NORMAL PIXEL OF ADJACENT SAME COLOR PIXEL WITH PIXEL VALUE CORRECTED AS PREDICTION PIXEL |
| METHOD 4 | UTILIZATION OF ERROR INFORMATION (IMAGE PLANE PHASE DIFFERENCE DETECTION PROCESS) |
| METHOD 5 | COMBINATION OF METHOD 1 AND METHOD 4 |
| METHOD 6 | COMBINATION OF METHOD 2, METHOD 3, AND METHOD 4 |

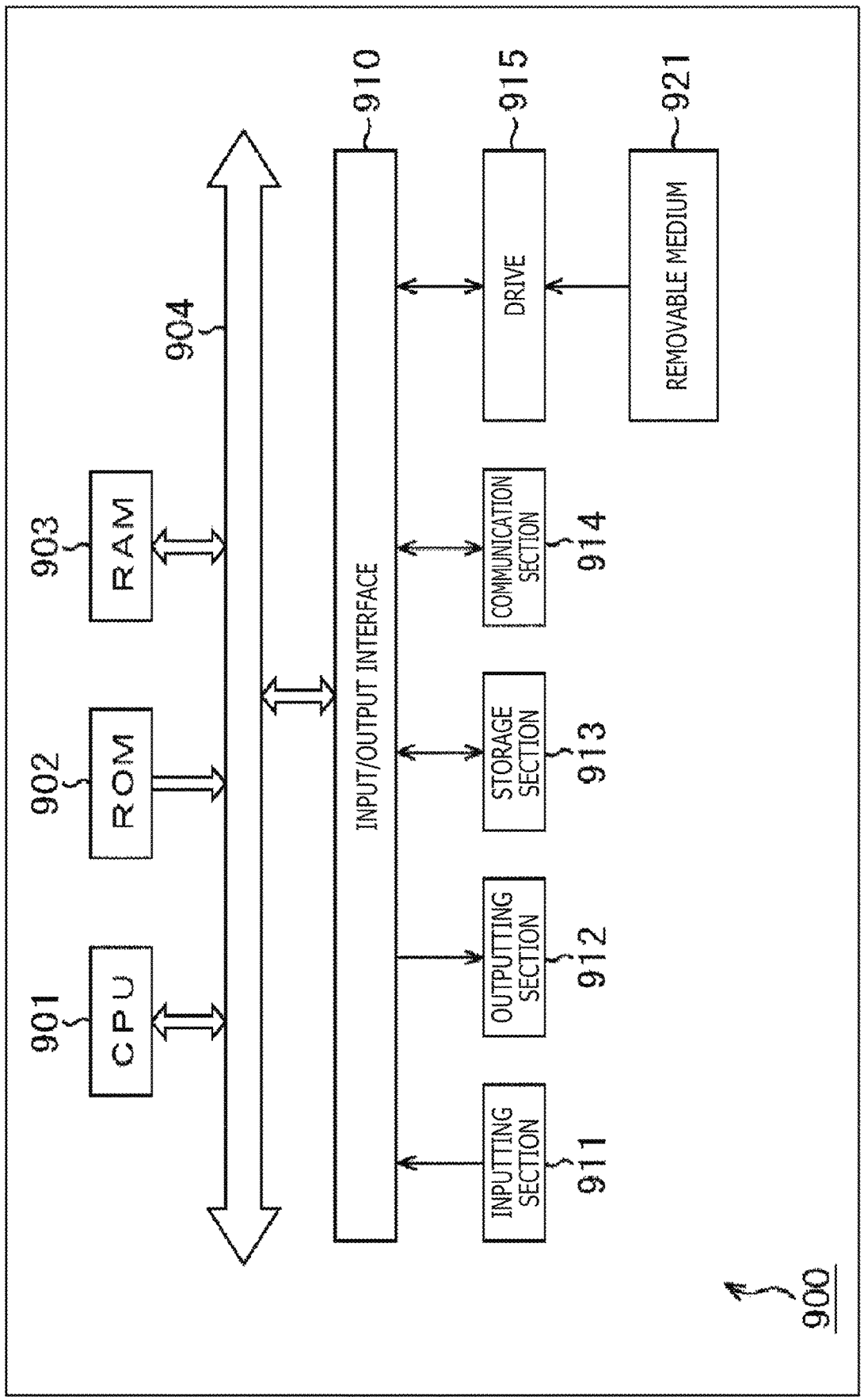

IMAGE PROCESSING APPARATUS AND METHOD

CROSS REFERENCE TO RELATED APPLICATIONS

This application is a U.S. National Phase of International Patent Application No. PCT/JP2019/045558 filed on Nov. 21, 2019, which claims priority benefit of Japanese Patent Application No. JP 2018-228312 filed in the Japan Patent Office on Dec. 5, 2018. Each of the above-referenced applications is hereby incorporated herein by reference in its entirety.

TECHNICAL FIELD

The present disclosure relates to an image processing apparatus and method, and particularly relates to an image processing apparatus and method that make it possible to suppress increase of a prediction error.

BACKGROUND ART

Conventionally, there has been proposed a method that performs phase difference detection, using a pixel value of an image plane phase difference detection pixel which is a pixel provided in an image sensor and is shaded at part thereof to control a focal distance (for example, refer to PTL 1).

CITATION LIST

Patent Literature

[PTL 1]
JP 2014-145867A

SUMMARY

Technical Problems

However, the pixel value of such an image plane phase difference detection pixel is much different in value from pixel values of other normal pixels because the image plane phase difference detection pixel is shaded at part thereof. Therefore, when such an image plane phase difference detection pixel is set as a prediction pixel for a normal pixel upon encoding or decoding, there has been a risk that a prediction error may increase. Further, also as with a case where a prediction value of a normal pixel is set as the prediction value of the image plane phase difference detection pixel, there has been the risk that a prediction error may increase.

The present disclosure has been made in view of such a situation and makes it possible to suppress increase of a prediction error.

Solution to Problems

An image processing apparatus of an aspect of the present technology is an image processing apparatus including an encoding section configured to encode image data by a method according to a type of pixel.

An image processing method of an aspect of the present technology is an image processing method including encoding image data by a method according to a type of pixel.

An image processing apparatus of another aspect of the present technology is an image processing apparatus including a decoding section configured to decode encoded data of image data by a method according to a type of pixel.

An image processing method of the other aspect of the present technology is an image processing method including decoding encoded data of image data by a method according to a type of pixel.

In the image processing apparatus and method of the aspect of the present technology, image data is encoded by a method according to a type of pixel.

In the image processing apparatus and method of the other aspect of the present technology, encoded data of image data is decoded by a method according to a type of pixel.

BRIEF DESCRIPTION OF DRAWINGS

FIG. 2 is a view depicting a list of encoding and decoding methods to which the present technology is applied.
FIG. 23 is a view illustrating a method 3-2.

FIG. 33 is a view illustrating error information.

FIG. 40 is a block diagram depicting an example of principal components of a computer.

DESCRIPTION OF EMBODIMENTS

In the following, modes for carrying out the present disclosure (hereinafter referred to as embodiments) are described. It is to be noted that description is given in the following order.

1. Prediction in Pixel Array Including Image Plane Phase Difference Detection Pixel
2. Concept
3. First Embodiment (Details of Method 1)
4. Second Embodiment (Details of Method 2)
5. Third Embodiment (Details of Method 3)
6. Fourth Embodiment (Details of Method 4)
7. Fifth Embodiment (Imaging Apparatus, Stacked Image Sensor)
8. Appendix 1. Prediction in Pixel Array Including Image Plane Phase Difference Detection Pixel <Documents etc. which Support Technical Contents and Technical Terms>

The scope disclosed by the present technology not only includes contents described in the description of the embodiments but also includes the contents described in the following documents that have been publicly known at the time of filing of the present application.

[PTL 2]
US 2011/0292247
[PTL 3]
US 2012/0219231
[PTL 4]
JP 2014-103543A

In short, also the contents described in the documents specified above is the basis of decision of the requirement of support in description.

<DPCM Encoding>

Conventionally, there has been proposed a method that performs phase difference detection using a pixel value of an image plane phase difference detection pixel, which is a pixel provided in an image sensor and is shaded at part thereof to control a focal distance as described, for example, in PTL 1.

Further, for example, as described in PTL 2 to PTL 4, in order to achieve suppression of increase and so forth of a band used by an interface or a memory capacity, a method of compressing, at a time of transferring or recording of data of a captured image (also referred to as captured image data), the captured image data by encoding using DPCM (Differential Plus Code Modulation) has been devised. In DPCM encoding, a pixel value of a processing target pixel is predicted using pixel values of pixels positioned around the processing target pixel (such pixels are also referred to as peripheral pixels), and a difference from the prediction value (prediction error) is encoded to improve the encoding efficiency.

However, the pixel value of such an image plane phase difference detection pixel as described in Cited Document 1 is much different in value from pixel values of other normal pixels because the image plane phase difference detection pixel is shaded at part thereof. Therefore, if, upon encoding or decoding, such an image plane phase difference detection pixel is set as a prediction pixel of a normal pixel, there has been a risk that a prediction error may increase. Also, as with a case where a normal pixel is used for a prediction value of the image plane phase difference detection pixel, there has been the risk that a prediction error may increase.

Figure 1:
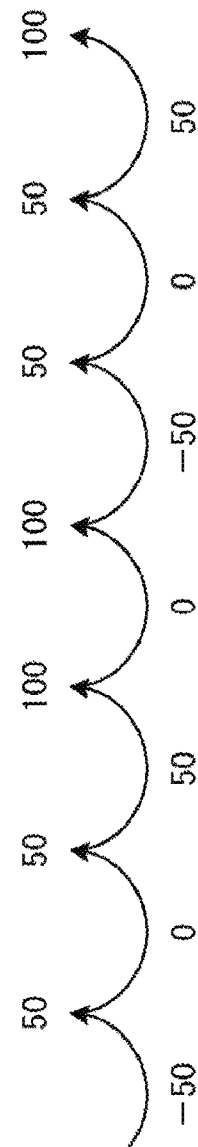
FIG. 1 is a view illustrating an example of a prediction method.

For example, in FIG. 1, pixel arrangement of (part of) one row of a pixel array including an image plane phase difference detection pixel. A plurality of squares indicates the pixel arrangement, and a square denoted by a character R indicates a pixel (R pixel) on which a color filter of red (R) is arranged, and a square denoted by a character G indicates a pixel (G pixel) on which a color filter of green (G) is arranged. Further, a square denoted by a character ZA indicates a right shaded pixel that is a pixel shaded at the right half thereof, and a square denoted by a character ZB indicates a left shaded pixel that is a pixel shaded at the left half thereof. The arrangement of the color filters is the Bayer array, and in FIG. 1, (part of) a row along which R pixels and G pixels are lined up.

For example, in a case of a flat region in which the pixel values are 100, since shading rates of the right shaded pixel and the left shaded pixel are 50%, the pixel values of them are (ideally) 50. Accordingly, when prediction is performed using adjacent pixels as prediction pixels, then the difference varies by a great amount as indicated in FIG. 1, and there has been the risk that a prediction error may increase. When the prediction error increases, in a case of variable length decoding, there has been a risk that encoding efficiency may decrease. In contrast, in a case of fixed length decoding, there has been a risk that picture quality of a decoded image may degrade.

2. Concept

<Prediction Method Control>

In view of this, as indicated at the highest stage of a table depicted in FIG. 2, encoding of image data and decoding of the encoded data of the image data are performed by a method according to a type of pixel to be used for compression.

For example, image data is encoded by a method according to a type of pixel. For example, an image processing apparatus includes an encoding section that encodes image data by a method according to a type of pixel.

By doing such a manner, it is possible to suppress, in prediction that is performed in encoding, the difference in pixel value by a difference in type of pixel. Accordingly, increase of the prediction error can be suppressed. Consequently, in the case of variable length encoding, decrease of the encoding efficiency can be suppressed. In addition, in the case of fixed length encoding, decrease of the picture quality of a decoded image can be suppressed.

Further, for example, encoded data of image data is decoded by a method according to the type of pixel. For example, an image processing apparatus includes a decoding section that decodes encoded data of image data by a method according to the type of pixel.

By doing such a manner, it is possible to suppress, in prediction that is performed in decoding, the difference in pixel value by a difference in type of pixel. Accordingly, increase of the prediction error can be suppressed. Consequently, in the case of variable length decoding, decrease of the encoding efficiency can be suppressed. In addition, in the case of fixed length decoding, decrease of the picture quality of a decoded image can be suppressed.

For example, image data may be encoded or encoded data of the image data may be decoded by a method according to whether a pixel is an image plane phase difference detection pixel or a normal pixel. It is to be noted that the image plane phase difference detection pixel is a pixel for image plane phase difference detection that is a pixel that is shaded at part thereof, and the normal pixel is a pixel for image generation, the pixel not being shaded at part thereof.

In addition, upon encoding and decoding, correction and reverse correction of a pixel value of an image plane phase difference detection pixel may be performed (method 1 of the table of FIG. 2). For example, in encoding, simplified correction may be performed for a pixel value of an image plane phase difference detection pixel in image data such that the image data in which the pixel value of the image plane phase difference detection pixel is simply corrected is encoded. Further, in decoding, the encoded data may be decoded to generate image data (difference from prediction values), and then, simplified correction may be performed for the pixel value of the image plane phase difference detection pixel of the generated image data (difference).

For example, in encoding, the simplified correction may be multiplication of the pixel value of the image plane phase difference detection pixel by a fixed value. Moreover, in decoding, the simplified correction may be division of the pixel value of the image plane phase difference detection pixel by the fixe value. Further, the fixed value may be a value according to a shading rate of the image plane phase difference detection pixel.

Further, upon encoding and decoding, in a case where the processing target pixel is a normal pixel, the prediction method may be switched depending on the type of the pixel (method 2 of the table of FIG. 2). For example, in encoding, in a case where the processing target pixel is a normal pixel, image data may be encoded using a prediction method according to whether an adjacent same color pixel is the image plane phase difference detection pixel. Moreover, in decoding, in a case where the processing target pixel is a normal pixel, encoded data may be decoded using a prediction method according to whether an adjacent same color pixel is the image plane phase difference detection pixel.

It is to be noted that the adjacent same color pixel indicates a (most adjacent) same color pixel positioned nearest to the processing target pixel. The same color pixel is a pixel (also referred to as peripheral pixel) in which a filter whose type is same as (or approximate to) that of the processing target pixel is provided and which is positioned around the processing target pixel. The type of filter indicates a wavelength range of light that passes through the filter. In particular, the same color pixel indicates a peripheral pixel having a wavelength range of light that coincides with or is approximate to that of the processing target pixel. For example, in a case of pixels in which RGB color filters are arranged, the same color pixel indicates a peripheral pixel in which a color filter whose color is same as that of the processing target pixel is arranged.

In the method 2 described above, the most adjacent same color normal pixel may be set as the prediction pixel (method 2-1 of the table of FIG. 2). It is to be noted that the same color normal pixel indicates a normal pixel in which a filter whose type is same as (or approximate to) that of the processing target pixel is arranged and which is located around the processing target pixel (namely, a same color pixel that is a normal pixel). For example, in encoding, prediction may be performed using a normal pixel at a position according to whether an adjacent same color pixel is an image plane phase difference detection pixel as the prediction pixel to derive a prediction value of the processing target pixel, and then, image data may be encoded using the prediction value. At this time, in a case where the adjacent same color pixel is an image plane phase difference detection pixel, the nearest same color normal pixel may be set as the prediction pixel.

Further, for example, in decoding, prediction may be performed using a normal pixel at a position according to whether an adjacent same color pixel is an image plane phase difference detection pixel as the prediction pixel to derive a prediction value of the processing target pixel, and then, the coded data may be decoded using the prediction value. At this time, in a case where the adjacent same color pixel is an image plane phase difference detection pixel, the nearest same color normal pixel may be set as the prediction pixel.

In the method 2 described above, a pixel value of an image plane phase difference detection pixel of an adjacent same color pixel may be corrected to be set as a prediction pixel (method 2-2 of the table of FIG. 2). For example, in encoding, in a case where an adjacent same color pixel is an image plane phase difference detection pixel, a value obtained by correcting the pixel value of the image plane phase difference detection pixel that is the adjacent same color pixel may be set as a prediction value, and then, image data may be encoded using the prediction value. At this time, a value obtained by multiplying the pixel value of the image plane phase difference detection pixel that is the adjacent same color pixel by a fixed value may be set as the prediction value. Further, the fixed value may be a value according to the shading rate of the image plane phase difference detection pixel that is the adjacent same color pixel.

Further, for example, in decoding, in a case where the adjacent same color pixel is an image plane phase difference detection pixel, a value obtained by correcting the pixel value of the image plane phase difference detection pixel that is the adjacent same color pixel may be set as the prediction value of the processing target pixel, and then, the prediction value may be used to decode the encoded data. At this time, a value obtained by multiplying the pixel value of the image plane phase difference detection pixel that is the adjacent same color pixel by a fixed value may be set as the prediction value. Further, the fixed value may be a value according to the shading rate of the image plane phase difference detection pixel that is the adjacent same color pixel.

Further, upon encoding and decoding, in a case where the processing target pixel is an image plane phase difference detection pixel, the prediction method may be switched according to the type of the pixel (method 3 of the table of FIG. 2). For example, in encoding, in a case where the processing target pixel is an image plane phase difference detection pixel, the image data may be encoded using a prediction method according to whether the adjacent same color pixel is a normal pixel. Moreover, in decoding, in a case where the processing target pixel is an image plane phase difference detection pixel, encoded data may be decoded using a prediction method according to whether the adjacent same color pixel is a normal pixel.

In the method 3 described above, the nearest same color image plane phase difference detection pixel may be set as the prediction pixel (method 3-1 of the table of FIG. 2). It is to be noted that the same color image plane phase difference detection pixel indicates an image plane phase difference detection pixel in which a filter whose type is same as (or proximate to) that of the processing target pixel is provided and which is located around the processing target pixel (in short, a same color pixel that is an image plane phase difference detection pixel). For example, in encoding, prediction may be performed using an image plane phase difference detection pixel at a position according to whether an adjacent same color pixel is a normal pixel as the prediction pixel to derive a prediction value of the processing target pixel, and then, the image data may be encoded using the prediction value. At this time, in a case where the adjacent same color pixel is a normal pixel, the nearest same color image plane phase difference detection pixel may be set as the prediction pixel.

Further, for example, in decoding, prediction may be performed using an image plane phase difference detection pixel at a position according to whether the adjacent same color pixel is a normal pixel as the prediction pixel to derive a prediction value of the processing target pixel, and then, the encoded data may be decoded using the prediction value. At this time, in a case where the adjacent same color pixel is a normal pixel, the nearest same color image plane phase difference detection pixel may be set as the prediction pixel.

In the method 3 described above, the pixel value of the normal pixel of the adjacent same color pixel may be corrected to be set as a prediction pixel (method 3-2 of the table of FIG. 2). For example, in encoding, in a case where the adjacent same color pixel is a normal pixel, a value obtained by correcting the pixel value of the normal pixel that is the adjacent same color pixel may be set as the prediction value of the processing target pixel, and then, the image data may be encoded, using the prediction value. At this time, a value obtained by multiplying the pixel value of the normal pixel that is the adjacent same color pixel by a fixed value may be set as the prediction value. It is to be noted that the fixed value may be a value according to the shading rate of the image plane phase difference detection pixel that is the processing target pixel.

In addition, for example, in decoding, in a case where the adjacent same color pixel is a normal pixel, a value obtained by correcting the pixel value of the normal pixel that is the adjacent same color pixel may be set as the prediction value of the processing target pixel, and then, encoded data is decoded using the prediction value. At this time, a value obtained by multiplying the pixel value of the normal pixel that is the adjacent same color pixel by a fixed value may be set as the prediction value. It is to be noted that the fixed value may be a value according to the shading rate of the image plane phase difference detection pixel that is the processing target pixel.

In the method 3 described above, in a case where the adjacent same color pixel is a normal pixel, prediction may be omitted (method 3-3). For example, in encoding, image data may be encoded without performing prediction of a processing target pixel the adjacent same color pixel of which is a normal pixel. Further, for example, in decoding, encoded data may be decoded without performing prediction of the processing target pixel the adjacent same color pixel of which is a normal pixel.

In addition, upon decoding, a phase difference may be detected utilizing error information regarding encoding or decoding (method 4 of the table of FIG. 2). For example, phase difference detection of image data generated by decoding of encoded data may be performed on the basis of error information indicative of an error due to encoding and decoding of image data. At this time, reliability information indicative of a reliability degree of a result of the phase difference detection may be generated on the basis of the error information, and then, phase difference detection may be performed on the basis of the reliability information.

It is to be noted that this method 4 can be applied in combination, for example, with the method 1 (method 5 of the table of FIG. 2). Further, this method 4 can be applied, for example, in combination with any one of the method 2 or the method 3 or both of them (method 6 of the table of FIG. 2).

Further, encoding may be performed by such a process as to quantize image data, perform prediction, derive a difference between a pixel value of the quantized image data and a prediction value, perform variable length encoding on the derived difference, generate encoded data, and adjust the code amount of the generated encoded data. Further, decoding may be performed by such a process as to perform, for encoded data, reverse adjustment for undoing the adjustment of the code amount performed upon encoding, perform variable length decoding on the encoded data whose code amount is reverse-adjusted, generate a difference between a pixel value of the quantized image data and a predetermined value, perform prediction, add the prediction value to the generated difference to generate quantized image data, and dequantize the generated dequantized image data.

By such methods as described above, the difference in pixel value between a normal pixel and an image plane phase difference detection pixel can be suppressed. Accordingly, increase of the prediction error in encoding and decoding can be suppressed.

3. First Embodiment

<Method 1>

In the present embodiment, the "method 1" is described. In this method 1, as in an example depicted in FIG. 3, encoding is performed after simplified correction is performed for image data. As the simplified correction, a pixel value of an image plane phase difference detection pixel is multiplied by a predetermined value (fixed value), and then, prediction is performed. For example, this fixed value is assumed to be a value according to the shading rate of the image plane phase difference detection pixel. The example of FIG. 3 corresponds to the example of FIG. 1. In particular, since the shading rate of the image plane phase difference detection pixel is 50%, the fixed value is "2." In short, the pixel value of the image plane phase difference detection pixel is corrected to twice. By doing such a manner, ideally, both of the pixel values of the image plane phase difference detection pixel and a normal pixel become 100 as in the example of FIG. 3. Accordingly, in a case where prediction is performed using an adjacent same color pixel of a processing target pixel as a prediction pixel, all of the prediction errors become 0. Since the difference in pixel value between any normal pixel and the image plane phase difference detection pixel decreases in this manner, increase of the prediction error can be suppressed.

<Image Processing Apparatus>

Figure 4:
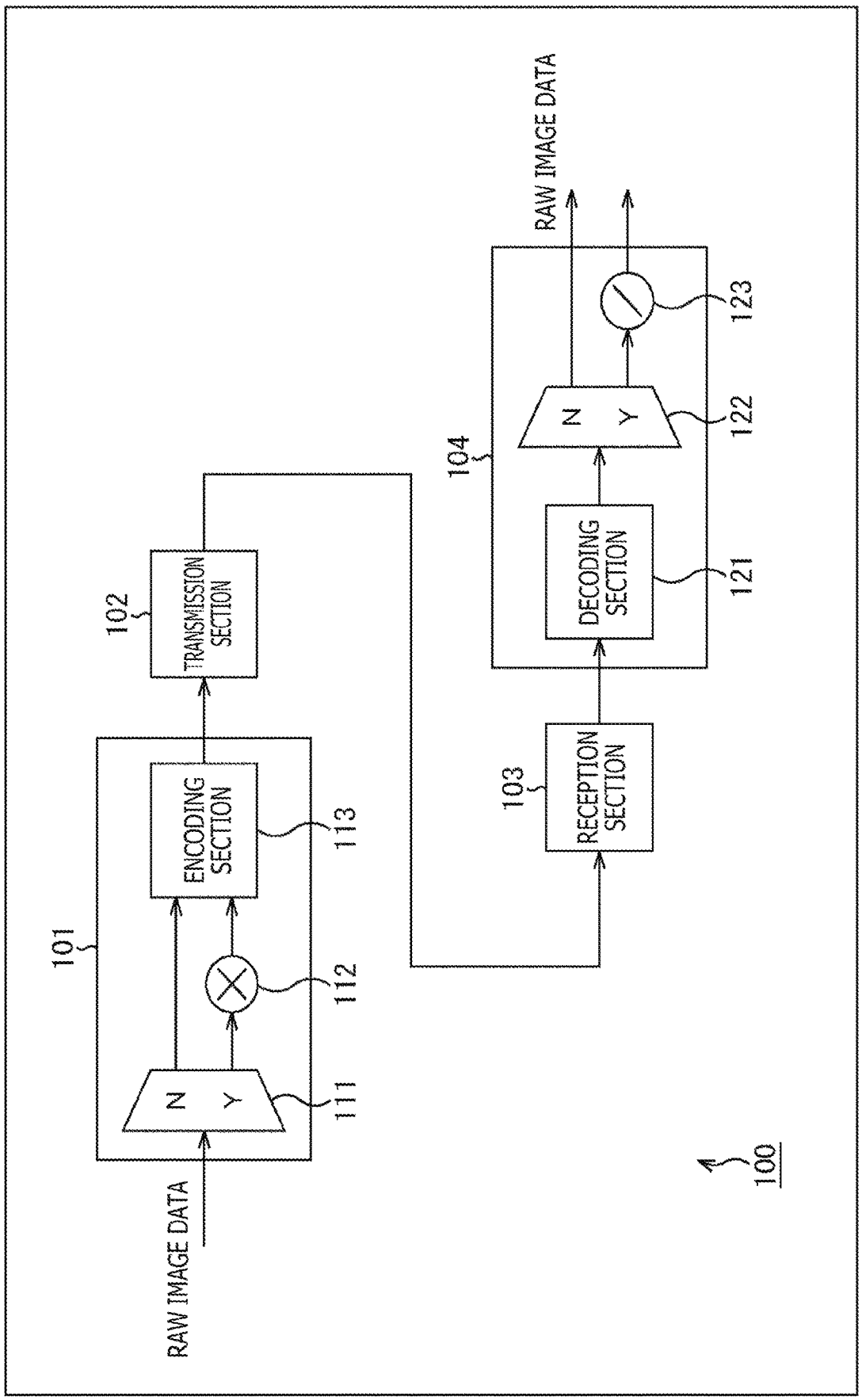
FIG. 4 is a block diagram depicting an example of principal components of an image processing apparatus that implements the method 1.

FIG. 4 is a block diagram depicting an example of principal components of an image processing apparatus that implements such a method 1. The image processing apparatus 100 depicted in FIG. 4 encodes image data inputted thereto to generate encoded data and further decodes the encoded data to generate captured image data to be output. As depicted in FIG. 4, the image processing apparatus 100 includes an encoding section 101, a transmission section 102, a reception section 103, and a decoding section 104.

The encoding section 101 encodes inputted image data to generate encoded data of the inputted image data. Thereupon, the encoding section 101 encodes the image data by a method according to a type of pixel. For example, the encoding section 101 encodes the image data by a method according to whether the processing target pixel is an image plane phase difference detection pixel or a normal pixel. Accordingly, the encoding section 101 can reduce the difference between pixel values of the image plane phase difference detection pixel and the normal pixel and can suppress increase of the prediction error.

Then, the encoding section 101 supplies the encoded data to the transmission section 102. The transmission section 102 transmits the encoded data supplied from the encoding section 101 to the reception section 103. The reception section 103 receives the encoded data and supplies the encoded data to the decoding section 104.

When the decoding section 104 receives the encoded data supplied from the reception section 103, it decodes the encoded data to generate (restore) image data. At this time, the decoding section 104 decodes the encoded data of the image data by a method according to the type of pixel. For example, the decoding section 104 decodes the encoded data by a method according to whether the processing target pixel is an image plane phase difference detection pixel or a normal pixel. Accordingly, the decoding section 104 can correctly decode the encoded data which has been subjected to encoding in such a manner as to reduce the difference in pixel value between the image plane phase difference detection pixel and the normal pixels and can implement suppression of increase of the prediction error.

The decoding section 104 outputs the generated (restored) image data to the outside of the image processing apparatus 100. Since the image data is transferred as encoded data from the transmission section 102 to the reception section 103 in this manner, increase of a frequency bandwidth necessary for data transfer between the transmission section 102 and the reception section 103 can be suppressed. Accordingly, increase of a delay amount and costs can be suppressed.

The encoding section 101 performs simplified correction for the pixel value of the image plane phase difference detection pixel of the image data and encodes the image data in which the pixel value of the image plane phase difference detection pixel has been subjected to the simplified correction. As depicted in FIG. 4, the encoding section 101 includes a pixel type decision section 111, a multiplication section 112, and an encoding section 113. The pixel type decision section 111 decides, for each pixel value of image data inputted thereto, a type of pixel (for example, whether the pixel is a normal pixel or an image plane phase difference detection pixel). Then, the pixel type decision section 111 supplies pixel values of normal pixels on the basis of a result of the decision to the encoding section 113 and supplies the pixel value of the image plane phase difference detection pixel to the multiplication section 112.

The multiplication section 112 multiplies the pixel value supplied from the pixel type decision section 111 by a predetermined value (fixed value) as the simplified correction. This fixed value is, for example, assumed to be a value according to the shading rate of the image plane phase difference detection pixel. The multiplication section 112 supplies the pixel value multiplied by the fixed value to the encoding section 113.

The encoding section 113 encodes the image data (pixel values) supplied thereto to generate encoded data. At this time, the encoding section 113 performs prediction using a peripheral pixel of the processing target pixel and encodes the difference from the prediction value. The encoding section 113 supplies the generated encoded data to the transmission section 102 so as to be transmitted.

In particular, the image data is supplied in a state in which only the pixel value of the image plane phase difference detection pixel is multiplied by the fixed value (namely, in a simplified correction state) to the encoding section 113.

Figure 3:
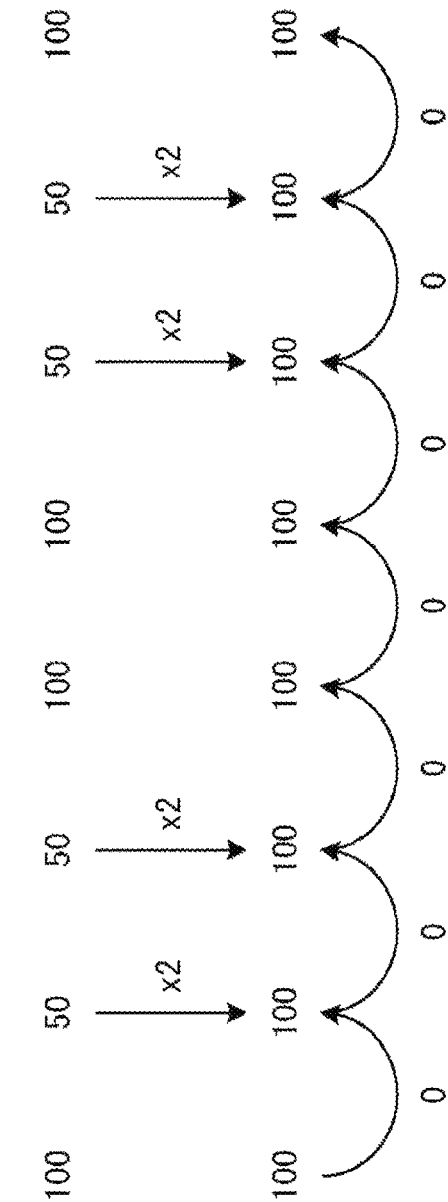
FIG. 3 is a view illustrating a method 1.

Accordingly, the image data is in a state in which the difference in pixel value between the image plane phase difference detection pixel and a normal pixel is reduced as in the example of FIG. 3. Accordingly, the encoding section 113 can suppress increase of the prediction error in prediction.

The decoding section 104 decodes the encoded data to generate image data and performs simplified correction (reverse simplified correction) for the pixel value of the image plane phase difference detection pixel of the generated image data. As depicted in FIG. 4, the decoding section 104 includes a decoding section 121, a pixel type decision section 122, and a division section 123. The decoding section 121 decodes the encoded data supplied thereto by a method corresponding to the encoding method of the encoding section 113. At this time, the decoding section 121 decodes the encoded data, derives a difference between the image data and a prediction value, and further performs prediction using a peripheral pixel of the processing target pixel and adds the prediction value to the derives difference to generate (restore) image data. The decoding section 121 supplies the generated image data to the pixel type decision section 122.

The pixel type decision section 122 decides the type of pixel (for example, whether the pixel is a normal pixel or an image plane phase difference detection pixel) for each pixel value of the image data supplied from the decoding section 121. Then, the pixel type decision section 122 supplies the pixel value of the image plane phase difference detection pixel on the basis of a result of the decision to the division section 123.

The division section 123 divides the pixel value of the image plane phase difference detection pixel supplied from the pixel type decision section 122 by a predetermined value (fixed value) as the reverse simplified correction. This fixed value is same as the value multiplied by the multiplication section 112. In short, the fixed value is, for example, assumed to be a value according to the shading rate of the image plane phase difference detection pixel. By doing such a manner, the division section 123 can perform a reverse process to that of the multiplication section 112. For example, in the example of FIG. 3, the pixel value of the image plane phase difference detection pixel that is doubled by a process of the multiplication section 112 and is thereby changed from 50 to 100 is multiplied by ½ by a process of the division section 123 and is thereby returned to 50.

In short, reverse simplified correction (reverse process to simplified correction) is performed to restore image data. Pixel values of the normal pixels decided by the pixel type decision section 122 and the pixel value of the phase detection pixel divided by the division section 123 are outputted as the restored image data to the outside of the image processing apparatus 100. Accordingly, the decoding section 104 can correctly decode the encoded data generated by the encoding section 101. In short, the decoding section 104 can suppress increase of the prediction error.

<Supplement>

It is to be noted that generally the shading rates of pixels are not fixed among the pixels. For example, even if the pixels are produced at the shading rate of 50%, there is the possibility that a dispersion of approximately ±several percent may occur. In actual devices, the shading rate of each pixel is measured and therefore is known before shipment.

The fixed value used in the multiplication section 112 and the division section 123 may be set on the basis of the measurement value, or the same value may be used for all shading pixels for the sake of simplification.

Basically, it is sufficient if a reciprocal to the shading rate (in a case where the shading rate 50%=½, 2) is set as the fixed value. For example, in a case of the shading rate 50%, assuming that a pixel whose shading rate is lower than 50% exists due to a dispersion, the fixed value may be set to a value a little smaller than 2 (for example, 1.875=15/8).

<Flow of Encoding Process>

Figure 5:
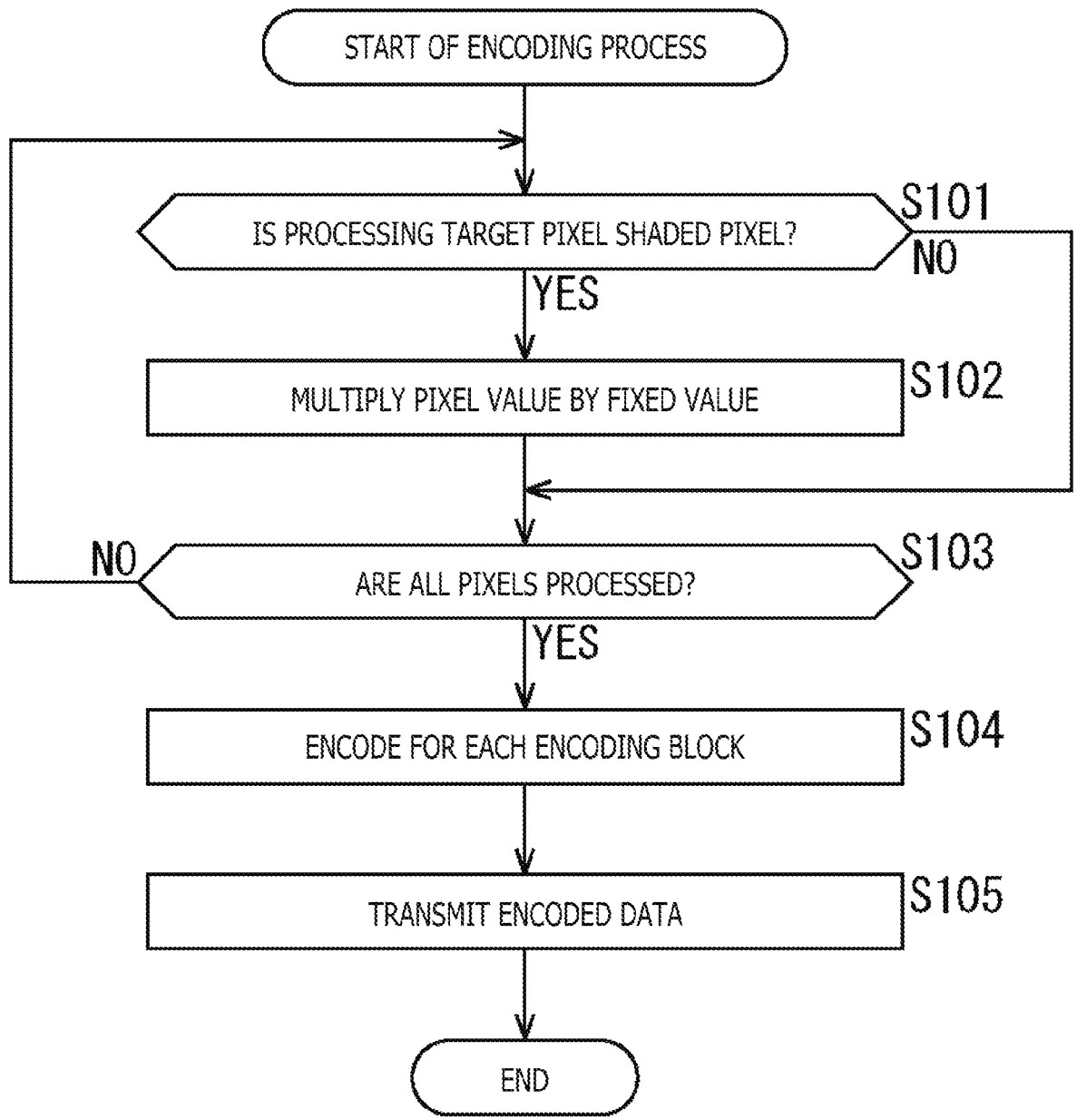
FIG. 5 is a flow chart illustrating an example of a flow of an encoding process.

An example of a flow of an encoding process executed by the image processing apparatus 100 in this case is described with reference to a flow chart of FIG. 5.

After an encoding process is started, the pixel type decision section 111 decides whether or not the processing target pixel is a shaded pixel (namely, an image plane phase difference detection pixel) in step S101. In a case where it is decided that the processing target pixel is a shaded pixel (image plane phase difference detection pixel), the processing advances to step S102.

In step S102, the multiplication section 112 multiplies the pixel value of the processing target pixel by a fixed value according to the shading rate. After the process in step S102 ends, the processing advances to step S103. Conversely, in a case where it is decided in step S101 that the processing target pixel is a normal pixel, the processing advances to step S103.

In step S103, the pixel type decision section 111 decides whether or not all pixels of the image data have been processed. In a case where it is decided that a pixel (pixel value) that has not been processed yet exists, the processing returns to step S101 to repeat the processes in the steps beginning with step S101. Then, in a case where it is decided in step S103 that all pixels have been processed, the processing advances to step S104.

After simplified correction is performed in such a manner as described above, in step S104, the encoding section 113 encodes the image data for which the simplified correction has been performed for each encoded block to generate encoded data. At this time, the encoding section 113 encodes the image data by an encoding method to which a prediction method of predicting the processing target pixel, using its peripheral pixel, is applied.

In step S105, the transmission section 102 transmits the encoded data generated in step S104. After the process in step S105 ends, the encoding process ends.

By performing the encoding process in this manner, the image data is simply corrected and encoded, and therefore, the difference between pixel values of an image plane phase difference detection pixel and a normal pixel is decreased as in the example of FIG. 3, and increase of the prediction error can be suppressed.

<Flow of Decoding Process>

Figure 6:
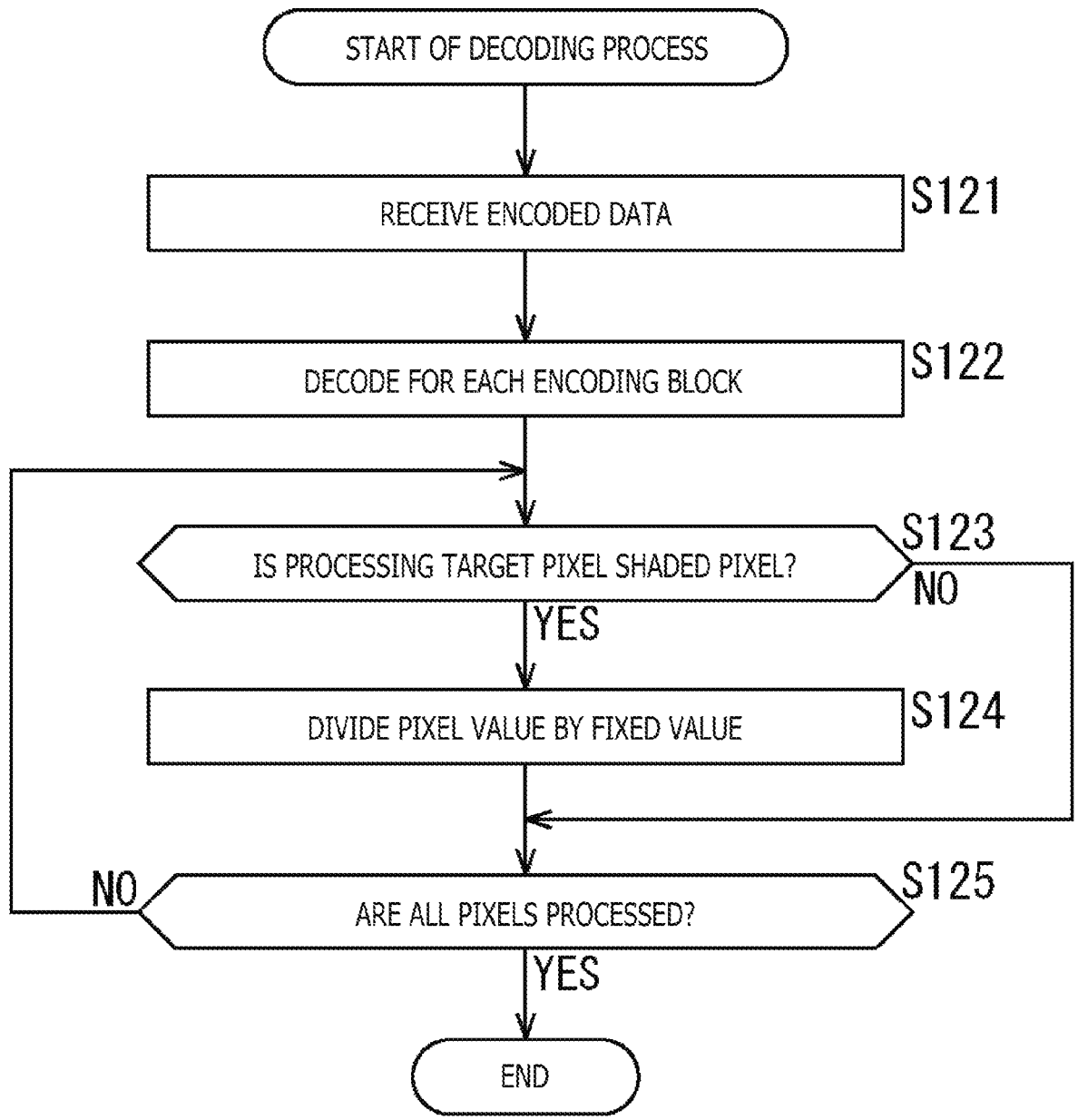
FIG. 6 is a flow chart illustrating an example of a flow of a decoding process.

Now, an example of a flow of a decoding process executed by the image processing apparatus 100 in this case is described with reference to a flow chart of FIG. 6.

After a decoding process is started, in step S121, the reception section 103 receives encoded data transmitted from the transmission section 102.

In step S122, the decoding section 121 decodes the encoded data received in step S121 for each encoded block to generate image data (difference from a prediction value). At this time, the decoding section 121 decodes the encoded data by a decoding method to which the prediction method of predicting a processing target pixel using its peripheral pixel is applied.

Then, reverse simplified correction of the image data is performed. In step S123, the pixel type decision section 122 decides whether or not the processing target pixel is a shaded pixel (namely, an image plane phase difference detection pixel). In a case where it is decided that the processing target pixel is a shaded pixel (image plane phase difference detection pixel), the processing advances to step S124.

In step S124, the division section 123 divides the pixel value of the processing target pixel by a fixed value according to the shading rate. This fixed value corresponds to the fixed value used in the process in step S102 (for example, a same value). After the process in step S124 ends, the processing advances to step S125. Conversely, in a case where it is decided in step S123 that the processing target pixel is a normal pixel, the processing advances to step S125.

In step S125, the pixel type decision section 111 decides whether or not all pixels of the image data have been processed. In a case where it is decided that a pixel (pixel value) that has not been processed yet exists, the processing returns to step S123 to repeat the processes in the steps beginning with step S123. Then, in a case where it is decided in step S125 that all pixels have been processed, the decoding process ends.

By performing the decoding process in such a manner as described above, the encoded data generated by the encoding section 101 can be decoded correctly. Accordingly, increase of the prediction error can be suppressed.

4. Second Embodiment

<Method 2>

In the present embodiment, the "method 2" in a case where the processing target pixel is a normal pixel is described. In a case of this method 2, increase of the prediction error in encoding and decoding is suppressed by switching the prediction method.

For example, in a case where the processing target pixel is a normal pixel, image data is encoded, using a prediction method according to whether an adjacent same color pixel is an image plane phase difference detection pixel. Further, in a case where the processing target pixel is a normal pixel, encoded data is decoded, using a prediction method according to whether an adjacent same color pixel is an image plane phase difference detection pixel.

<4-1: Method 2-1>

Figure 7:
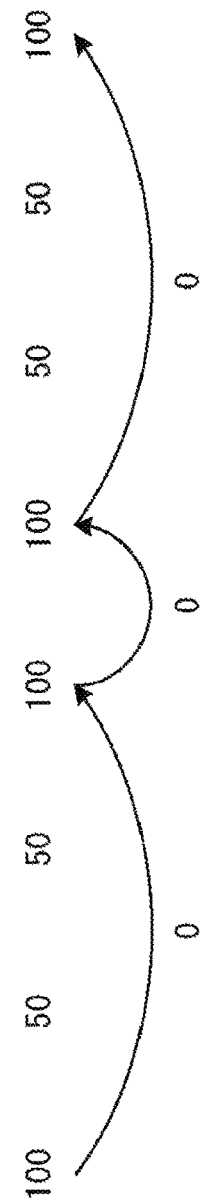
FIG. 7 is a view illustrating a method 2-1.

The method 2-1 is described with reference to FIG. 7. In the method 2-1, in a case where the processing target pixel is a normal image and the adjacent same color pixel is an image plane phase difference detection pixel, the nearest same color normal pixel is set as a prediction pixel. FIG. 7 is a view corresponding to FIG. 1.

For example, in a case where the eighth G pixel (normal pixel) from the left in FIG. 7 is set as a processing target pixel, the immediately preceding same color pixel (adjacent same color pixel) is the sixth left shaded pixel ZB from the left. In short, the adjacent same color pixel is an image plane phase difference detection pixel. Accordingly, this pixel is not set as a prediction pixel. The next adjacent same color pixel is the fourth right shaded pixel ZA from the left. In short, this is also an image plane phase difference detection pixel, and therefore, this is not set as a prediction pixel. The further next adjacent same color pixel is the second G pixel (normal pixel) from the left. In short, since this G pixel is the nearest adjacent same color pixel, prediction is performed, using this G pixel as a prediction pixel (using the pixel value of this G pixel as a prediction value). By doing such a manner, prediction of a normal pixel can be performed using a normal pixel, and therefore, increase of the prediction error can be suppressed more than an alternative case in which the left shaded pixel ZB that is an adjacent same color pixel is set as the prediction pixel as indicated by FIG. 7.

It is to be noted that, in a case where the tenth G pixel (normal pixel) from the left is set as a processing target pixel, the same color pixel on the straight line (adjacent same color pixel) is the eighth G pixel (normal pixel) from the left. In short, since this G pixel is the nearest same color normal pixel, prediction is performed, using this G pixel as a prediction pixel (using the pixel value of this G pixel as a prediction value).

<Image Processing Apparatus>

Figure 8:
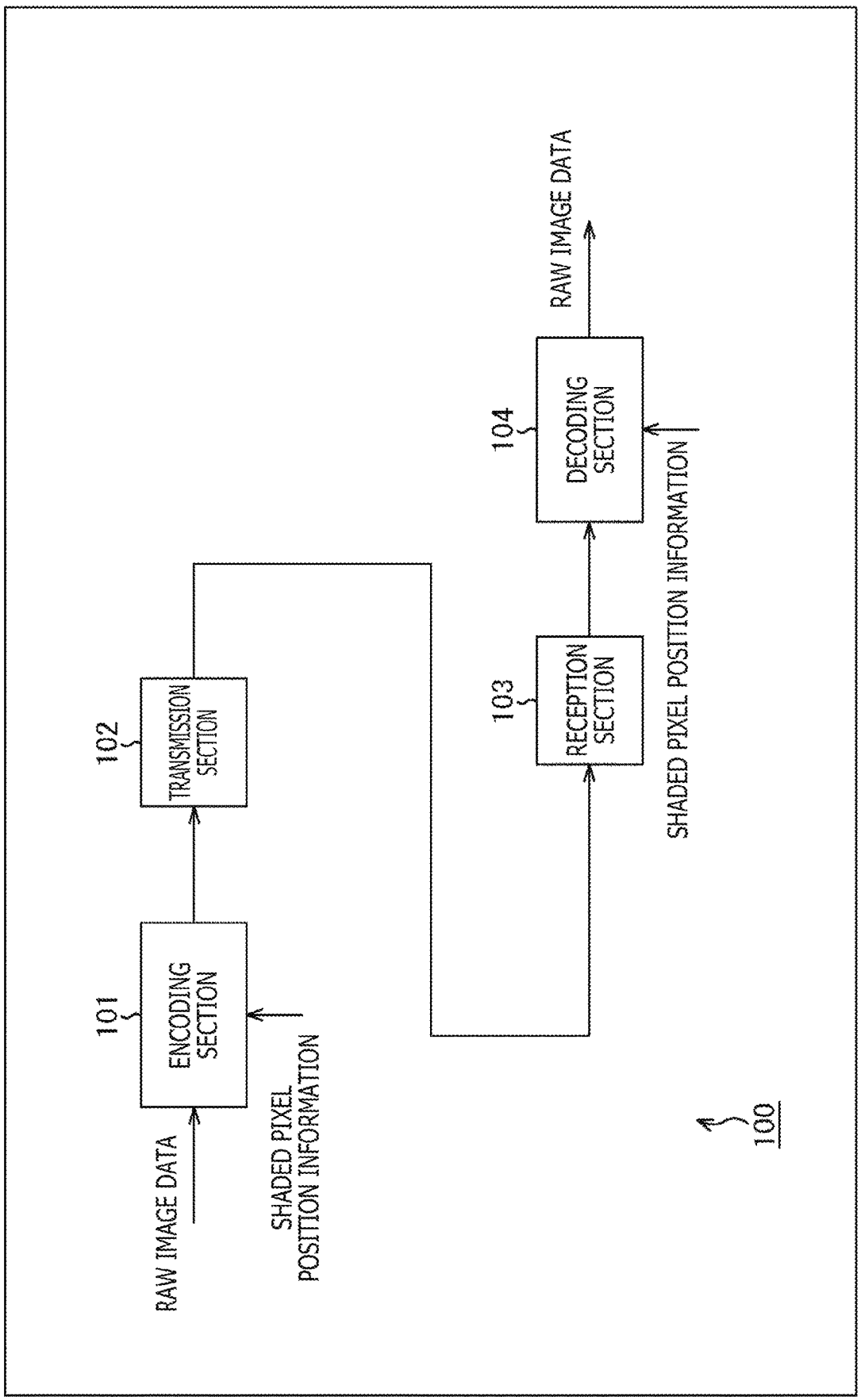
FIG. 8 is a block diagram depicting an example of principal components of an image processing apparatus that implements the method 2-1.

FIG. 8 is a block diagram depicting an example of principal components of an image processing apparatus that implements such a method 2-1 as described above. As depicted in FIG. 8, the image processing apparatus 100 in this case includes components from an encoding section 101 to a decoding section 104 similarly as in a case of FIG. 4.

To the encoding section 101 in this case, shaded pixel position information indicative of a position of a shaded pixel (namely, an image plane phase difference detection pixel) is supplied in addition to image data. The encoding section 101 can grasp the position of the shaded pixel (image plane phase difference detection pixel) on the basis of the shaded pixel position information. This shaded pixel position information may be registered in the image processing apparatus 100 in advance or may be inputted from the outside of the image processing apparatus 100 by a user, another apparatus, or the like.

The encoding section 101 performs prediction using a normal pixel at a position according to whether the adjacent same color pixel is an image plane phase difference detection pixel as a prediction pixel to derive a prediction value of the processing target pixel and encodes image data using the prediction value. For example, in a case where the adjacent same color pixel is an image plane phase difference detection pixel, the encoding section 101 sets the nearest same color normal pixel as a prediction pixel. By doing such a manner, the encoding section 101 can suppress increase of the prediction error.

Also, as with the decoding section 104 in this case, shaded pixel position information is supplied. The decoding section 104 can grasp the position of the shaded pixel (image plane phase difference detection pixel) on the basis of the shaded pixel position information. This shaded pixel position information may be stored in the image processing apparatus 100 in advance or may be inputted from the outside of the image processing apparatus 100 by the user, another apparatus, or the like.

The decoding section 104 performs prediction using a normal pixel at a position according to whether the adjacent same color pixel is an image plane phase difference detection pixel as a prediction pixel to derive a prediction value of the processing target pixel and decodes the encoded data using the prediction value. For example, in a case where the adjacent same color pixel is an image plane phase difference detection pixel, the decoding section 104 sets the nearest same color normal pixel as a prediction pixel. In short, the decoding section 104 sets a prediction pixel according to the type of pixel by a method similar to that by the encoding section 101. By doing such a manner, the decoding section 104 can suppress increase of the prediction error.

<Encoding Section>

Figure 9:
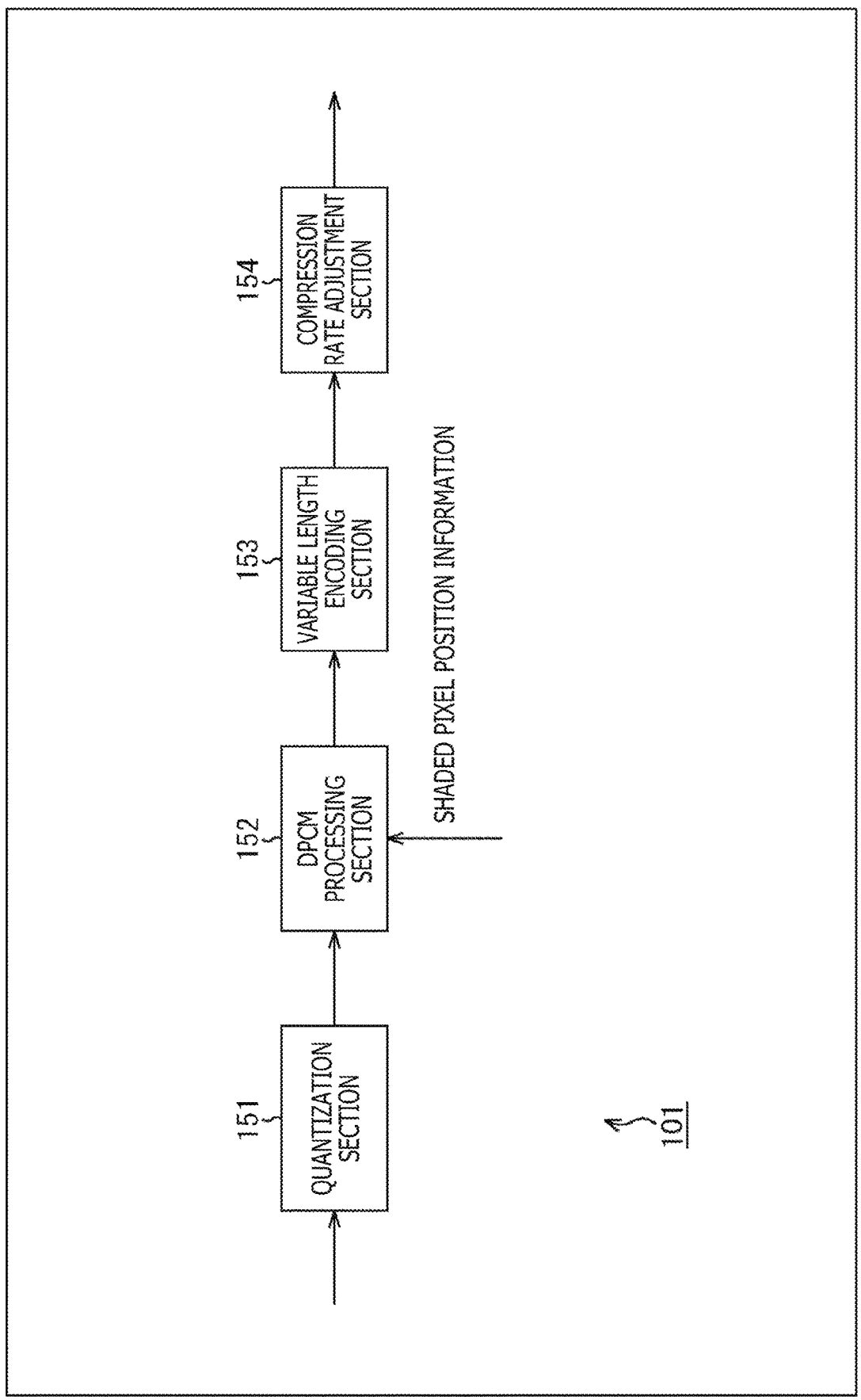
FIG. 9 is a block diagram depicting an example of principal components of an encoding section.

FIG. 9 is a block diagram depicting an example of principal components of the encoding section 101 of FIG. 8. As depicted in FIG. 9, the encoding section 101 in this case includes a quantization section 151, a DPCM (Differential Pulse Code Modulation) processing section 152, a variable length encoding section 153, and a compression rate adjustment section 154.

The quantization section 151 quantizes image data inputted thereto. For example, the quantization section 151 truncates lower bits (predetermined bit number) from each pixel value of the image data. The quantization section 151 supplies the quantized image data and the image data before the quantization to the DPCM processing section 152.

The DPCM processing section 152 performs processing relating to DPCM. For example, the DPCM processing section 152 acquires quantized image data to be supplied from the quantization section 151. In addition, shaded pixel position information is also supplied to the DPCM processing section 152. Accordingly, the DPCM processing section 152 can grasp the position of the image plane phase difference detection pixel.

The DPCM processing section 152 performs a DPCM process using these pieces of information inputted thereto. The DPCM process is a process of performing prediction of the pixel value of the processing target pixel using the pixel value of the peripheral pixel (namely, deriving a prediction value of the pixel value of the processing target pixel) and calculating a difference (prediction error) between the prediction value and the pixel value of the processing target pixel. By deriving the prediction error (difference value) in this manner, an information amount can be reduced.

At this time, the DPCM processing section 152 sets a prediction pixel as described above with reference to FIG. 7 and performs the DPCM process. In particular, in a case where the processing target is a normal pixel and besides, the adjacent same color pixel is an image plane phase difference detection pixel, the DPCM processing section 152 sets the nearest same color normal pixel as a prediction pixel and performs the DPCM process. By doing such a manner, the DPCM processing section 152 can suppress increase of the prediction error. The DPCM processing section 152 supplies the prediction error derived in such a manner as described above and the image data before the quantization to the variable length encoding section 153.

The variable length encoding section 153 performs variable length encoding on the prediction error to be supplied from the DPCM processing section 152 to generate encoded data. By such encoding, the variable length encoding section 153 can generally decrease the information amount. The variable length encoding section 153 supplies the generated encoded data and the image data before the quantization to the compression rate adjustment section 154.

The compression rate adjustment section 154 controls the code amount of encoded data (namely, a compression rate) to be supplied from the variable length encoding section 153 using the image data before the quantization. For example, the compression rate adjustment section 154 extracts information of the lower bits truncated by the quantization section 151 from the image data before the quantization and adds the lower bit information as a refinement to the encoded data to adjust the code amount, namely, the compression rete. For example, by adding a refinement in this manner, the compression rate adjustment section 154 can set the code amount of each block as a fixed length (in short, can implement fixed length encoding).

The compression rate adjustment section 154 outputs the encoded data to which the refinement is added in such a manner as described above (encoded data whose code amount is adjusted) to the outside of the encoding section 101 (namely, to the transmission section 102).

<Decoding Section>

Figure 10:
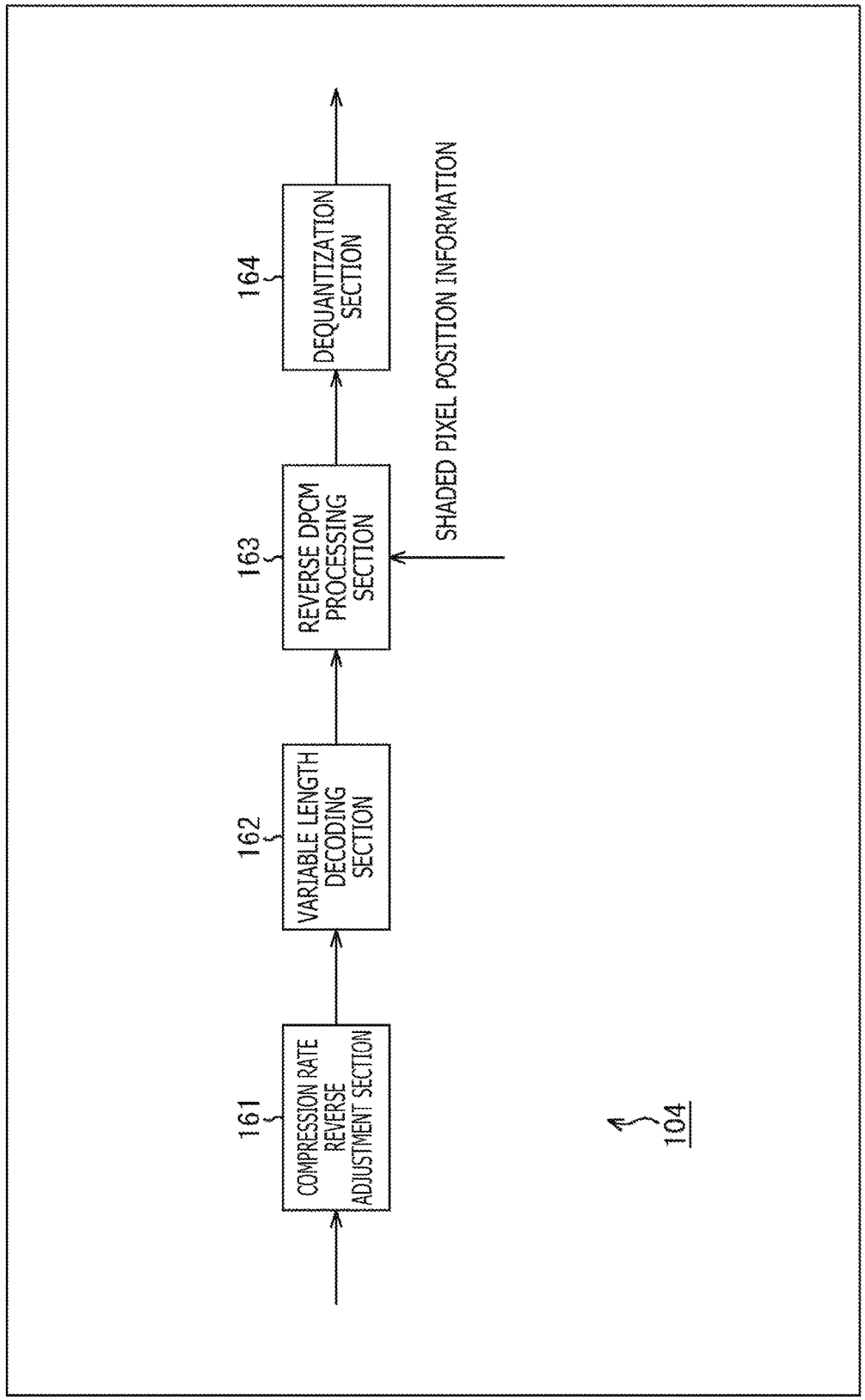
FIG. 10 is a block diagram depicting an example of principal components of a decoding section.

FIG. 10 is a block diagram depicting an example of principal components of the decoding section 104 of FIG. 8. As depicted in FIG. 10, the decoding section 104 in this case includes a compression rate reverse adjustment section 161, a variable length decoding section 162, a reverse DPCM (Differential Pulse Code Modulation) processing section 163, and a dequantization section 164.

The compression rate reverse adjustment section 161 performs a reverse process to the process performed by the compression rate adjustment section 154 of the encoding section 101. For example, the compression rate reverse adjustment section 161 removes the refinement added by the compression rate adjustment section 154 from encoded data supplied from the reception section 103. In other words, the compression rate reverse adjustment section 161 extracts the encoded data generated by the variable length encoding section 153 from the acquired encoded data. The compression rate reverse adjustment section 161 supplies the encoded data to the variable length decoding section 162.

The variable length decoding section 162 decodes the encoded data supplied from the compression rate reverse adjustment section 161 by a method corresponding to the encoding method of the variable length encoding section 153 to generate image data (prediction error). The variable length decoding section 162 supplies the generated image data (prediction error) to the reverse DPCM processing section 163.

The reverse DPCM processing section 163 performs, for the image data (prediction error (difference value)) supplied from the variable length decoding section 162, a reverse DPCM process that is a reverse process to the DPCM process performed by the DPCM processing section 152 to restore each pixel data (pixel value after quantization). In short, the reverse DPCM processing section 163 restores the quantized image data.

At this time, the reverse DPCM processing section 163 sets a prediction pixel as described above with reference to FIG. 7 and performs a reverse DPCM process. In particular, the reverse DPCM processing section 163 sets a prediction pixel by a method similar to that by the DPCM processing section 152. Accordingly, the reverse DPCM processing section 163 can suppress increase of the prediction error. The reverse DPCM processing section 163 supplies quantized image data derived in such a manner as described above to the dequantization section 164.

The dequantization section 164 performs dequantization for the quantized image data to be supplied from the reverse DPCM processing section 163 to restore image data including pixel values of a bit length same as that of the image data before the quantization. The dequantization section 164 outputs the image data to the outside of the decoding section 104 (image processing apparatus 100).

<Flow of Encoding Process>

An example of a flow of an encoding process executed by the image processing apparatus 100 in this case is described with reference to a flow chart of FIG. 11.

After an encoding process is started, the quantization section 151 quantizes image data in step S141.

In step S142, the DPCM processing section 152 executes a prediction pixel generation process to generate a prediction pixel. In step S143, the DPCM processing section 152 performs the DPCM process using the prediction pixel to derive residual data (prediction error).

In step S144, the variable length encoding section 153 performs variable length encoding on the residual data to generate encoded data.

In step S145, the compression rate adjustment section 154 suitably adds a refinement to the encoded data to adjust the compression rate.

In step S146, the transmission section 102 transmits the encoded data whose compression rate is adjusted. After the process in step S146 ends, the encoding process ends.

<Flow of Prediction Pixel Generation Process>

Figure 11:
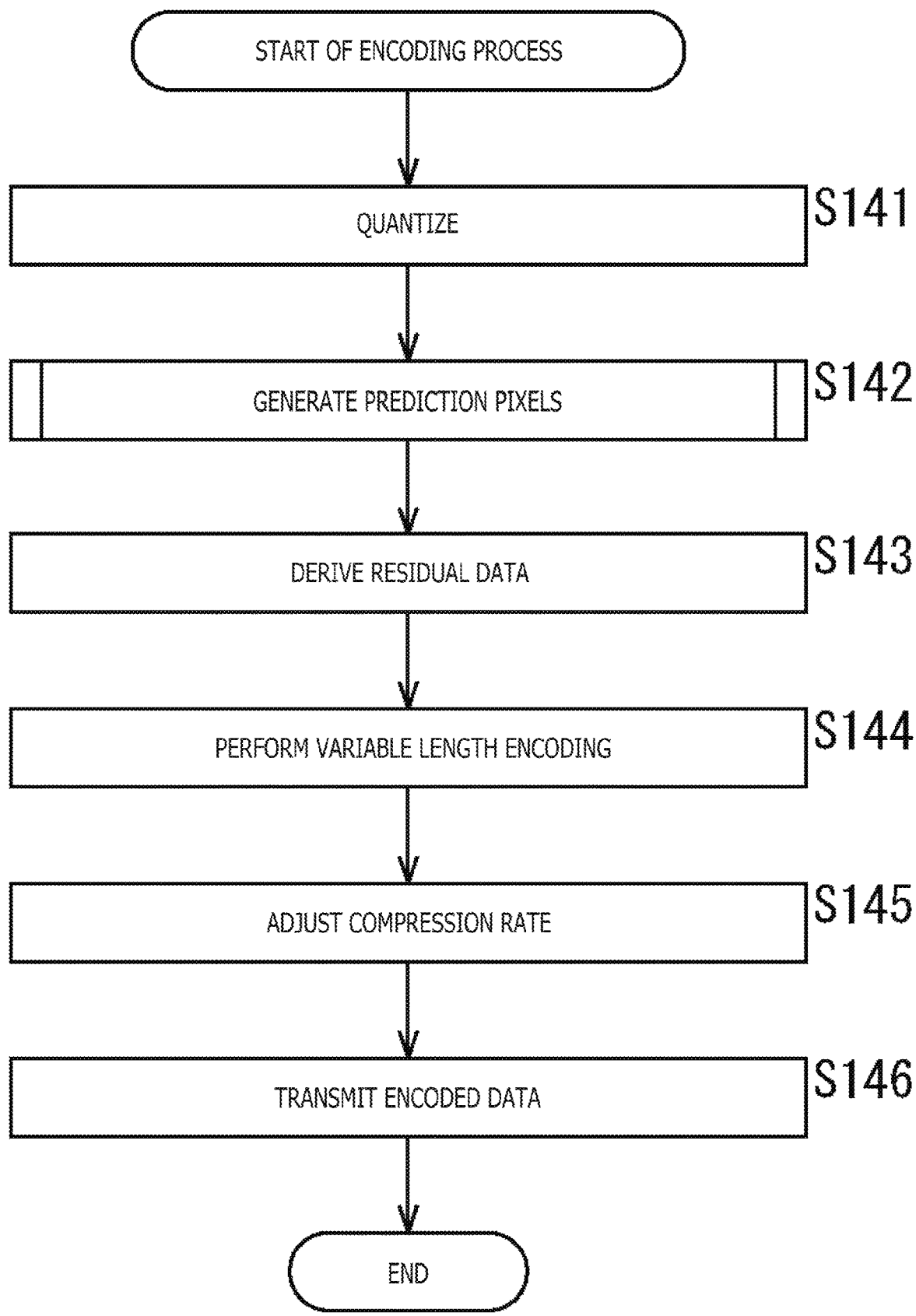
FIG. 11 is a flow chart illustrating an example of a flow of an encoding process.
Figure 12:
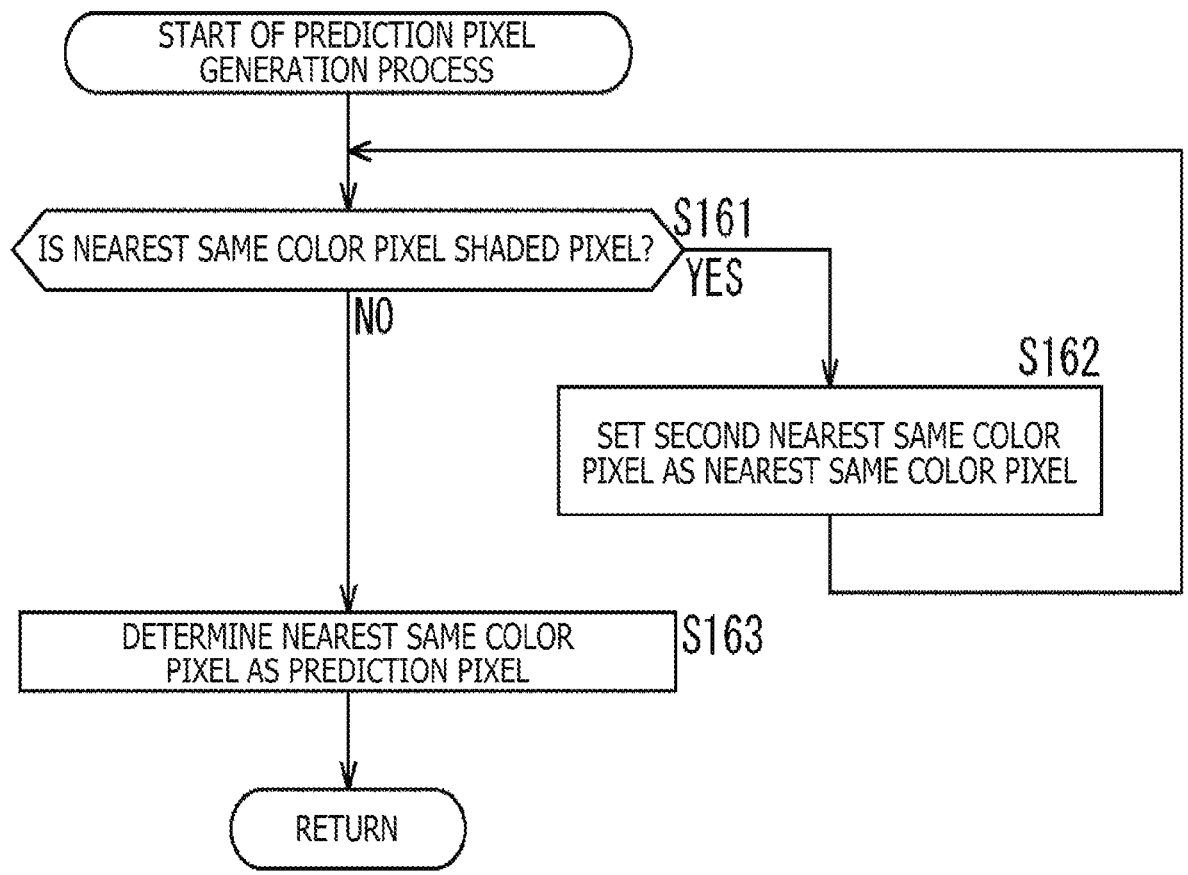
FIG. 12 is a flow chart illustrating an example of a flow of a prediction pixel generation process.

Now, an example of a flow of the prediction pixel generation process executed in step S142 of FIG. 11 is described with reference to a flow chart of FIG. 12.

After the prediction pixel generation process is started, the DPCM processing section 152 decides in step S161 whether or not the nearest same color pixel is a shaded pixel (image plane phase difference detection pixel). In a case where it is decided that the nearest same color pixel is a shaded pixel, the processing advances to step S162.

In step S162, the DPCM processing section 152 sets a second nearest same color pixel as a nearest same color pixel. After the process in step S162 ends, the processing returns to step S161. In particular, the processes in step S161 and step S162 are repeated until it is decided that the nearest same color pixel is not a shaded pixel (image plane phase difference detection pixel), namely, that the nearest same color pixel is a normal pixel. Then, in a case where it is decided in step S162 that the nearest same color pixel is a normal pixel, the processing advances to step S163.

In step S163, the DPCM processing section 152 sets the nearest same color pixel (normal pixel) as a prediction pixel. After a prediction pixel is set in such a manner as described above, the prediction pixel generation process ends, and the processing returns to FIG. 11.

By performing the processes in such a manner as described above, prediction can be performed for a processing target pixel of a normal pixel, using a normal pixel as a prediction pixel, and therefore, increase of the prediction error can be suppressed as in the example of FIG. 7.

<Flow of Decoding Process>

Now, an example of a flow of a decoding process executed by the image processing apparatus 100 in this case is described with reference to a flow chart of FIG. 13.

After the decoding process is started, the reception section 103 receives encoded data transmitted from the transmission section 102 in step S181.

In step S182, the compression rate reverse adjustment section 161 deletes the refinement from the encoded data to reversely adjust the compression rate.

In step S183, the variable length decoding section 162 performs variable length decoding on the encoded data to generate a prediction error (residual data).

In step S184, the reverse DPCM processing section 163 performs a prediction pixel generation process to generate a prediction pixel. This prediction pixel generation process is executed similarly as in a case described above with reference to the flow chart of FIG. 12, namely, similarly as in the encoding process. In step S185, the reverse DPCM processing section 163 performs a reverse DPCM process, using the prediction pixel generated in step S184 to derive a pixel value after quantization (quantized image data).

In step S186, the dequantization section 164 dequantizes the quantized image data to generate image data including pixel values of a bit length same as that of the image data before the quantization. After the image data is generated, the decoding process ends.

By performing the decoding process in this manner, encoded data generated by the encoding section 101 can be decoded correctly. Accordingly, increase of the prediction error can be suppressed.

<4-2: Method 2-2>

Figure 14:
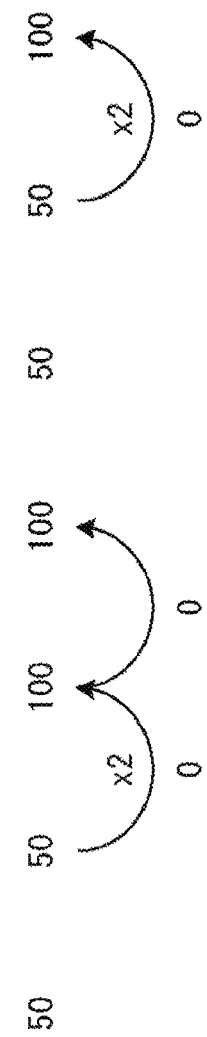
FIG. 14 is a view illustrating a method 2-2.

The method 2-2 is described with reference to FIG. 14. In the method 2-2, in a case where the processing target pixel is a normal pixel and the adjacent same color pixel is an image plane phase difference detection pixel, the pixel value of the image plane phase difference detection pixel of the adjacent same color pixel is corrected to be set as a prediction pixel. FIG. 14 is a view corresponding to FIG. 1.

For example, in a case where the eighth G pixel (normal pixel) from the left in FIG. 14 is set as a processing target pixel, the immediately preceding same color pixel (adjacent same color pixel) is the sixth left shaded pixel ZB from the left. In short, the adjacent same color pixel is an image plane phase difference detection pixel. Accordingly, the pixel value of the left shaded pixel ZB is corrected to obtain a prediction pixel, and prediction is performed. In a case of the example of FIG. 14, since the shading rate of the left shaded pixel ZB is 50%, the pixel value of the left shaded pixel ZB is doubled. By doing such a manner, the difference in pixel value between the normal pixel and the image plane phase difference detection pixel can be suppressed. Accordingly, increase of the prediction error in encoding and decoding can be suppressed.

In this case, since not the image data to be encoded but the prediction value is corrected, also upon decoding, a fixed value same as that in a case of encoding is used for multiplication (not divided).

It is to be noted that, in a case where the tenth G pixel (normal pixel) from the left is set as a processing target pixel, the same color pixel (adjacent same color pixel) on the straight line is the eighth G pixel (normal pixel) from the left. In short, since this G pixel is the nearest same color normal pixel, prediction is performed using this G pixel as a prediction pixel (using the pixel value of this G pixel as a prediction value).

<Image Processing Apparatus>

Figure 15:
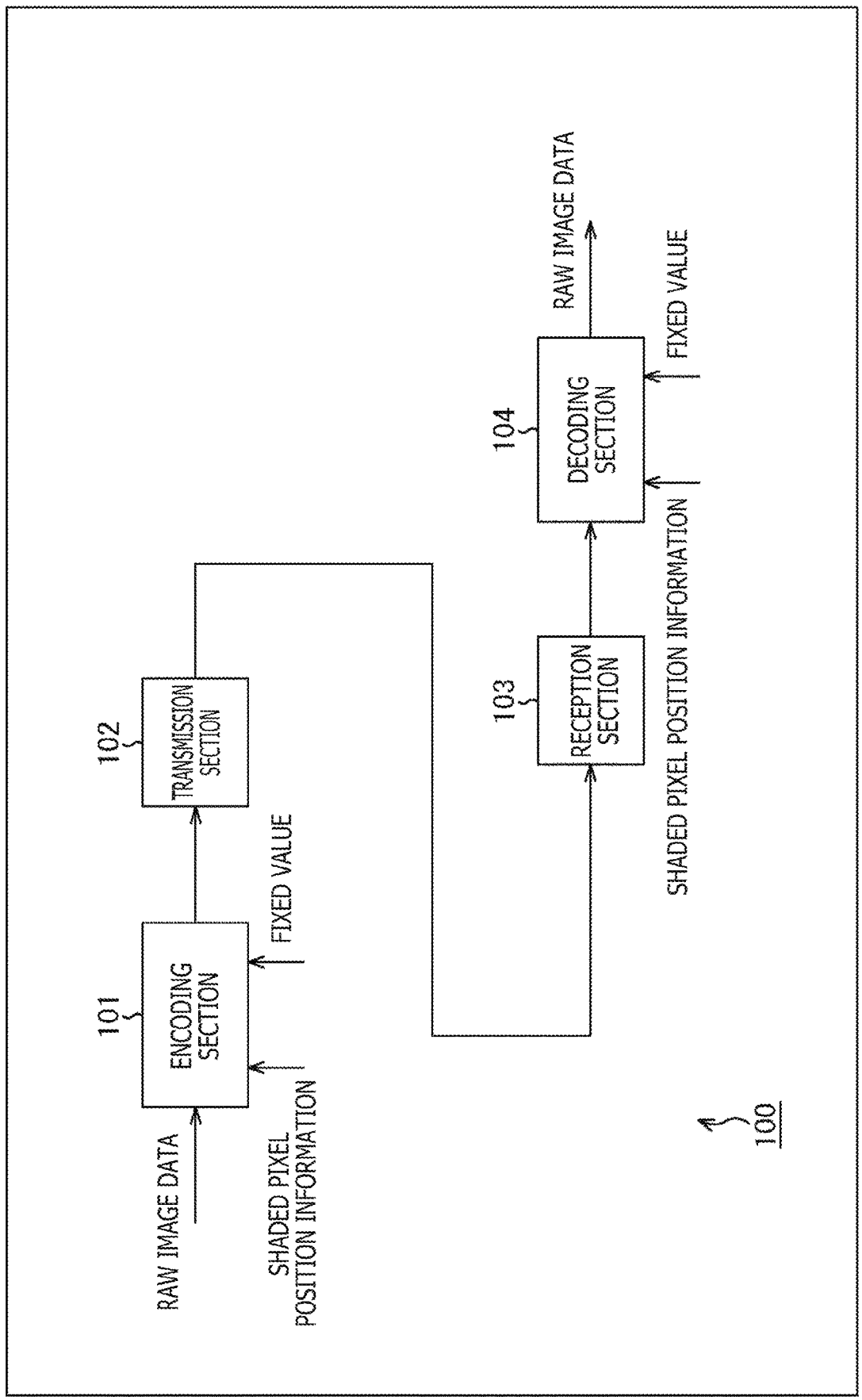
FIG. 15 is a block diagram depicting an example of principal components of an image processing apparatus that implements the method 2-2.

FIG. 15 is a block diagram depicting an example of principal components of an image processing apparatus that implements such a method 2-2 as described above. As depicted in FIG. 15, the image processing apparatus 100 in this case includes components from an encoding section 101 to a decoding section 104 similarly as in a case of FIG. 8.

To the encoding section 101 in this case, in addition to image data and shaded pixel position information, a fixed value to be used for correction of a prediction value is supplied. This fixed value may be registered in the image processing apparatus 100 in advance or may be inputted from the outside of the image processing apparatus 100, for example, by a user, another apparatus, or the like, similarly to the shaded pixel position information.

In a case where the processing target pixel is a normal image and besides the adjacent same color pixel is an image plane phase difference detection pixel, the encoding section 101 sets a value obtained by correcting the pixel value of the image plane phase difference detection pixel that is the adjacent same color pixel as a prediction value of the processing target pixel and encodes image data, using the prediction value. For example, the encoding section 101 sets a value obtained by multiplying the pixel value of the image plane phase difference detection pixel that is the adjacent same color pixel by a fixed value as a prediction value. For example, this fixed value is set as a value according to the shading rate of the image plane phase difference detection pixel that is the adjacent same color pixel. By doing such a manner, the encoding section 101 can suppress increase of the prediction error.

IN addition, also to the decoding section 104 in this case, shaded pixel position information and a fixed value are supplied similarly. This fixed value is same as the fixed value to be supplied to the encoding section 101 and may be registered in the image processing apparatus 100 in advance or may be inputted from the outside of the image processing apparatus 100, for example, by a user, another apparatus, or the like, similarly to the shaded pixel position information.

In a case where the processing target pixel is a normal pixel and besides the adjacent same color pixel is an image plane phase difference detection pixel, the decoding section 104 sets a value obtained by correcting the pixel value of the image plane phase difference detection pixel that is the adjacent same color pixel as a prediction value of the processing target pixel and decodes the encoded data, using the prediction value. For example, the decoding section 104 sets a value obtained by multiplying the pixel value of the image plane phase difference detection pixel that is the adjacent same color pixel by a fixed value as a prediction value. For example, this fixed value is set as a value according to the shading rate of the image plane phase difference detection pixel that is the adjacent same color pixel. In short, the decoding section 104 corrects the prediction value by a method similar to that by the encoding section 101. By doing such a manner, the decoding section 104 can suppress increase of the prediction error.

<Encoding Section>

Figure 16:
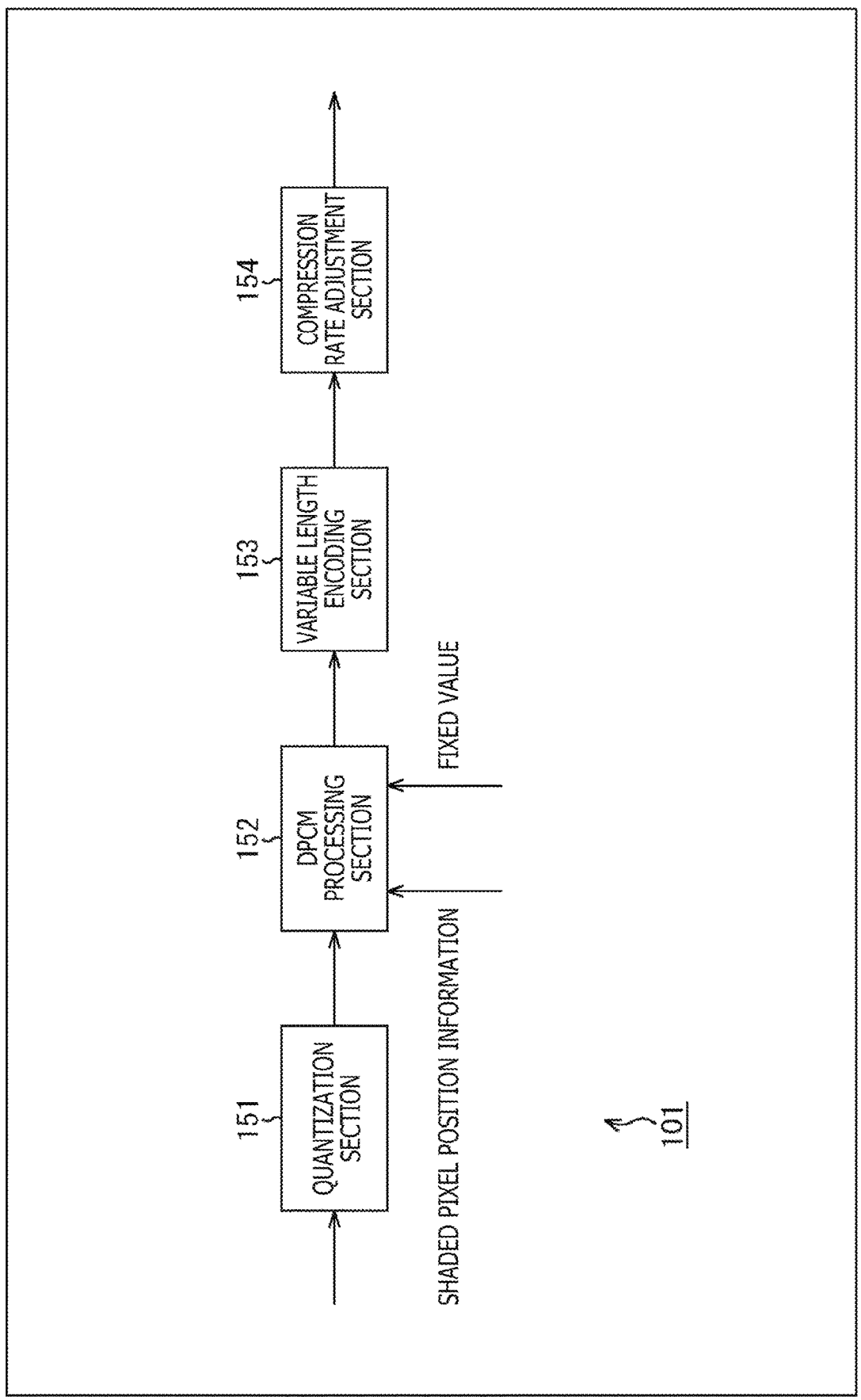
FIG. 16 is a block diagram depicting an example of principal components of an encoding section.

FIG. 16 is a block diagram depicting an example of principal components of the encoding section 101 of FIG. 15. As depicted in FIG. 16, the encoding section 101 in this case includes components from a quantization section 151 to a compression rate adjustment section 154 similarly as in a case of FIG. 9.

However, to the DPCM processing section 152, also the fixed value described above with reference to FIG. 15 is supplied together with shaded pixel position information. In a case where the processing target pixel is a normal pixel and besides the adjacent same color pixel is an image plane phase difference detection pixel, the DPCM processing section 152 corrects the prediction value (pixel value of the image plane phase difference detection pixel that is the adjacent same color pixel) by multiplying the pixel value by this fixed value to correct the prediction value. The other processes are performed similarly as in a case of FIG. 9.

<Decoding Section>

Figure 17:
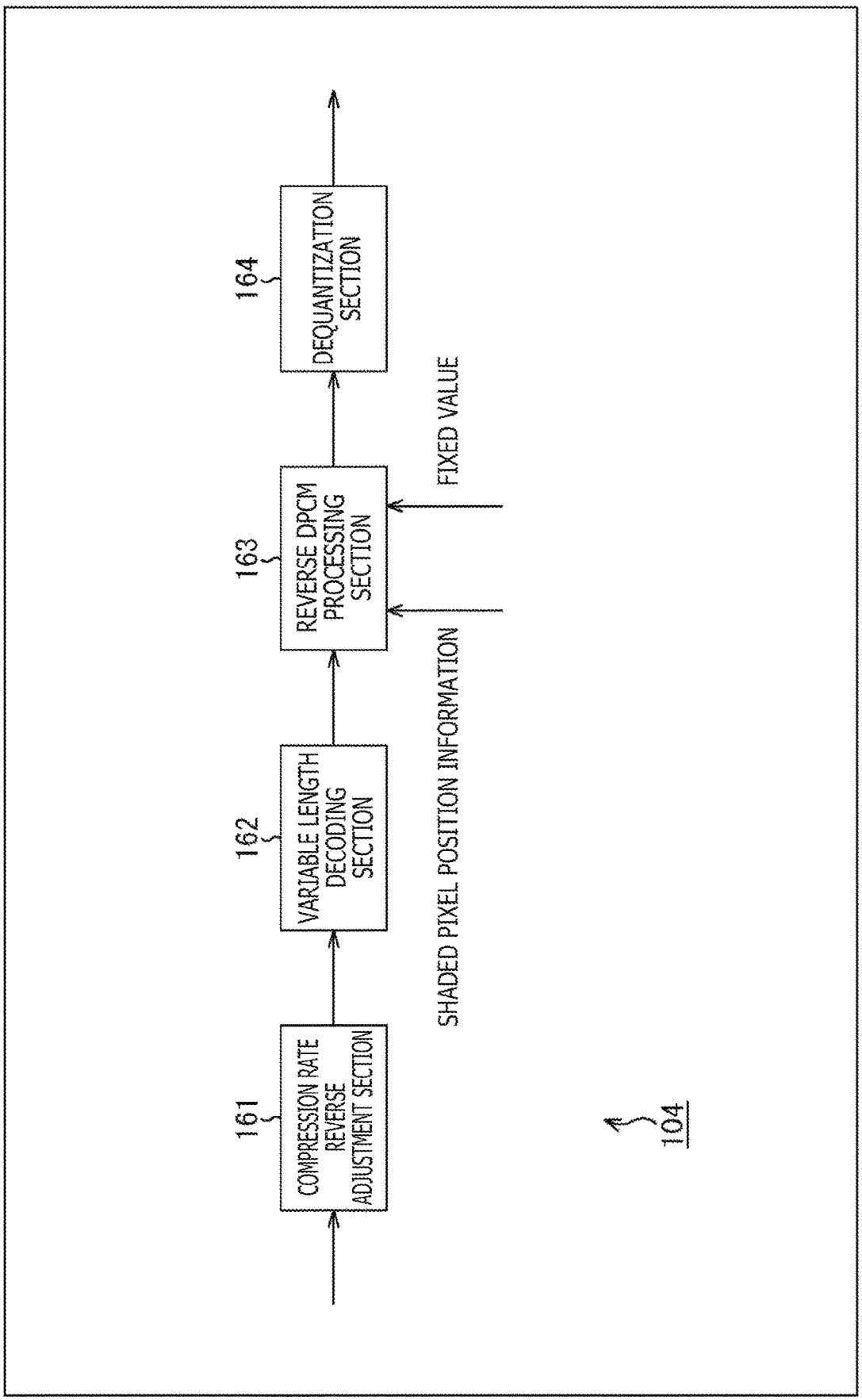
FIG. 17 is a block diagram depicting an example of principal components of a decoding section.

FIG. 17 is a block diagram depicting an example of principal components of the decoding section 104 of FIG. 15. As depicted in FIG. 17, the decoding section 104 in this case includes components from a compression rate reverse adjustment section 161 to a dequantization section 164 similarly as in a case of FIG. 10.

However, to the reverse DPCM processing section 163, also a fixed value described above with reference to FIG. 15 is supplied together with shaded pixel position information. In a case where the processing target pixel is a normal pixel and besides the adjacent same color pixel is an image plane phase difference detection pixel, the reverse DPCM processing section 163 corrects the prediction value (pixel value of the image plane phase difference detection pixel that is the adjacent same color pixel) by multiplying the pixel value by the fixed value. In other words, the reverse DPCM processing section 163 corrects the prediction value by a method similar to that by the DPCM processing section 152. The other processes are performed similarly as in a case of FIG. 10.

<Flow of Prediction Pixel Generation Process>

In this case, a prediction pixel generation process executed by the image processing apparatus 100 is executed by a flow similar to that in a case described above with reference to the flow chart of FIG. 11.

Figure 18:
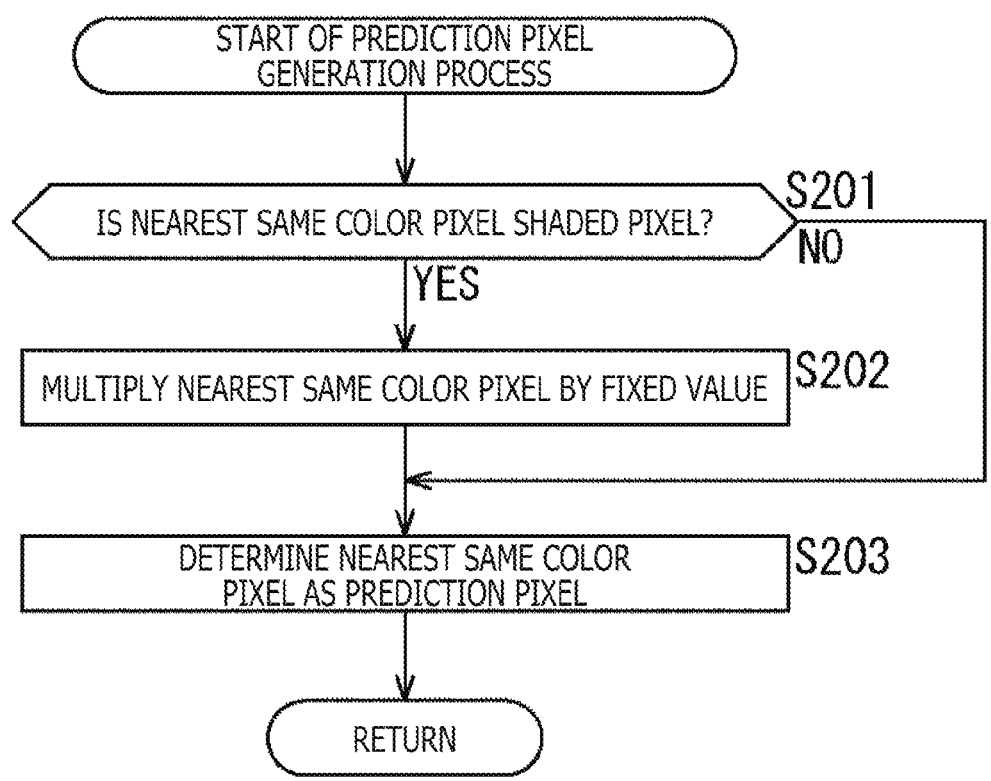
FIG. 18 is a flow chart illustrating an example of a flow of a prediction pixel generation process.

An example of a flow of the prediction pixel generation process executed in (step S142 (FIG. 11) of) the encoding process in this case is described with reference to a flow chart of FIG. 18.

After the prediction pixel generation process is started, the DPCM processing section 152 decides in step S201 whether or not the nearest same color pixel is a shaded pixel (image plane phase difference detection pixel). In a case where it is decided that the nearest same color pixel is a shaded pixel, the processing advances to step S202.

In step S202, the DPCM processing section 152 multiplies the pixel value of the image plane phase difference detection pixel that is the nearest same color pixel by a fixed value (value according to the shading rate of the image plane phase difference detection pixel that is the adjacent same color pixel).

After the process in step S202 ends, the processing advances to step S203. Conversely, in a case where it is decided in step S201 that the nearest same color pixel is not a shaded pixel, the processing advances to step S203.

In step S203, the DPCM processing section 152 sets the nearest same color pixel as a prediction pixel. After the prediction pixel is set in such a manner as described above, the prediction pixel generation process ends, and the processing returns to FIG. 11.

By performing the processes in such a manner as described above, the difference in pixel value between a normal pixel and an image plane phase difference detection pixel can be suppressed, and therefore, increase of the prediction error can be suppressed as in the example of FIG. 14.

Further, the decoding process executed by the image processing apparatus 100 in this case is executed by a flow similar to that in a case described above with reference to the flow chart of FIG. 13. Then, the prediction pixel generation process executed (in step S184 (FIG. 13)) by the decoding process in this case is executed by a flow similar to that in a case described above with reference to the flow chart of FIG. 18. Accordingly, the decoding section 104 can correctly decode encoded data generated by the encoding section 101. Accordingly, increase of the prediction error can be suppressed.

5. Third Embodiment

<Method 3>

In the present embodiment, the "method 3" in a case where the processing target pixel is an image plane phase difference detection pixel is described. In a case of this method 3, increase of the prediction error upon encoding and decoding is suppressed by switching the prediction method.

For example, in a case where the processing target pixel is an image plane phase difference detection pixel, image data is encoded, using a prediction method according to whether the adjacent same color pixel is a normal pixel. Also, in a case where the processing target pixel is an image plane phase difference detection pixel, encoded data is decoded using a prediction method according to whether the adjacent same color pixel is a normal pixel.

<5-1: Method 3-1]

<Case in which Right Shaded Pixel ZA and Left Shaded Pixel ZB are Distinguished from Each Other>

Figure 19:
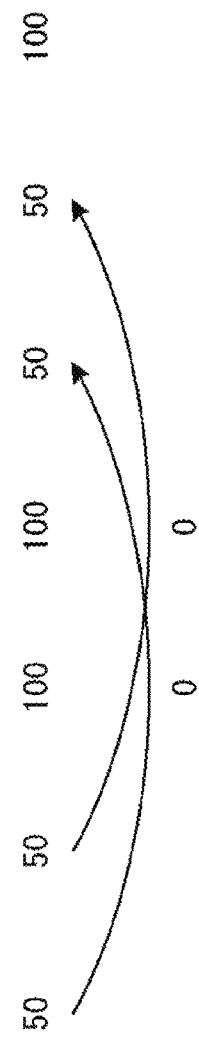
FIG. 19 is a view illustrating a method 3-1.

The method 3-1 is described with reference to FIG. 19. In the method 3-1, in a case where the processing target pixel is an image plane phase difference detection pixel and the adjacent same color pixel is a normal pixel, the nearest same color image plane phase difference detection pixel is set as a prediction pixel. FIG. 19 is a view corresponding to FIG. 1 and depicts an example of a case in which a right shaded pixel ZA and a left shaded pixel ZB are distinguished from each other.

For example, in a case where the twelfth right shaded pixel ZA (image plane phase difference detection pixel) from the left in FIG. 19 is set as a processing target pixel, the immediately preceding same color pixel (adjacent same color pixel) is the tenth G pixel from the left. In short, the immediately preceding same color pixel is a normal pixel. Accordingly, this pixel is not set as a prediction pixel. The second nearest same color pixel is the eight G pixel from the left. In short, since this second nearest same color pixel is also a normal pixel, it is not set as a prediction pixel. The third nearest same color pixel is the sixth left shaded pixel ZB from the left. Although this pixel is an image plane phase difference detection pixel, since it does not coincide in type (shaded position) with the processing target pixel (right shaded pixel ZA), it is not set as a prediction pixel. The fourth nearest same color pixel is the fourth right shaded pixel ZA from the left. In particular, since this right shaded pixel ZA is the nearest same color image plane phase difference detection pixel (image plane phase difference detection pixel of the same type), this right shaded pixel ZA is set as a prediction pixel and performs prediction (using the pixel value of this right shaded pixel ZA as a prediction value). By doing such a manner, prediction of an image plane phase difference detection pixel can be performed, using another image plane phase difference detection pixel of the same type. Therefore, as depicted in FIG. 19, increase of the prediction error can be suppressed more than a case where a G pixel (normal pixel) that is an adjacent same color pixel is set as a prediction pixel.

It is to be noted that, also in a case where the fourteenth left shaded pixel ZB (image plane phase difference detection pixel) from the left is set as a processing target pixel, selection of a prediction pixel is performed similarly, the sixth left shaded pixel ZB from the left is selected as the nearest same color image plane phase difference detection pixel (image plane phase difference detection pixel of the same type) and prediction is performed using this left shaded pixel ZB as a prediction pixel (using the pixel value of the left shaded pixel ZB as a prediction value). Accordingly, increase of the prediction error can be similarly suppressed similarly.

<Image Processing Apparatus>

An image processing apparatus 100 that implements such a method 3-1 as described above has a configuration similar to that of the example (method 2-1) of FIG. 8. Further, the encoding section 101 has a configuration similar to that of the example of FIG. 9. Furthermore, the decoding section 104 has a configuration similar to that of the example of FIG. 10.

The encoding section 101 performs prediction using an image plane phase difference detection pixel at a position according to whether the adjacent same color pixel is a normal pixel as a prediction pixel to derive a prediction value of the processing target pixel and encodes the image data using the prediction value. For example, in a case where the adjacent same color pixel is a normal pixel, the encoding section 101 sets the nearest same color image plane phase difference detection pixel as a prediction pixel. By doing such a manner, the encoding section 101 can suppress increase of the prediction error.

The decoding section 104 performs prediction using an image plane phase difference detection pixel at a position according to whether the adjacent same color pixel is a normal pixel as a prediction pixel to derive a prediction value of the processing target pixel and decodes the encoded data using the prediction value. For example, in a case where the adjacent same color pixel is a normal pixel, the decoding section 104 sets the nearest same color image plane phase difference detection pixel as a prediction pixel. By doing such a manner, the decoding section 104 can suppress the prediction error.

<Flow of Prediction Pixel Generation Process>

The encoding process executed by the image processing apparatus 100 in this case is executed by a flow similar to that in a case described above with reference to the flow chart of FIG. 11.

Figure 20:
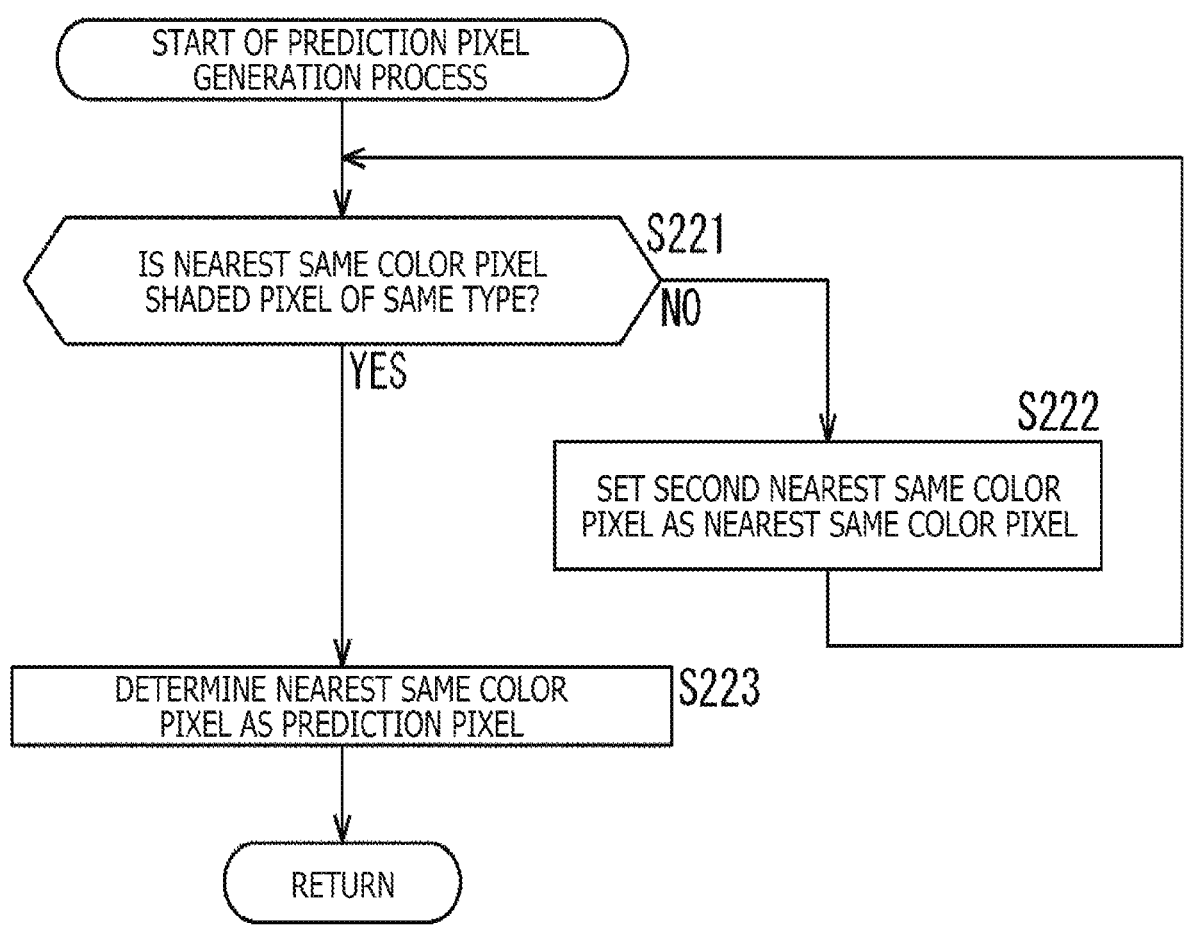
FIG. 20 is a flow chart illustrating an example of a flow of a prediction pixel generation process.

An example of a flow of the prediction pixel generation process executed in step S142 of FIG. 11 in this case is described with reference to a flow chart of FIG. 20.

After the prediction pixel generation process is started, the DPCM processing section 152 decides in step S221 whether or not the nearest same color pixel is a shaded pixel (image plane phase difference detection pixel) of the same type. In a case where the nearest same color pixel is not a shaded pixel of the same type, the processing advances to step S222.

In step S222, the DPCM processing section 152 sets the second nearest same color pixel as a nearest same color pixel. After the process in step S222 ends, the processing returns to step S221. In short, the processes in step S221 and step S222 are repeated until it is decided that the nearest same color pixel is a shaded pixel (image plane phase difference detection pixel) of the same type. Then, in a case where it is decided in step S222 that the nearest same color pixel is a shaded pixel (image plane phase difference detection pixel) of the same type, the processing advances to step S223.

In step S223, the DPCM processing section 152 sets the nearest same color pixel (image plane phase difference detection pixel) as a prediction pixel. After a prediction pixel is set in such a manner as described above, the prediction pixel generation process ends, and the processing returns to FIG. 11.

By performing the processes in such a manner as described above, since prediction can be performed, using an image plane phase difference detection pixel of the same type as that of a processing target pixel as a prediction pixel, increase of the prediction error can be suppressed as in the example of FIG. 19.

Further, the decoding process executed by the image processing apparatus 100 in this case is executed by a flow similar to that in a case described above with reference to the flow chart of FIG. 13. Further, the prediction pixel generation process executed in (step S184 (FIG. 13) of) the decoding process in this case is executed by a flow similar that in a case described above with reference to the flow chart of FIG. 20. Accordingly, the decoding section 104 can correctly decode encoded data generated by the encoding section 101. Accordingly, increase of the prediction error can be suppressed.

<Where Right Shaded Pixel ZA and Left Shaded Pixel ZB Are Not Distinguished from Each Other>

Figure 21:
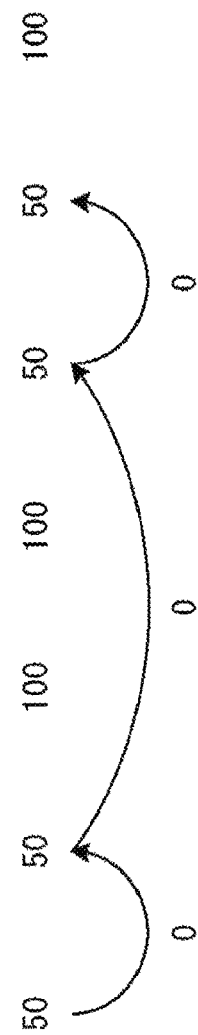
FIG. 21 is a view illustrating the method 3-1.

Now, a case in which the right shaded pixel ZA and the left shaded pixel ZB of the method 3-1 are not distinguished from each other is described with reference to FIG. 21. In the method 3-1, in a case where the processing target pixel is an image plane phase difference detection pixel and the adjacent same color pixel is a normal pixel, the nearest same color image plane phase difference detection pixel is set as a prediction pixel. FIG. 21 is a view corresponding to FIG. 1.

For example, in a case where the twelfth right shaded pixel ZA (image plane phase difference detection pixel) from the left in FIG. 21 is set as a processing target pixel, since the tenth G pixel and the eighth G pixel from the left are normal pixels, any of them is not set as a prediction pixel. The second nearest same color pixel is the sixth left shaded pixel ZB from the left. Although this pixel does not coincide in type (shaded position) with the processing target pixel (right shaded pixel ZA), it is an image plane phase difference detection pixel. In this case, since no distinction in type is made, prediction is performed, using this left shaded pixel ZB as a prediction pixel (using the pixel value of the left shaded pixel ZB as a prediction value). By doing such a manner, prediction of an image plane phase difference detection pixel can be performed using the image plane phase difference detection pixel, and accordingly, increase of the prediction error can be suppressed more than that in a case where a G pixel (normal pixel) that is an adjacent same color pixel is set as the prediction pixel.

It is to be noted that, also in a case where the fourteenth left shaded pixel ZB (image plane phase difference detection pixel) from the left is set as a processing target pixel, selection of a prediction pixel is performed similarly, the fourteenth right shaded pixel ZA from the left is selected as the nearest same color image plane phase difference detection pixel, and prediction is performed, using this right shaded pixel ZA as a prediction pixel (using the pixel value of the right shaded pixel ZA as a prediction value). Accordingly, increase of the prediction error can be similarly suppressed.

<Image Processing Apparatus>

The configuration of the image processing apparatus 100 and its processing sections in this case is similar to that in a case where the right shaded pixel ZA and the left shaded pixel ZB are distinguished from each other.

<Flow of Prediction Pixel Generation Process>

The encoding process executed by the image processing apparatus 100 in this case is executed in a flow similar to that in a case described above with reference to the flow chart of FIG. 11.

Figure 22:
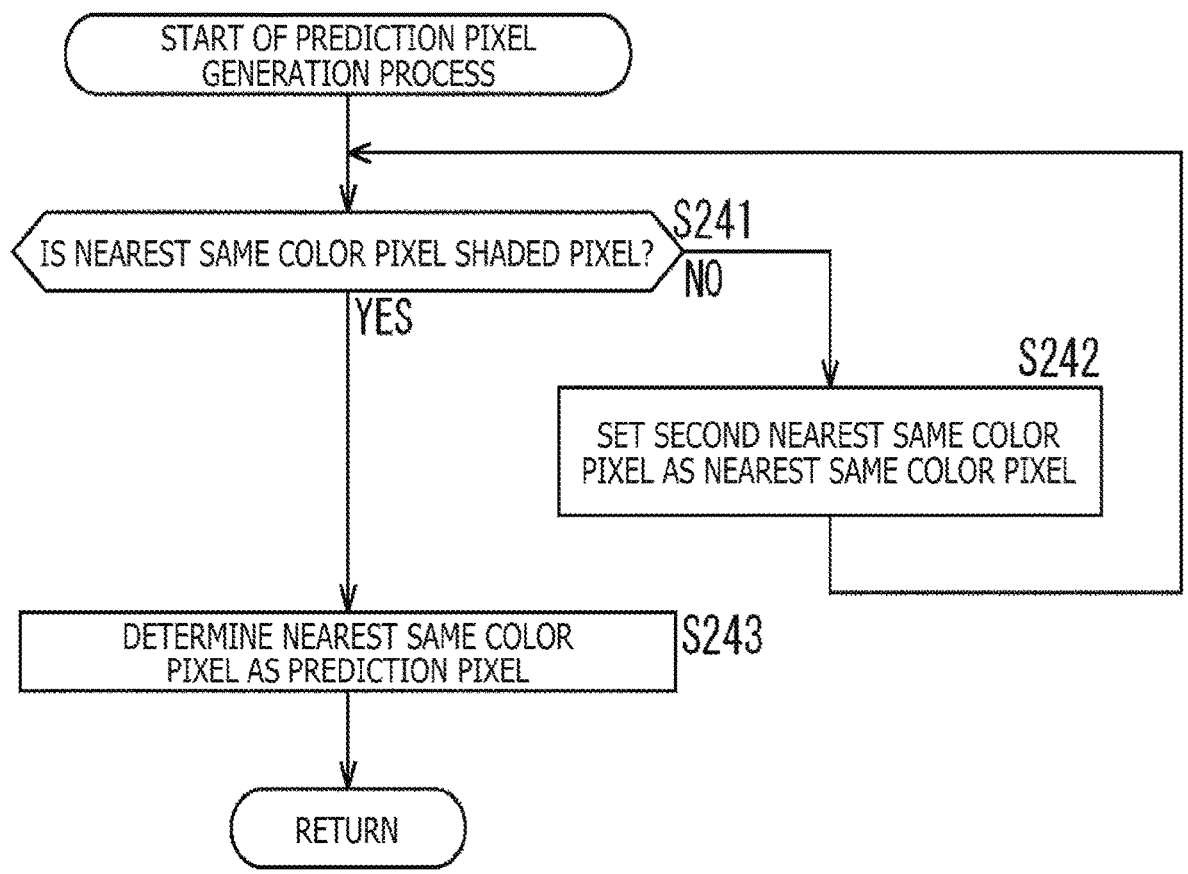
FIG. 22 is a flow chart illustrating an example of a flow of the prediction pixel generation process.

An example of a flow of the prediction pixel generation process executed in step S142 of FIG. 11 in this case is described with reference to a flow chart of FIG. 22.

After the prediction pixel generation process is started, the DPCM processing section 152 decides in step S241 whether or not the nearest same color pixel is a shaded pixel (image plane phase difference detection pixel). In a case where it is decided that the nearest same color pixel is not a shaded pixel, the processing advances to step S242.

In step S242, the DPCM processing section 152 sets the second nearest same color pixel as a nearest same color pixel. After the process in step S242 ends, the processing returns to step S241. In other words, the processes in step S241 and step S242 are repeated until it is decided that the nearest same color pixel is a shaded pixel (image plane phase difference detection pixel). Then, in a case where it is decided in step S242 that the nearest same color pixel is a shaded pixel (image plane phase difference detection pixel), the processing advances to step S243.

In step S243, the DPCM processing section 152 sets the nearest same color pixel (image plane phase difference detection pixel) as a prediction pixel. After the prediction pixel is set in such a manner as described above, the prediction process generation process ends, and the processing returns to FIG. 11.

By performing the processes in such a manner as described above, prediction can be performed, using each of a processing target pixel and an image plane phase difference detection pixel as a prediction pixel, and accordingly, increase of the prediction error can be suppressed as in the example of FIG. 21.

Further, the decoding process executed by the image processing apparatus 100 in this case is executed in a flow similar to that in a case described above with reference to the flow chart of FIG. 13. Then, the prediction pixel generation process executed in (step S184 (FIG. 13) of) the decoding process in this case is executed in a flow similar to that in a case described above with reference to the flow chart of FIG. 22. Accordingly, the decoding section 104 can correctly decode encoded data generated by the encoding section 101. Accordingly, increase of the prediction error can be suppressed.

<5-2. Method 3-2>

<Where Right Shaded Pixel ZA and Left Shaded Pixel ZB are Distinguished from Each Other>

Figure 23:
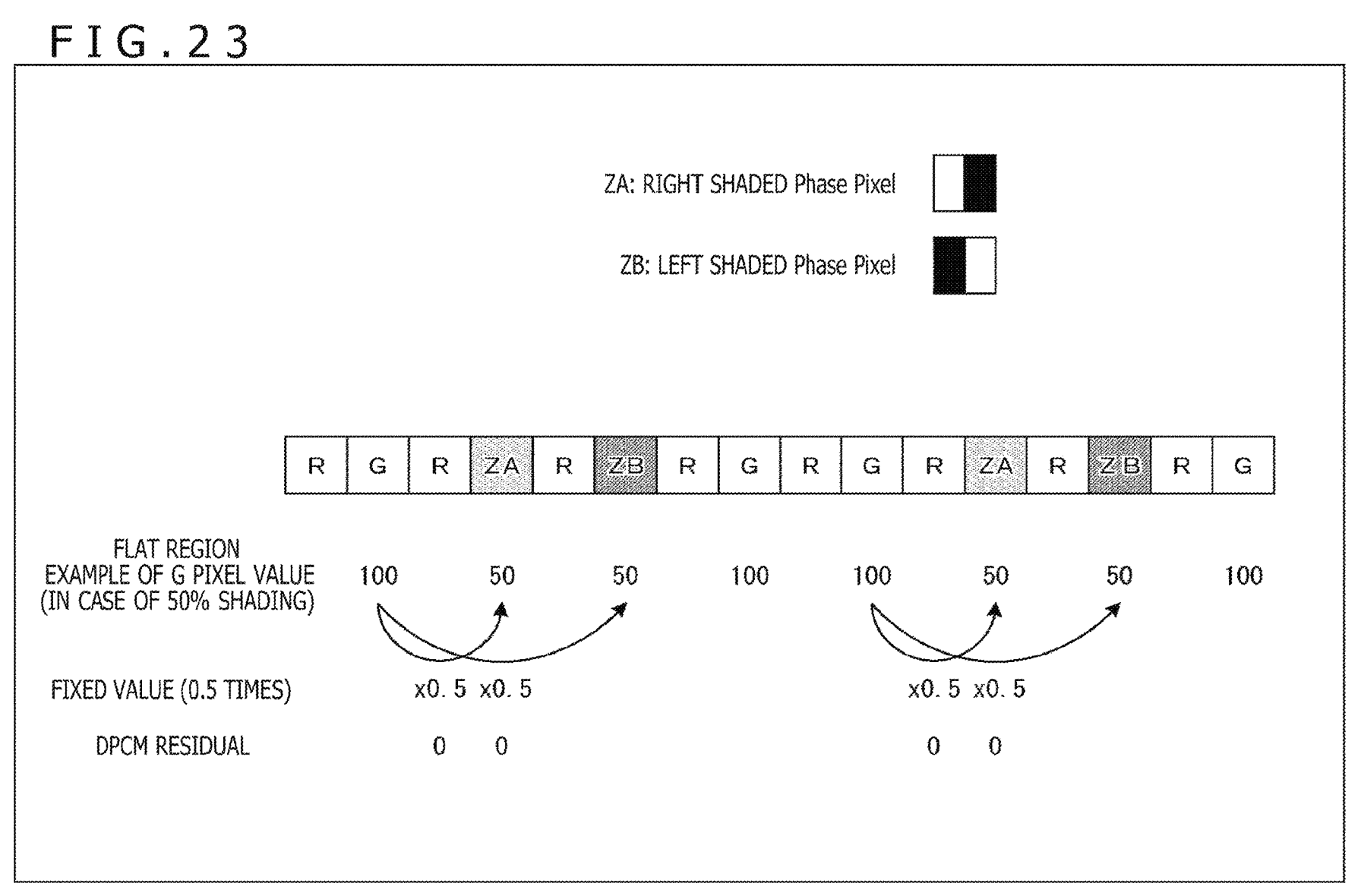

The method 3-2 is described with reference to FIG. 23. In the method 3-2, in a case where the processing target pixel is an image plane phase difference detection pixel and the adjacent same color pixel is a normal pixel, the pixel value of the normal pixel that is the adjacent same color pixel is corrected to be set as a prediction pixel. FIG. 23 is a view corresponding to FIG. 1 and depicts an example of a case in which the right shaded pixel ZA and the left shaded pixel ZB are distinguished from each other.

For example, in a case where the fourth right shaded pixel ZA (image plane phase difference detection pixel) from the left is set as a processing target pixel, the immediately preceding same color pixel (adjacent same color pixel) is the second G pixel from the left. In short, the adjacent same color pixel is a normal pixel. Accordingly, the pixel value of this G pixel is corrected to be set as a prediction pixel, and prediction is performed. In a case of the example of FIG. 23, since the shading rate of the right shaded pixel ZA is 50%, the pixel value of the G pixel is multiplied by 0.5 times. By doing such a manner, the difference in pixel value between a normal pixel and an image plane phase difference detection pixel can be suppressed. Accordingly, increase of the prediction error in encoding and decoding can be suppressed.

In this case, since, not image data to be encoded, but a prediction value is corrected, also at the time of decoding, a fixed value same as that in a case of encoding is used for multiplication (not divided).

It is to be noted that, in a case where the sixth left shaded pixel ZB (image plane phase difference detection pixel) from the left is set as a processing target pixel, the immediately preceding same color pixel (adjacent same color pixel) is the fourth right shaded pixel ZA from the left. Although this right shaded pixel ZA is an image plane phase difference detection pixel, since it does not coincide in type with the processing target pixel (left shaded pixel ZB), it is not set as a prediction pixel. The second nearest same color pixel is the second G pixel from the left. In short, the second nearest same color pixel is a normal pixel. Accordingly, the pixel value of this G pixel is corrected to be set as a prediction pixel, and prediction is performed. In a case of the example of FIG. 23, since the shading rate of the left shaded pixel ZB is 50%, the pixel value of the G pixel is multiplied by 0.5 times. By doing such a manner, the difference in pixel value between a normal pixel and an image plane phase difference detection pixel can be suppressed. Accordingly, increase of the prediction error in encoding and decoding can be suppressed.

<Image Processing Apparatus>

The image processing apparatus 100 that implements such a method 3-2 as described above has a configuration similar to that of the example (method 2-2) of FIG. 15. Further, the encoding section 101 has a configuration similar to that of the example of FIG. 16. Furthermore, the decoding section 104 has a configuration similar to that of the example of FIG. 17.

In a case where the adjacent same color pixel is a normal pixel, the encoding section 101 sets a value obtained by correcting the pixel value of a normal pixel that is an adjacent same color pixel as a prediction value of the processing target pixel and encodes the image data using the prediction value. For example, the encoding section 101 sets a value obtained by multiplying the pixel value of the normal pixel that is the adjacent same color pixel by a fixed value as a prediction value. This fixed value may be a value according to the shading rate of the image plane phase difference detection pixel that is the processing target pixel. By doing such a manner, the encoding section 101 can suppress increase of the prediction error.

In a case where the adjacent same color pixel is a normal pixel, the decoding section 104 sets a value obtained by correcting the pixel value of a normal pixel that is an adjacent same color pixel as a prediction value of the processing target pixel and decodes the encoded data, using the prediction value. For example, the decoding section 104 sets a value obtained by multiplying the pixel value of the normal pixel that is the adjacent same color pixel by a fixed value as a prediction value. This fixed value may be a value according to the shading rate of the image plane phase difference detection pixel that is the processing target pixel. By doing such a manner, the decoding section 104 can suppress increase of the prediction error.

<Flow of Prediction Pixel Generation Process>

The encoding process executed by the image processing apparatus 100 in this case is executed in a flow similar to that in a case described above with reference to the flow chart of FIG. 11.

Figure 24:
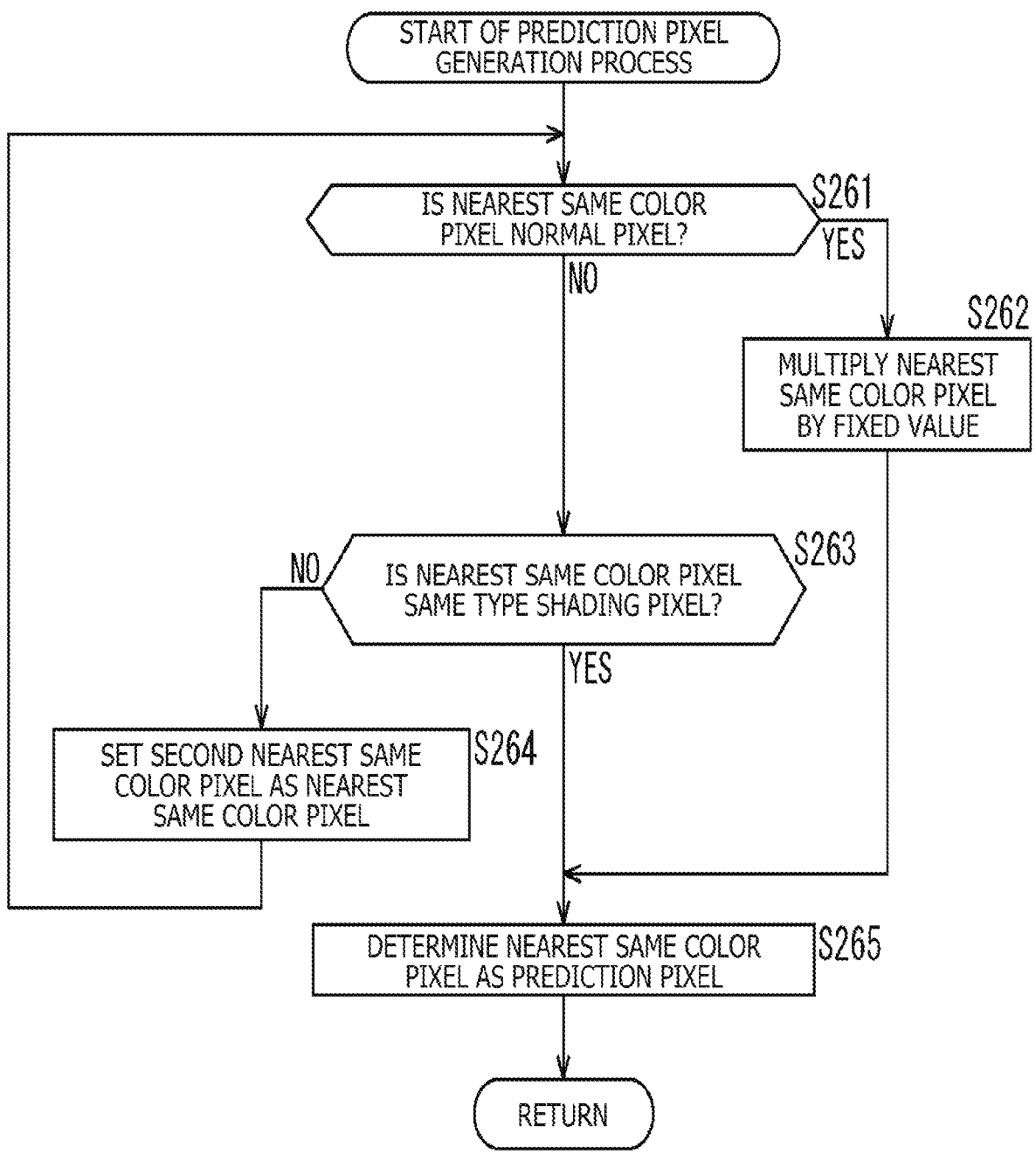
FIG. 24 is a flow chart illustrating an example of a flow of a prediction pixel generation process.

An example of a flow of the prediction pixel generation process executed in step S142 of FIG. 11 is described with reference to a flow chart of FIG. 24.

After the prediction pixel generation process is started, the DPCM processing section 152 decides in step S261 whether or not the nearest same color pixel is a normal pixel. In a case where it is decided that the nearest same color pixel is a normal pixel, the processing advances to step S262.

In step S262, the DPCM processing section 152 multiplies the pixel value of the normal pixel that is the nearest same color pixel by a fixed value (value according to the shading rate of the image plane phase difference detection pixel that is the processing target pixel). After the process in step S262 ends, the processing advances to step S265.

Conversely, in a case where it is decided in step S261 that the nearest same color pixel is not a normal pixel, the processing advances to step S263.

In step S263, the DPCM processing section 152 decides whether or not the nearest same color normal pixel is a shaded pixel (image plane phase difference detection pixel) of the same type as that of the processing target pixel. In a case where it is decided that the nearest same color pixel is a shaded pixel that is different in type from the processing target pixel, the processing advances to step S264.

In step S264, the DPCM processing section 152 sets the second nearest same color pixel as the nearest same color pixel. After the process in step S264 ends, the processing returns to step S261. In particular, the processes in step S261, step S263, and step S264 are repeated until it is decided that the nearest same color pixel is a normal pixel or is a shaded pixel of the same type as that of the processing target pixel. Then, in a case where it is decided in step S263 that the nearest same color pixel is a shaded pixel of the same type as that of the processing target pixel, the processing advances to step S265.

In step S265, the DPCM processing section 152 sets the nearest same color pixel as a prediction pixel. After the prediction pixel is set in such a manner as described above, the prediction pixel generation process ends, and the processing returns to FIG. 11.

By performing the processes in such a manner as described above, the difference in pixel value between a normal pixel and an image plane phase difference detection pixel can be suppressed, and therefore, increase of the prediction error can be suppressed as in the example of FIG. 23.

Further, the decoding process executed by the image processing apparatus 100 in this case is executed in a flow similar to that in a case described above with reference to the flow chart of FIG. 13. The prediction pixel generation process executed in (step S184 (FIG. 13) of) the decoding process in this case is executed in a flow similar to that in a case described above with reference to the flow chart of FIG. 24. Accordingly, the decoding section 104 can correctly decode encoded data generated by the encoding section 101. Accordingly, increase of the prediction error can be suppressed.

<Where Right Shaded Pixel ZA and Left Shaded Pixel ZB are not Distinguished from Each Other>

Figure 25:
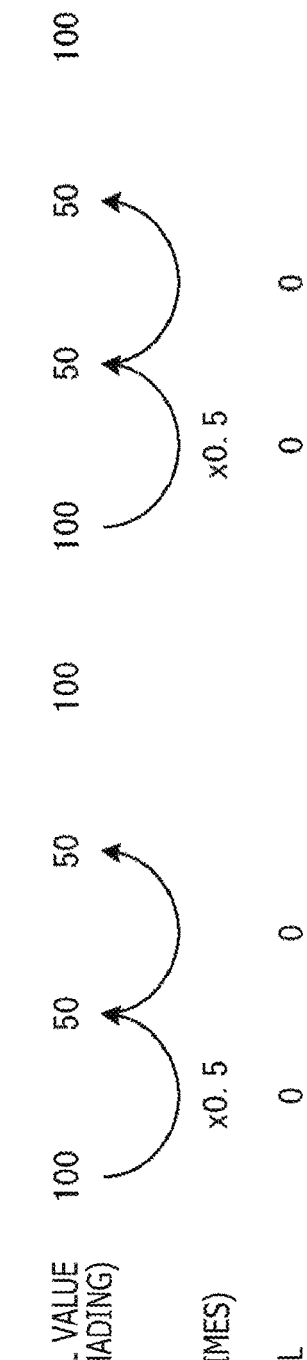
FIG. 25 is a view illustrating the method 3-2.

Now, a case in which the right shaded pixel ZA and the left shaded pixel ZB of the method 3-2 are not distinguished from each other is described with reference to FIG. 25. In the method 3-2, in a case where the processing target pixel is an image plane phase difference detection pixel and the adjacent same color pixel is a normal pixel, the pixel value of the normal pixel that is the adjacent same color pixel is corrected to be set as a prediction pixel. FIG. 25 is a view corresponding to FIG. 1 and depicts an example in which the right shaded pixel ZA and the left shaded pixel ZB are not distinguished from each other.

For example, in a case where the fourth right shaded pixel ZA (image plane phase difference detection pixel) from the left in FIG. 25 is set as a processing target pixel, the adjacent same color pixel is the second G pixel (normal pixel) from the left. Accordingly, the pixel value of this G pixel is corrected to be set as a prediction image, and prediction is performed. In a case of the example of FIG. 25, since the shading rate of the right shaded pixel ZA is 50%, the pixel value of the G pixel is multiplied by 0.5. By doing such a manner, the difference in pixel value between a normal image and an image plane phase difference detection pixel can be suppressed. Accordingly, increase of the prediction error in encoding and decoding can be suppressed.

In this case, since, not image data to be encoded, but a prediction value is corrected, also upon decoding, a fixed value same as that in a case of encoding is multiplied (not divided).

It is to be noted that, in a case where the sixth left shaded pixel ZB (image plane phase difference detection pixel) from the left is set as a processing target pixel, the immediately preceding same color pixel (adjacent same color pixel) is the fourth right shaded pixel ZA from the left. In this case, since distinction of a type is not performed, this right shaded pixel ZA is set as a prediction pixel, and prediction is performed. In this case, since the prediction pixel is an image plane phase difference detection pixel, correction (multiplication of a fixed value) is not performed. Accordingly, increase of the prediction error can be suppressed similarly.

<Image Processing Apparatus>

The configuration of the image processing apparatus 100 in this case and the processing sections of the same is similar to that in a case where the right shaded pixel ZA and the left shaded pixel ZB are distinguished from each other.

<Flow of Prediction Pixel Generation Process>

The encoding process executed by the image processing apparatus 100 in this case is executed in a flow similar to that in a case described above with reference to the flow chart of FIG. 11.

Figure 26:
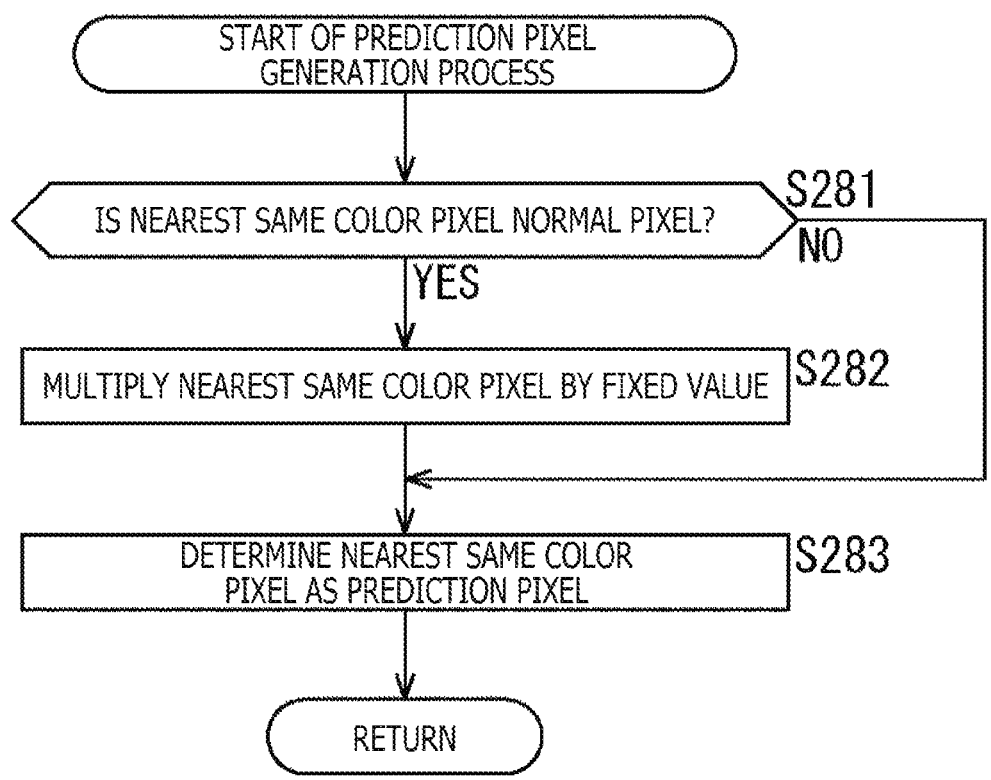
FIG. 26 is a flow chart illustrating an example of a flow of the prediction pixel generation process.

An example of a flow of the prediction pixel generation process executed in step S142 of FIG. 11 is described with reference to a flow chart of FIG. 26.

After the prediction pixel generation process is started, the DPCM processing section 152 decides in step S281 whether or not the nearest same color pixel is a normal pixel. In a case where it is decided that the nearest same color pixel is a normal pixel, the processing advances to step S282.

In step S282, the DPCM processing section 152 multiplies the pixel value of the normal pixel that is the nearest same color pixel by a fixed value (value according to the shading rate of the image plane phase difference detection pixel that is the processing target pixel). After the process in step S282 ends, the processing advances to step S283.

Conversely, in a case where it is decided in step S281 that the nearest same color pixel is not a normal pixel, the processing advances to step S283.

In step S283, the DPCM processing section 152 sets the nearest same color pixel as a prediction pixel. After a prediction pixel is set in such a manner as described above, the prediction pixel generation process ends, and the processing returns to FIG. 11.

By performing the processes in this manner, the difference in pixel value between a normal pixel and an image plane phase difference detection pixel can be suppressed, and therefore, increase of the prediction error can be suppressed as in the example of FIG. 25.

Further, the decoding process executed by the image processing apparatus 100 in this case is executed in a flow similar to that in a case described above with reference to the flow chart of FIG. 13. Further, the prediction pixel generation process executed in (step S184 (FIG. 13) of) the decoding process in this case is executed in a flow similar to that described above with reference to the flow chart of FIG. 26. Accordingly, the decoding section 104 can correctly decode encoded data generated by the encoding section 101. Accordingly, increase of the prediction error can be suppressed.

<5-3: Method 3-3>

Figure 27:
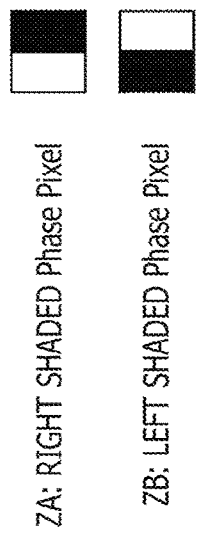
FIG. 27 is a view illustrating a method 3-3.

The method 3-3 is described with reference to FIG. 27. In the method 3-3, in a case where the processing target pixel is an image plane phase difference detection pixel, prediction (DPCM process) is omitted. FIG. 27 is a view corresponding to FIG. 1.

For example, in a case where the fourth right shaded pixel ZA (image plane phase difference detection pixel) from the left in FIG. 27 is set as a processing target pixel, the DPCM process is omitted (skipped). Similarly, also in a case where the sixth left shaded pixel ZB (image plane phase difference detection pixel) from the left is set as a processing target pixel, the DPCM process is omitted (skipped). In this case, the pixel value of the processing target pixel (image plane phase difference detection pixel) is quantized and is subjected to variable length encoding. It is to be noted that, in this case, the quantization value may be same as or different from that of a normal pixel. Further, even quantization may not be performed (quantization may be skipped).

Also, decoding is performed similarly. In short, in a case where the processing target pixel is an image plane phase difference detection pixel, prediction of the same (DPCM process) is omitted.

By doing such a manner, the DPCM process whose prediction error is great can be omitted. Accordingly, increase of the prediction error in encoding and decoding can be suppressed. Further increase of the load of encoding and decoding can be suppressed.

<Image Processing Apparatus>

The image processing apparatus 100 that implements such a method 3-3 as described above has a configuration similar to that of the example (method 2-1) of FIG. 8. Further, the encoding section 101 has a configuration similar to that of the example of FIG. 9. Furthermore, the decoding section 104 has a configuration similar to that of the example of FIG. 10.

The encoding section 101 encodes image data without performing prediction of a processing target pixel to which the adjacent same color pixel is a normal pixel. By doing such a manner, the encoding section 101 can suppress increase of the prediction error.

The decoding section 104 decodes encoded data without performing prediction of a processing target pixel to which the adjacent same color pixel is a normal pixel. By doing such a manner, the encoding section 101 can suppress increase of the prediction error.

<Flow of Prediction Pixel Generation Process>

Figure 28:
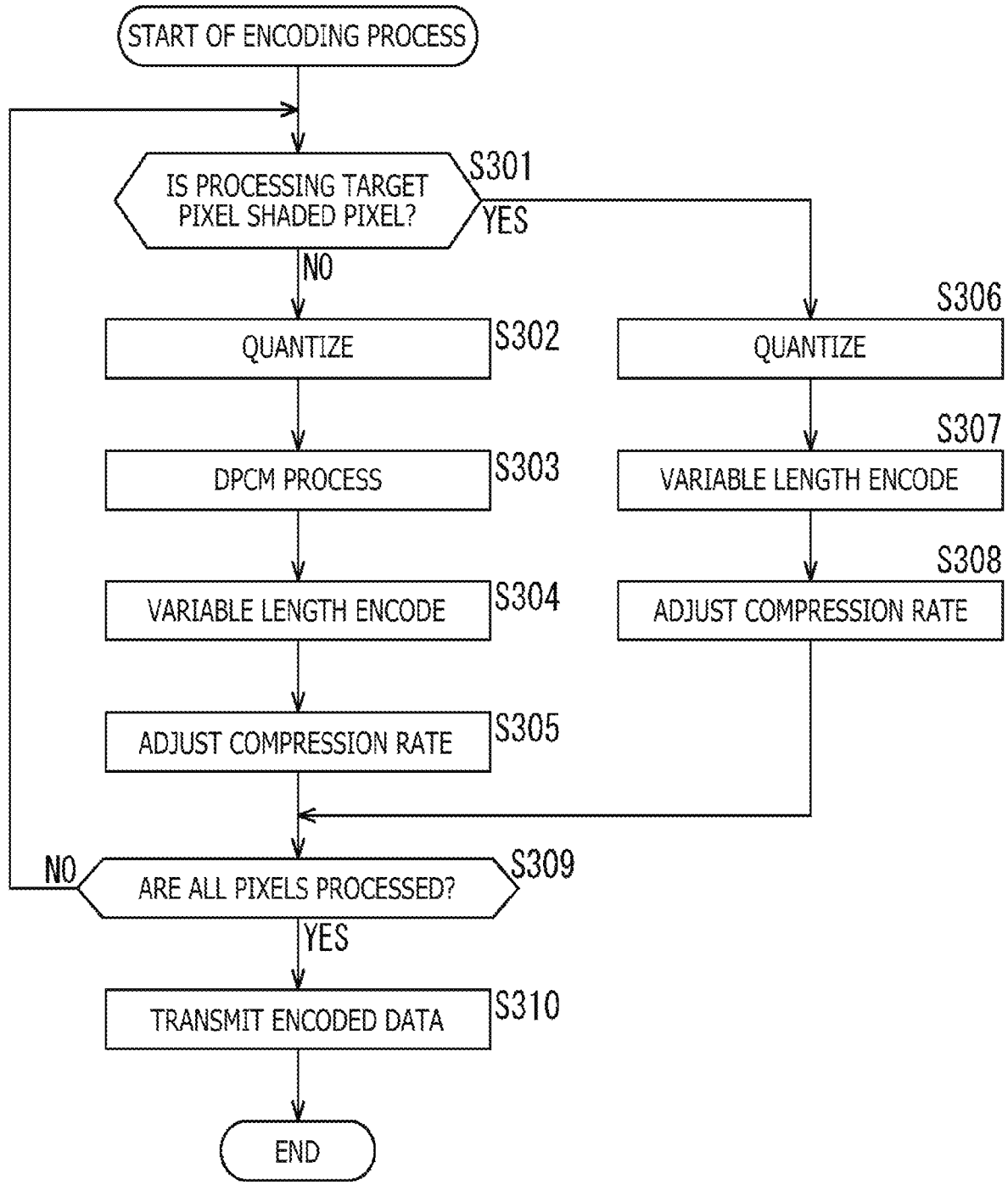
FIG. 28 is a flow chart illustrating an example of a flow of an encoding process.

An example of a flow of the encoding process executed by the image processing apparatus 100 in this case is described with reference to a flow chart of FIG. 28.

After the encoding process is started, the DPCM processing section 152 decides in step S301 whether or not the processing target pixel is a shaded pixel. In a case where it is decided that the processing target pixel is not a shaded pixel, the processing advances to step S302.

In step S302, the quantization section 151 quantizes the image data. In step S303, the DPCM processing section 152 performs the DPCM process on the quantized image data to generate a difference from a prediction value (residual data). In step S304, the variable length encoding section 153 performs variable length encoding on the residual data to generate encoded data. In step S305, the compression rate adjustment section 154 adjusts the compression rate by adding refinement to the encoded data, or the like. After the process in step S305 ends, the processing advances to step S309.

Conversely, in a case where it is decided in step S301 that the processing target pixel is a shaded pixel, the processing advances to step S306. In step S306, the quantization section 151 quantizes the image data. In step S307, the variable length encoding section 153 performs variable length encoding on the quantized image data to generate encoded data. In step S308, the compression rate adjustment section 154 adjusts the compression rate by adding refinement to the encoded data, for example. After the process in step S308 ends, the processing advances to step S309.

In step S309, the DPCM processing section 152 decides whether or not all pixels have been processed. In a case where there exists a non-processed pixel, the processing returns to the step S301 to repeat the processes in the steps beginning with step S301. Then, in a case where it is decided in step S309 that all pixels have been processed, the processing advances to step S310.

In step S310, the transmission section 102 transmits the encoded data generated in such a manner as described above. After the process in step S310 ends, the encoding process ends. By executing the encoding process in this manner, increase of the prediction error can be suppressed.

<Flow of Decoding Process>

Figure 29:
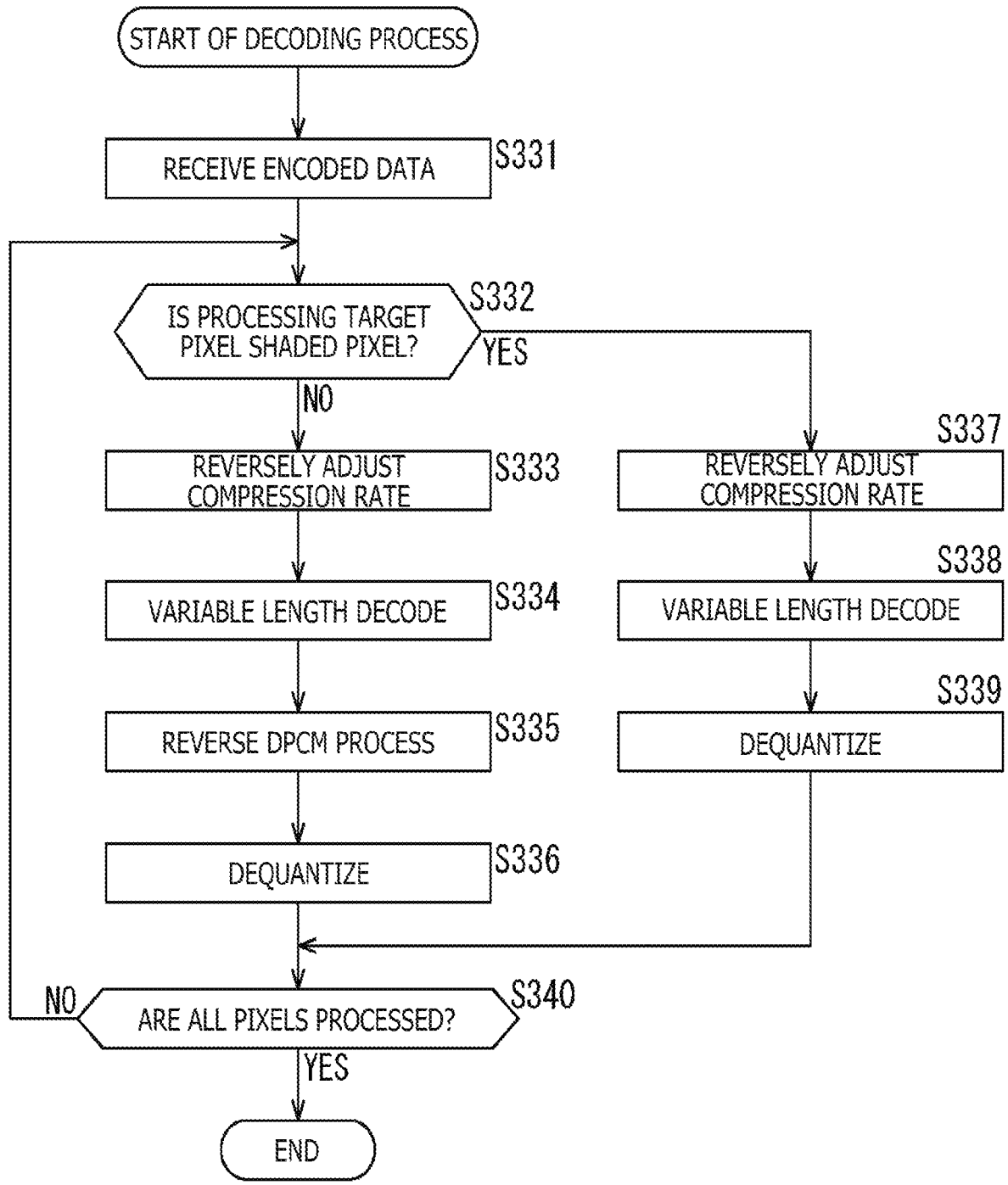
FIG. 29 is a flow chart illustrating an example of a flow of a decoding process.

An example of a flow of the decoding process executed by the image processing apparatus 100 in this case is described with reference to a flow chart of FIG. 29.

After the decoding process is started, the reception section 103 receives, in step S331, encoded data transmitted from the transmission section 102.

In step S332, the DPCM processing section 152 decides whether or not the processing target pixel is a shaded pixel. In a case where it is decided that the processing target pixel is not a shaded pixel, the processing advances to step S333.

In step S333, the compression rate reverse adjustment section 161 reversely adjusts the compression rate of the encoded data. In step S334, the variable length decoding section 162 decodes the encoded data whose compression rate is reversely adjusted to generate image data (residual data). In step S335, the reverse DPCM processing section 163 performs the reverse DPCM process to derive a prediction value and adds the prediction value to the residual data to generate image data after quantization. In step S336, the dequantization section 164 dequantizes the quantized image data to generate image data including pixel values of the same bit length as that of the image data before the quantization. After the process in step S336 ends, the processing advances to step S340.

Conversely, in a case where it is decided in step S332 that the processing target pixel is a shaded pixel, the processing advances to step S337. In step S337, the compression rate reverse adjustment section 161 reversely adjusts the compression rate of the encoded data. In step S338, the variable length decoding section 162 decodes the encoded data whose compression rate is reversely adjusted to generate image data after quantization. In step S339, the dequantization section 164 dequantizes the quantized image data to generate bit data including pixel values of the same bit length as that of the image data before quantized. After the process in step S339 ends, the processing advances to step S340.

In step S340, the DPCM processing section 152 decides whether or not all pixels have been processed. In a case where it is decided that there exists a non-processed pixel, the processing returns to step S332 to repeat the processes in the steps beginning with step S332. Then, in a case where it is decided in step S340 that all pixels have been processed, the decoding process is ended. By executing the decoding process in this manner, increase of the prediction error can be suppressed.

It is to be noted that the method 3 described above may be applied in combination with the method 2 described above.

6. Fourth Embodiment

<Method 4>

In the present embodiment, the "method 4" to "method 6" in a case where the processing target pixel is an image plane phase difference detection pixel are described. In a case of this method 4, error information indicative of an error due to encoding or decoding is utilized for image plane phase difference detection.

<Image Processing Apparatus>

Figure 30:
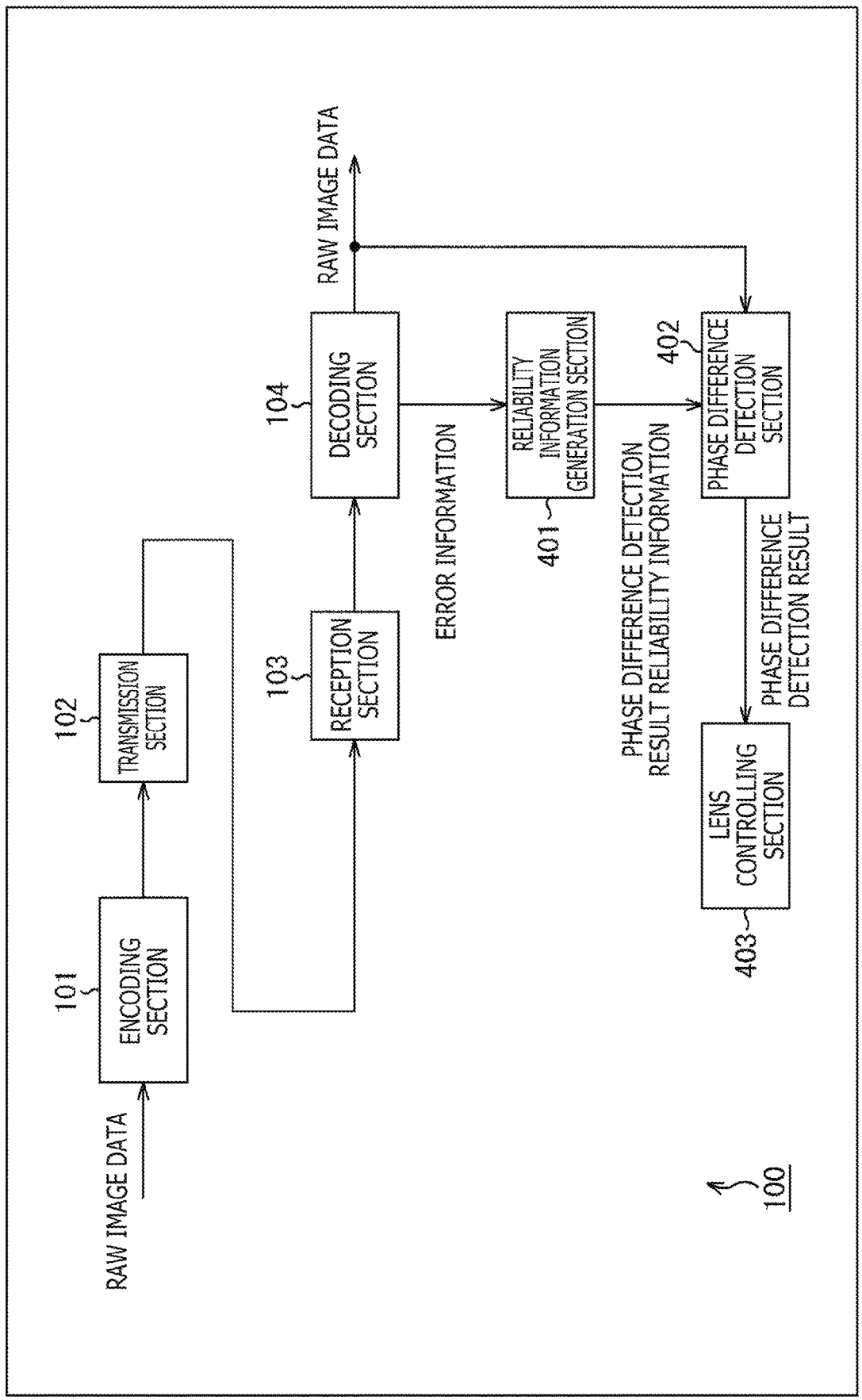
FIG. 30 is a block diagram depicting an example of main components of an image processing apparatus that implements a method 4.

An example of principal components of the image processing apparatus 100 in this case is depicted in FIG. 30. As depicted in FIG. 30, the image processing apparatus 100 in this case includes a reliability information generation section 401, a phase difference detection section 402, and a lens controlling section 403 in addition to the components from the encoding section 101 to the decoding section 104. In this case, the decoding section 104 further derives error information.

Figure 31:
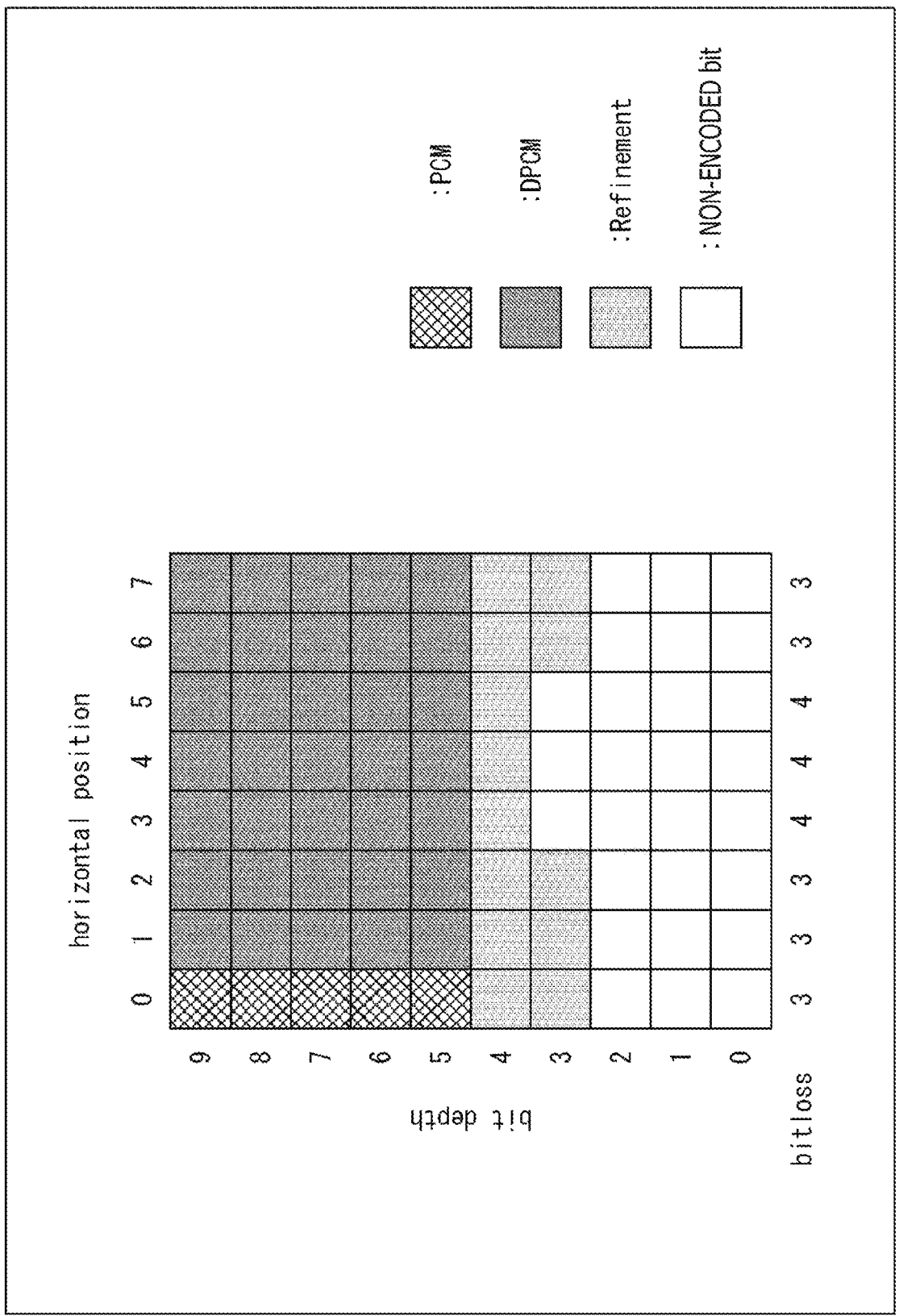
FIG. 31 is a view illustrating error information.

The error information is information indicative of a bit amount that is lost (loss) as a result of encoding and decoding. For example, in FIG. 31, each square indicates a bit, and the position in the vertical direction in the figure indicates a bit depth while the position in the horizontal direction in the figure indicates a pixel position (horizontal position). In other words, a line (column) of squares in the vertical direction in the figure indicates a bit column of a pixel value.

Encoding and decoding are processed in order beginning with a left column (pixel value). As described above, in encoding, for example, each pixel value is quantized, and part of a bit column of the pixel value is subjected to the DPCM process. In a case of the example of FIG. 31, the upper five bits are subjected to a PCM process. However, the leftmost pixel values that are processed first are subjected to the DPCM process and outputted as they are (differential values from 0 are outputted as prediction errors). The prediction errors derived by the DPCM process (or the PCM process) are subjected to variable length encoding. Then, several bits are suitably added as refinement. In a case of the example of FIG. 31, to each pixel value, one bit or two bits are added as refinement. In short, the encoded data includes information regarding the bits described above. In decoding, reverse processes to those are performed to restore values of these bits.

In other words, the remaining bits (in a case of the example of FIG. 31, yet-to-be encoded bits indicated by white squares) are not transferred and are lost (loss). In a case of the example of FIG. 31, three bits or four bits are lost for each pixel (bitloss).

The error information is information indicative of this bit amount and is generated, for example, for each encoded block. In short, the decoding section 104 tallies the lost bit amount (bitloss) for each encoded block (for example, calculates a sum value, an average value, or the like) and supplies this as error information to the reliability information generation section 401. It is to be noted that the data unit for generating error information is determined as desired. For example, the error information may be information of a pixel unit.

The reliability information generation section 401 acquires the error information from the decoding section 104. As the value of the error information increases, the lost amount of bits by encoding or decoding increases. As the bit loss amount increases, the information loss amount in captured image data increases, and the possibility that the accuracy in phase difference detection may decrease becomes high. In short, as the value of the error information increases, the reliability of a result of the phase difference detection decreases.

Therefore, the reliability information generation section 401 decides the reliability degree of the phase difference detection result on the basis of the acquired error information, generates phase difference detection result reliability information indicative of a degree of reliability of the phase difference detection result, and supplies it to the phase difference detection section 402. It is to be noted that the reliability information generation section 401 derives the phase difference detection result reliability information for each region that is a processing unit of phase difference detection (also referred to as a phase difference detection region).

The phase difference detection section 402 detects a phase difference using captured image data generated by the decoding section 104 and supplies a phase difference detection result to the lens controlling section 403. At this time, the phase difference detection section 402 acquires the phase difference detection result reliability information supplied from the reliability information generation section 401 and performs detection of the phase difference, also taking the phase difference detection result reliability information into consideration. In short, the phase difference detection section 402 performs detection of the phase difference on the basis of the captured image data and the phase difference detection result reliability information (namely, error information).

For example, the phase difference detection section 402 excludes a phase difference detection region having a reliability degree which has been decided sufficiently low in the phase difference detection result reliability information from a target of phase difference detection. In other words, the phase difference detection section 402 performs detection of a phase difference, using pixel values of a phase difference detection region having a reliability degree which has been decided sufficiently high in the phase difference detection result reliability information.

By doing such a manner, the phase difference detection section 402 can suppress reduction of the accuracy in phase difference detection (typically can detect the phase difference with higher accuracy).

<Reliability Information Generation Section>

Figure 32:
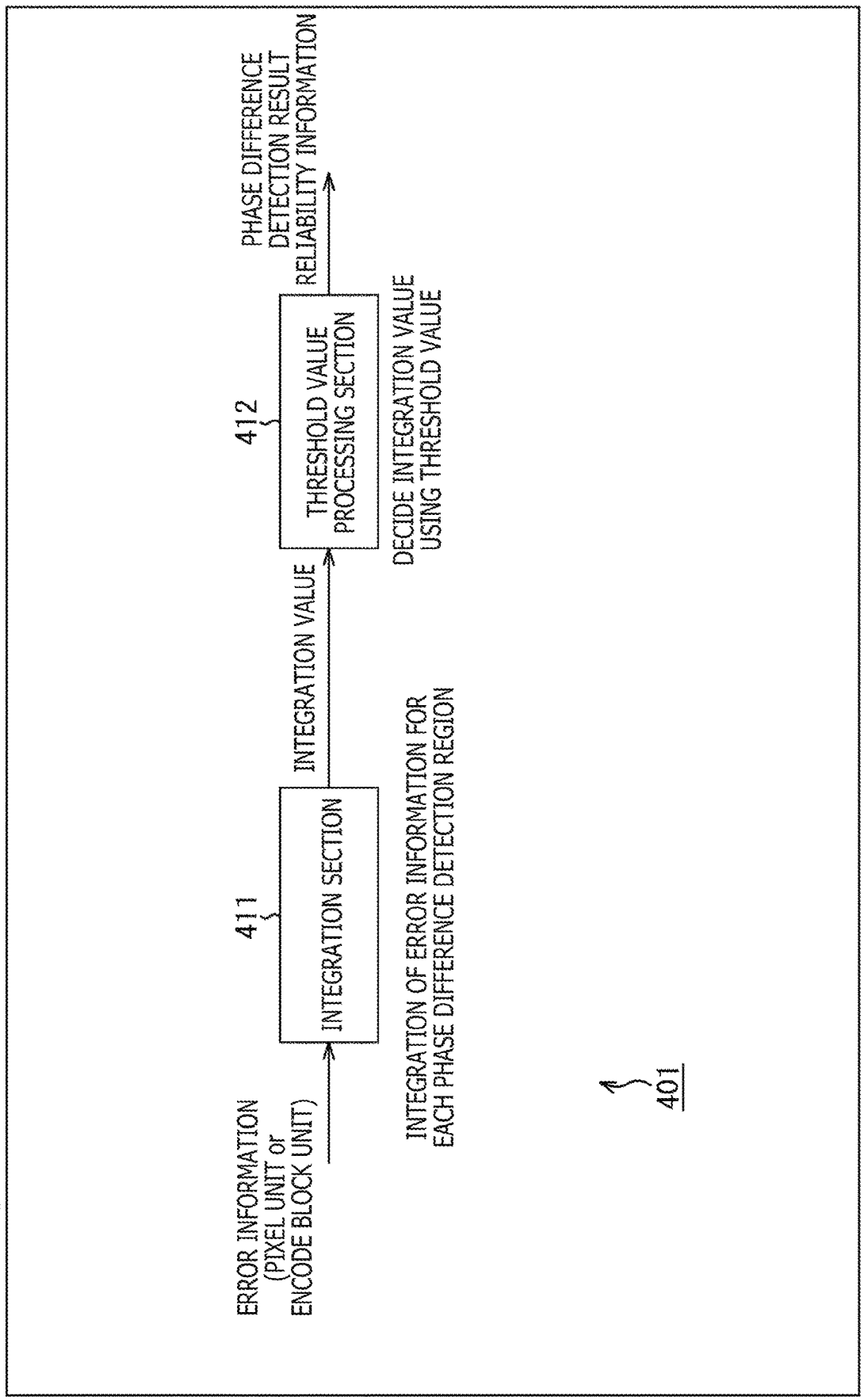
FIG. 32 is a block diagram depicting an example of principal components of a reliability information generation section.

FIG. 32 is a block diagram depicting an example of principal components of the reliability information generation section 401 of FIG. 30. As depicted in FIG. 32, the reliability information generation section 401 includes an integration section 411 and a threshold value processing section 412.

The integration section 411 acquires error information supplied from the decoding section 104 and integrates the error information to derive an integration value for each phase difference detection region. The integration section 411 supplies the derived integration value for each phase difference detection region to the threshold value processing section 412.

The threshold value processing section 412 acquires the integration values supplied from the integration section 411 and compares each integration value with a threshold value to decide a reliability degree of the phase difference detection result in the phase difference detection region corresponding to the integration value. For example, the threshold value processing section 412 decides, for each phase difference detection region, whether or not the phase difference detection result is sufficiently reliable. The threshold value processing section 412 generates phase difference detection result reliability information indicative of a result of the detection and supplies it to the phase difference detection section 402

Figure 33:
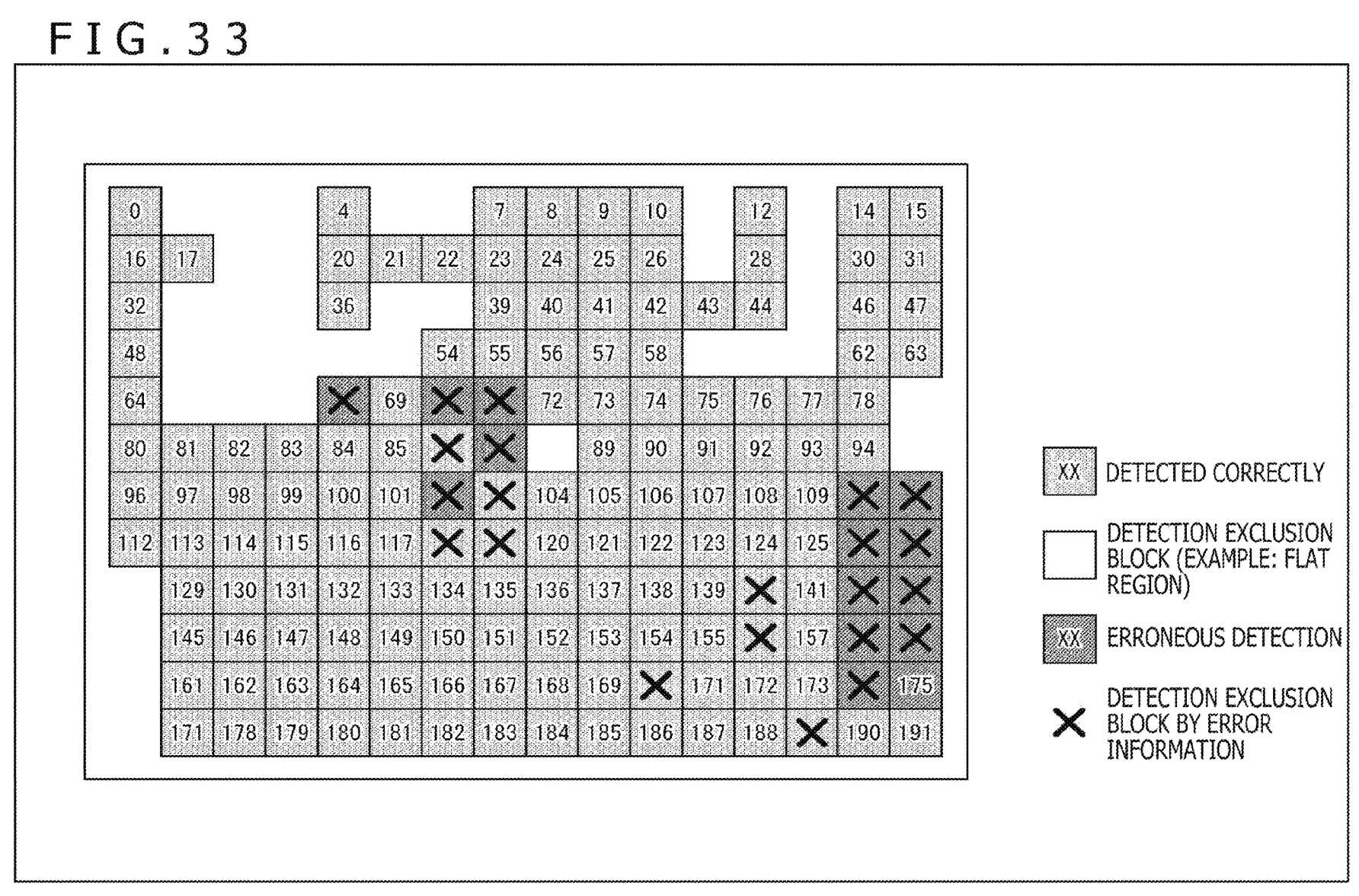

The phase difference detection section 402 specifies, on the basis of such phase difference detection result reliability information as described above, a phase difference detection region in which the reliability degree of the phase difference detection result is sufficiently low, for example, as depicted in FIG. 33 and excludes the region from the target of phase difference detection. In a case of the example of FIG. 33, each square to which a numeral or the like is added indicates a phase difference detection region. Among the squares, squares denoted by "X" indicates phase difference detection regions in which it is decided that the reliability degree of the phase difference detection result is sufficiently low on the basis of the phase difference detection result reliability information (namely, the error information). The phase difference detection section 402 excludes such regions from the target and performs phase difference detection (in short, performs phase difference detection in the other regions).

It is to be noted that, in FIG. 33, a white portion indicates a region in which the pixel value is flat (flat region), and since phase difference detection is difficult also in such a region, the region is excluded from the target of phase difference detection. Further, a square indicated in dark gray in the figure indicates a phase difference detection region in which the phase difference detection result has been decided to be inaccurate. In short, the phase difference detection section 402 can exclude such a region in which the phase difference detection result is inaccurate from the target by excluding a region in which the reliability degree of the phase difference detection result is low from the target as described above. Accordingly, the phase difference detection section 402 can perform phase difference detection more accurate than that in a case where only a flat region is excluded.

<Flow of Decoding Process>

Now, an example of a flow of the decoding process executed by the image processing apparatus 100 in this case is described with reference to a flow chart of FIG. 34.

Figure 13:
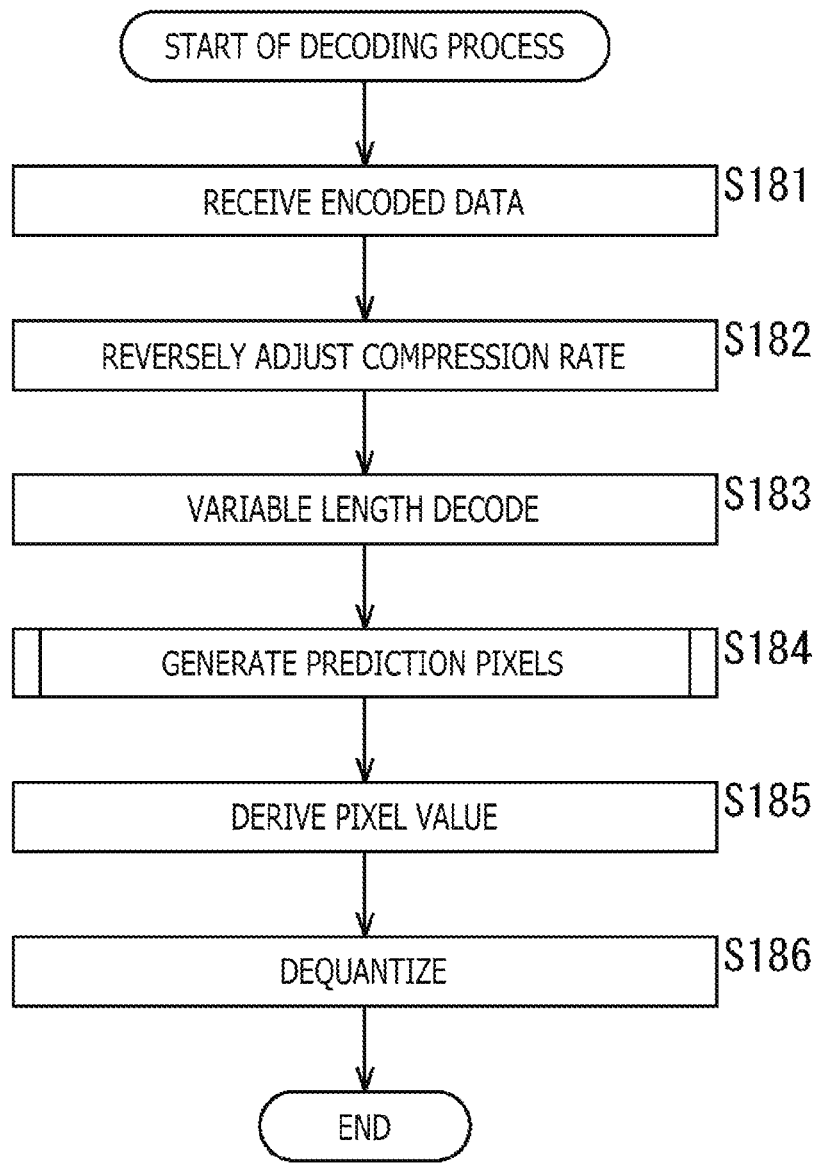
FIG. 13 is a flow chart illustrating an example of a flow of a decoding process.

After the decoding process is started, processes in step S361 to step S363 are executed similarly to the processes in step S181 to step S183 (FIG. 13).

In step S364, the reverse DPCM processing section 163 performs a reverse DPCM process to generate image data after quantization. The process in step S365 is executed similarly to the process in step S186 (FIG. 13).

In step S366, the decoding section 104 generates error information on the basis of a decoding result.

In step S367, the reliability information generation section 401 executes a reliability information generation process and generates phase difference detection result reliability information on the basis of error information.

In step S368, the phase difference detection section 402 detects, on the basis of the phase difference detection result reliability information, a phase difference from image data (for example, RAW image data) generated by the process in step S365.

In step S369, the lens controlling section 403 updates a focus position on the basis of a phase difference detection result obtained in step S368.

After the process in step S369 ends, the decoding process ends.

<Flow of Reliability Information Generation Process>

Figure 34:
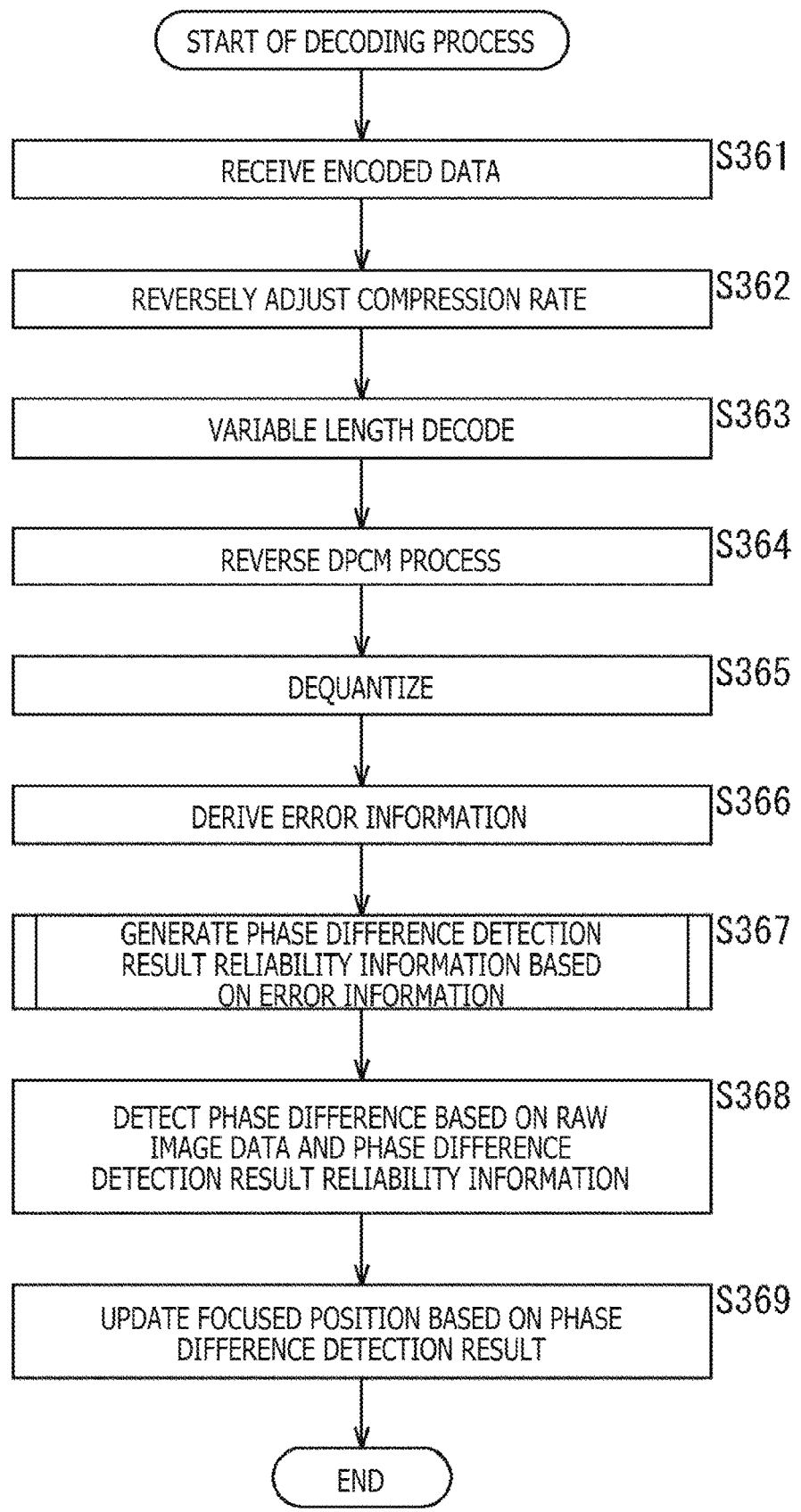
FIG. 34 is a flow chart illustrating an example of a flow of a decoding process.
Figure 35:
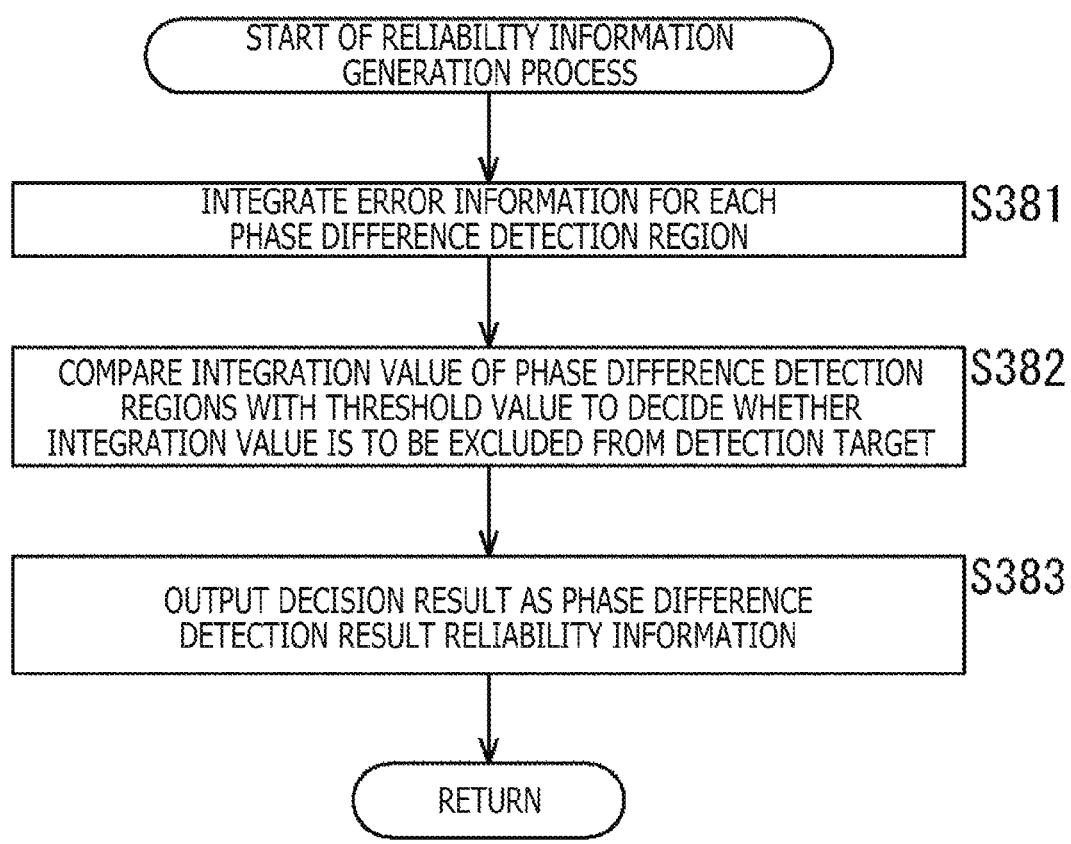
FIG. 35 is a flow chart illustrating an example of a flow of a reliability information generation process.

Now, an example of a flow of the reliability information generation process executed in step S367 of FIG. 34 is described with reference to a flow chart of FIG. 35.

After the reliability information generation process is started, in step S381, the integration section 411 integrates error information derived in step S366 for each phase difference detection region to derive an integration value for each phase difference detection region.

In step S382, the threshold value processing section 412 compares the integrated value of the error information of each phase difference detection region derived in step S381 with a threshold value to decide whether or not the region is to be excluded from the target of phase difference detection.

In step S383, the threshold value processing section 412 generates phase difference detection result reliability information indicative of a decision result obtained in step S382 and outputs it (in short, supplies it to the phase difference detection section 402). After the process in step S383 ends, the reliability information generation process ends, and the processing returns to FIG. 34.

By executing the processes in such a manner as described above, the image processing apparatus 100 can suppress decrease of the accuracy in phase difference detection (typically, can detect a phase difference with higher accuracy).

<Others>

It is to be noted that the method 4 described above may be applied in combination with the method 1 described above (method 5). Further, the method 4 described above may be applied in combination with the method 2 or the method 3 described above. Furthermore, the method 4 described above may be applied in combination with the method 2 and the method 3 described above (method 6).

7. Fifth Embodiment

<Application Example: Imaging Apparatus>

Figure 36:
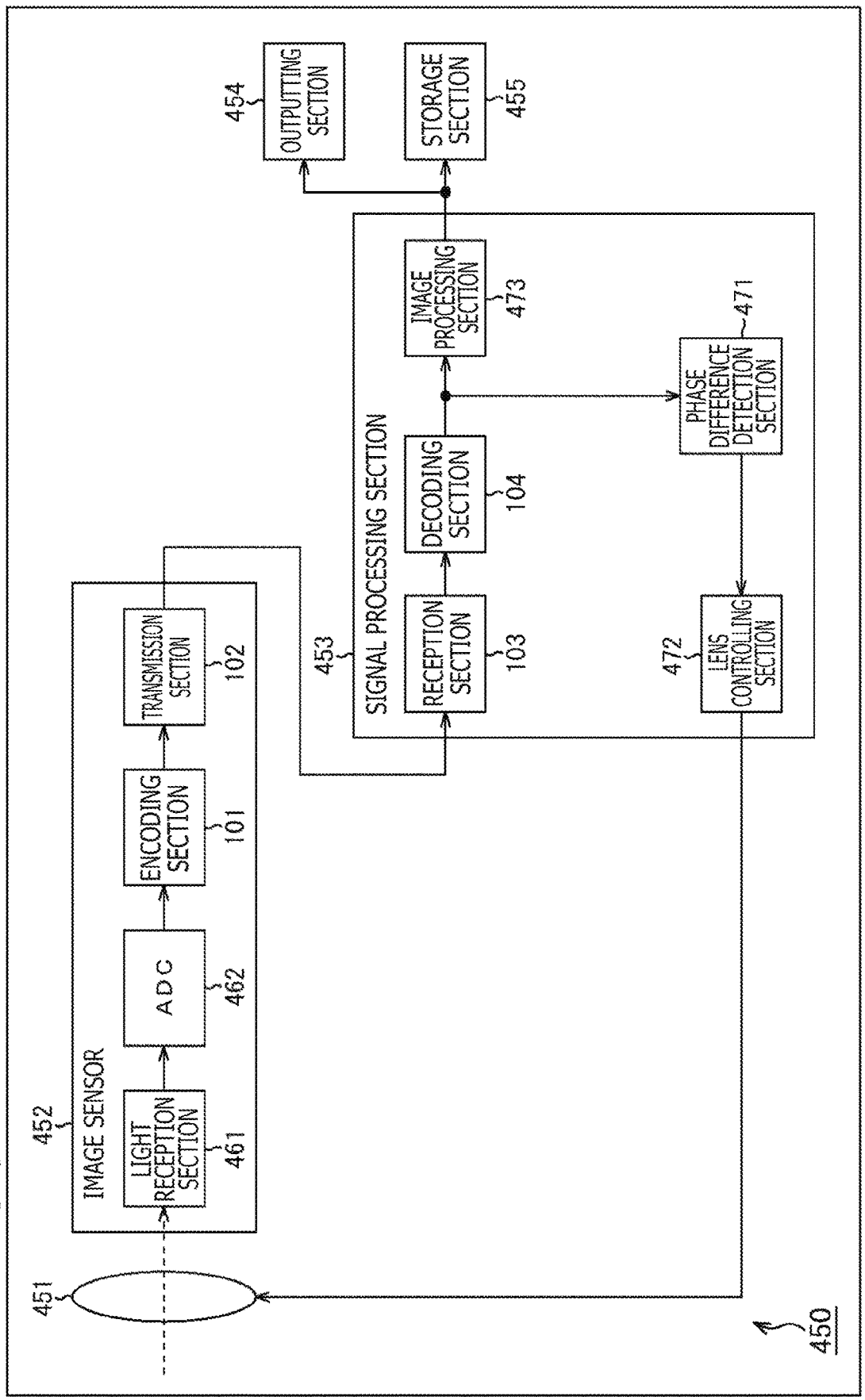
FIG. 36 is a block diagram depicting an example of principal components of an imaging apparatus.

The present technology can be applied to a freely selected device. For example, the present technology can be applied also to an imaging apparatus. FIG. 36 is a block diagram depicting an example of principal components of an imaging apparatus to which the present technology is applied. The imaging apparatus 450 depicted in FIG. 36 captures an image of an imaging target, generates captured image data, and records or outputs the captured image data.

As depicted in FIG. 36, the imaging apparatus 450 includes a lens 451, an image sensor 452, a signal processing section 453, an outputting section 454, and a storage section 455.

The lens 451 is an optical system that is controlled by a lens controlling section 472 of the signal processing section 453 described later for adjusting a focal distance. The lens 451 may include an aperture and so forth. Light from an imaging target enters the image sensor 452 through the lens 451.

The image sensor 452 receives light entering from the imaging target through the lens 451 to generate captured image data. Further, the image sensor 452 encodes the captured image data and supplies it as encoded data to the signal processing section 453.

The signal processing section 453 decodes the encoded data supplied from the image sensor 452 to generate captured image data. The signal processing section 453 supplies the captured image data to the outputting section 454 and the storage section 455. Further, the signal processing section 453 detects a phase difference from the captured image data and controls the lens 451 on the basis of a phase difference detection result to perform control of the focal distance.

The outputting section 454 acquires the captured image data supplied from the signal processing section 453 and outputs it to the outside of the imaging apparatus 450. For example, the outputting section 454 includes a display section (monitor) and displays a captured image on the display section. Further, for example, the outputting section 454 includes an external output terminal and supplies the captured image data to another apparatus through the external output terminal.

The storage section 455 acquires and stores the captured image data supplied from the signal processing section 453. For example, the storage section 455 includes a storage medium such as a hard disk or a flash memory and stores the captured image data supplied from the signal processing section 453 into the storage medium.

It is to be noted that the storage section 455 can suitably read out the captured image data stored in the storage medium and supply the captured image data to another processing section such as the outputting section 454. Further, the storage medium may be a medium (removable medium) loadable on and unloadable from the imaging apparatus 450 (storage section 455).

<Image Sensor>

The image sensor 452 includes a light reception section 461, an ADC (Analog Digital Converter) 462, an encoding section 101, and a transmission section 102.

The light reception section 461 has a pixel region (pixel array), and receives light from an imaging target and photoelectrically converts the received light to detect as an electric signal, at each pixel thereof. In particular, the light reception section 461 generates an electric signal of a captured image. The light reception section 461 supplies the electric signal of the captured image to the ADC 462. It is to be noted that the pixel region (pixel array) of the light reception section 461 includes image plane phase difference detection pixels that are partly shaded. In other words, an electric signal of the captured image generated by the light reception section 461 includes an electric signal of pixel values of the image plane phase difference detection pixels.

The ADC 462 A/D converts an electric signal (pixel value) supplied from the light reception section 461 to generate captured image data of digital data. In particular, the captured image data also includes information of pixel values of the image plane phase difference detection pixels. The ADC 462 supplies the generated captured image data to the encoding section 101.

The encoding section 101 acquires the captured image data supplied from the ADC 462. The encoding section 101 encodes the captured image data similarly as in a case of the image processing apparatus 100 described above to generate encoded data. In particular, the encoding section 101 encodes the captured image data by a method according to the type of the pixel. The encoding section 101 supplies the generated encoded data to the transmission section 102.

The transmission section 102 acquires the encoded data supplied from the encoding section 101 and supplies it to the (reception section 103 of the) signal processing section 453.

<Signal Processing Section>

The signal processing section 453 includes a reception section 103, a decoding section 104, a phase difference detection section 471, a lens controlling section 472, and an image processing section 473.

The reception section 103 receives encoded data transmitted from the transmission section 102 of the image sensor 452. The reception section 103 supplies the received encode data to the decoding section 104.

The decoding section 104 acquires the encoded data supplied from the reception section 103. The decoding section 104 decodes the encoded data similarly as in a case of the image processing apparatus 100 described above to generate captured image data. In particular, the decoding section 104 decodes the encoded data of the captured image data by a method according to the type of the pixel. The decoding section 104 supplies the generated captured image data to the phase difference detection section 471 and the image processing section 473.

The phase difference detection section 471 acquires the captured image data supplied from the decoding section 104. The phase difference detection section 471 performs detection of a phase difference for focusing (on the imaging target) using the acquired captured image data (decoding result). The captured image data includes pixel values of the image plane phase difference detection pixels as described above, and the phase difference detection section 471 uses the pixel values of the image plane phase difference detection pixels to detect a phase difference. Further, the phase difference detection section 471 supplies a derived phase difference detection result to the lens controlling section 472.

The lens controlling section 472 acquires the phase difference detection result supplied from the phase difference detection section 471. The lens controlling section 472 generates a control signal for controlling the lens 451 so as to be focused on the imaging target on the basis of the phase difference detection result and supplies the control signal to the lens 451. In other words, the lens controlling section 472 controls the lens 451 in such a way as to be focused on the imaging target.

The image processing section 473 acquires the captured image data supplied from the decoding section 104. The image processing section 473 performs an image process for the captured image data. The contents of the image process are optional. The image processing section 473 supplies the captured image data after the image process to at least any one of the outputting section 454 or the storage section 455. As a matter of course, it is also possible to allow the image processing section 473 to skip the image process. In this case, the image processing section 473 supplies the acquired captured image data to at least any one of the outputting section 454 or the storage section 455.

As described above, the captured image data is encoded and transferred between the image sensor 452 and the signal processing section 453 of the imaging apparatus 450. Then, the encoding section 101 encodes the captured image data by a method according to the type of the pixel. Similarly, the decoding section 104 decodes the encoded data of the captured image data by a method according to the type of the pixel.

Accordingly, the imaging apparatus 450 can suppress increase of the prediction error in encoding and decoding. Consequently, in a case of variable length encoding, decrease of the encoding efficiency can be suppressed. In contrast, in a case of fixed length encoding, degradation of the picture quality of a decoded image can be suppressed.

<Flow of Imaging Process>

Figure 37:
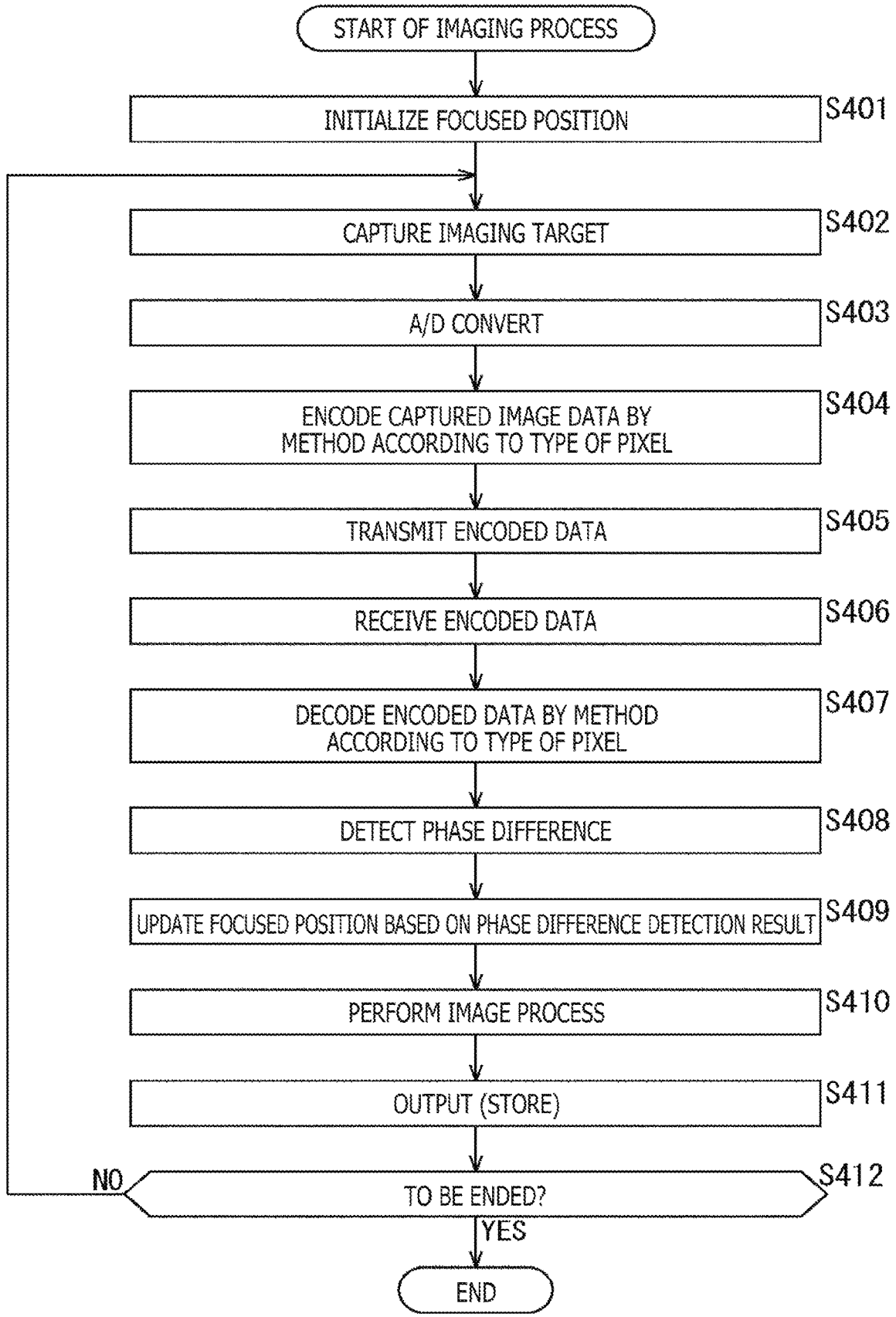
FIG. 37 is a flow chart illustrating an example of a flow of an imaging process.

An example of a flow of the imaging process executed by the imaging apparatus 450 to capture an image of an imaging target is described with reference to a flow chart of FIG. 37.

After the imaging process is started, the lens 451 initializes the focus position in step S401.

In step S402, the light reception section 461 captures an image of an imaging target to photoelectrically convert light from the imaging target to obtain pixel values in the form of an electric signal. In step S403, the ADC 462 A/D converts the pixel values to generate captured image data of digital data. As described above, the captured image data includes pixel values of image plane phase difference detection pixels.

In step S404, the encoding section 101 encodes the captured image data by a method according to the type of the pixel to generate encoded data similarly as in a cases described above in the first to fourth embodiments.

In step S405, the transmission section 102 transmits the encoded data generated in step S404. In step S406, the reception section 103 receives the encoded data.

In step S407, the decoding section 104 decodes the encoded data by a method according to the type of the pixel similarly as in a case described above in the first to fourth embodiments to generate captured image data.

In step S408, the phase difference detection section 471 detects a phase difference using the captured image data generated in step S407. It is to be noted that, at this time, the phase difference detection section 471 may perform detection of the phase difference on the basis of the error information (phase difference detection result reliability information) as described above in the fourth embodiment.

In step S409, the lens controlling section 472 controls the lens 451 on the basis of the phase difference detection result obtained in step S408 to update the focus position. In step S410, the image processing section 473 performs an image process for the captured image data generated in step S407.

In step S411, the outputting section 454 outputs the captured image data after the image process in step S410 to the outside of the imaging apparatus 450. Further, the storage section 455 stores the captured image data into the storage medium.

In step S412, the imaging apparatus 450 decides whether or not the image process is to be ended. In a case where it is decided to continue the imaging and generate a new frame image, the processing returns to step S402 of FIG. 37. In other words, the imaging apparatus 450 executes the processes in steps S402 to S412 for each frame. For example, in a case where it is decided in step S412 that the imaging process is to be ended, for example, on the basis of a user instruction or the like, the imaging process is ended.

By performing the imaging process in such a manner as described above, the imaging apparatus 450 can suppress increase of the prediction error in encoding in step S404 and decoding in step S407.

<Application Example: Imaging Device>

Figure 38:
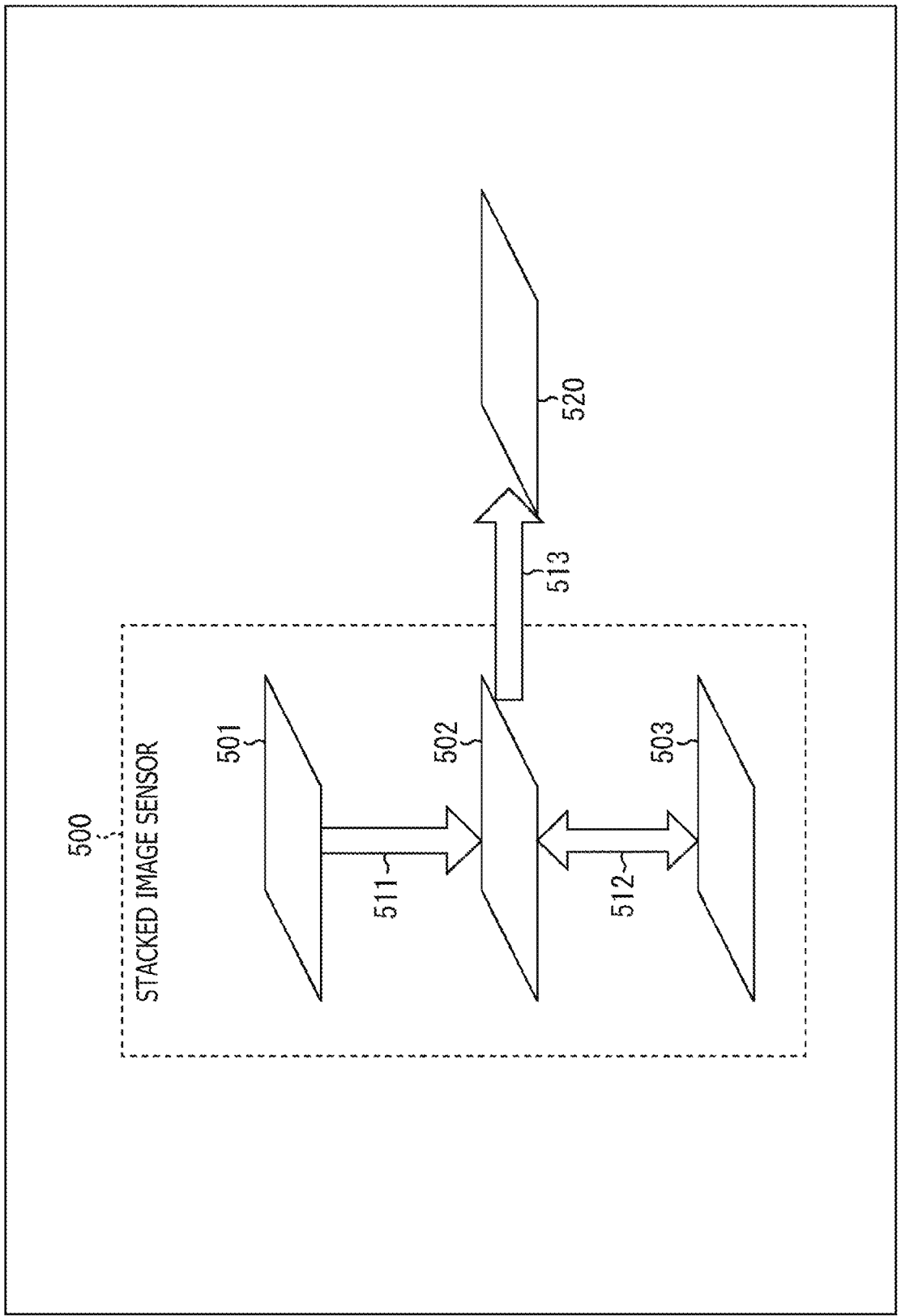
FIG. 38 is a view depicting an example of principal components of a stacked image sensor.

Further, the present technology can be applied, for example, also to an imaging device. FIG. 38 is a block diagram depicting an example of principal components of a stacked image sensor that is an imaging device to which the present technology is applied. The stacked image sensor 500 depicted in FIG. 38 is an image sensor (imaging device) that captures an image of an imaging target to obtain digital data (image data) of the captured image and outputs the image data.

As depicted in FIG. 38, the stacked image sensor 500 includes three semiconductor substrates of a semiconductor substrate 501 to a semiconductor substrate 503. These semiconductor substrates are sealed in a state in which they are stacked one on top of another so as to form a module (integrated). More specifically, these semiconductor substrates form a multilayer structure (stacked structure). The semiconductor substrates 501 to 503 individually have electronic circuits formed therein, and the circuits formed in the semiconductor substrates are connected to each other through vias (VIA) or the like. Paths between (the circuits formed on) the semiconductor substrates are each referred to also as a bus. For example, the circuit of the semiconductor substrate 501 and the circuit of the semiconductor substrate 502 can perform transfer of data and so forth through a bus 511. Further, the circuit of the semiconductor substrate 502 and the circuit of the semiconductor substrate 503 can perform transfer of data and so forth through a bus 512.

Further, for the circuit formed on the semiconductor substrate 502, an interface 513 of the stacked image sensor 500 is formed. More specifically, the circuit formed in the semiconductor substrate 502 can perform transfer of data and so forth to and from an external circuit of the stacked image sensor 500 (for example, the circuit formed in a circuit board 520). This interface 513 is an interface that performs communication by a communication system that complies with a predetermined communication standard. This communication standard is optional. For example, the communication standard may be MIPI (Mobil Industry Processor Interface), SLVS-EC (Scalable Low Voltage Signaling Embedded Clock), or some other standard. It is to be noted that the particular configuration of the interface 513 is optional. For example, not only a configuration for performing control of inputting and outputting but also a transfer path such as a bus or a cable may be included in the interface 513.

By forming the multilayer structure of semiconductor substrates inside the module in this manner, the stacked image sensor 500 can implement incorporation of a circuit of a greater scale without increasing the size of the semiconductor substrate. In other words, the stacked image sensor 500 can incorporate a circuit of a greater scale while suppressing increase of the cost.

Figure 39:
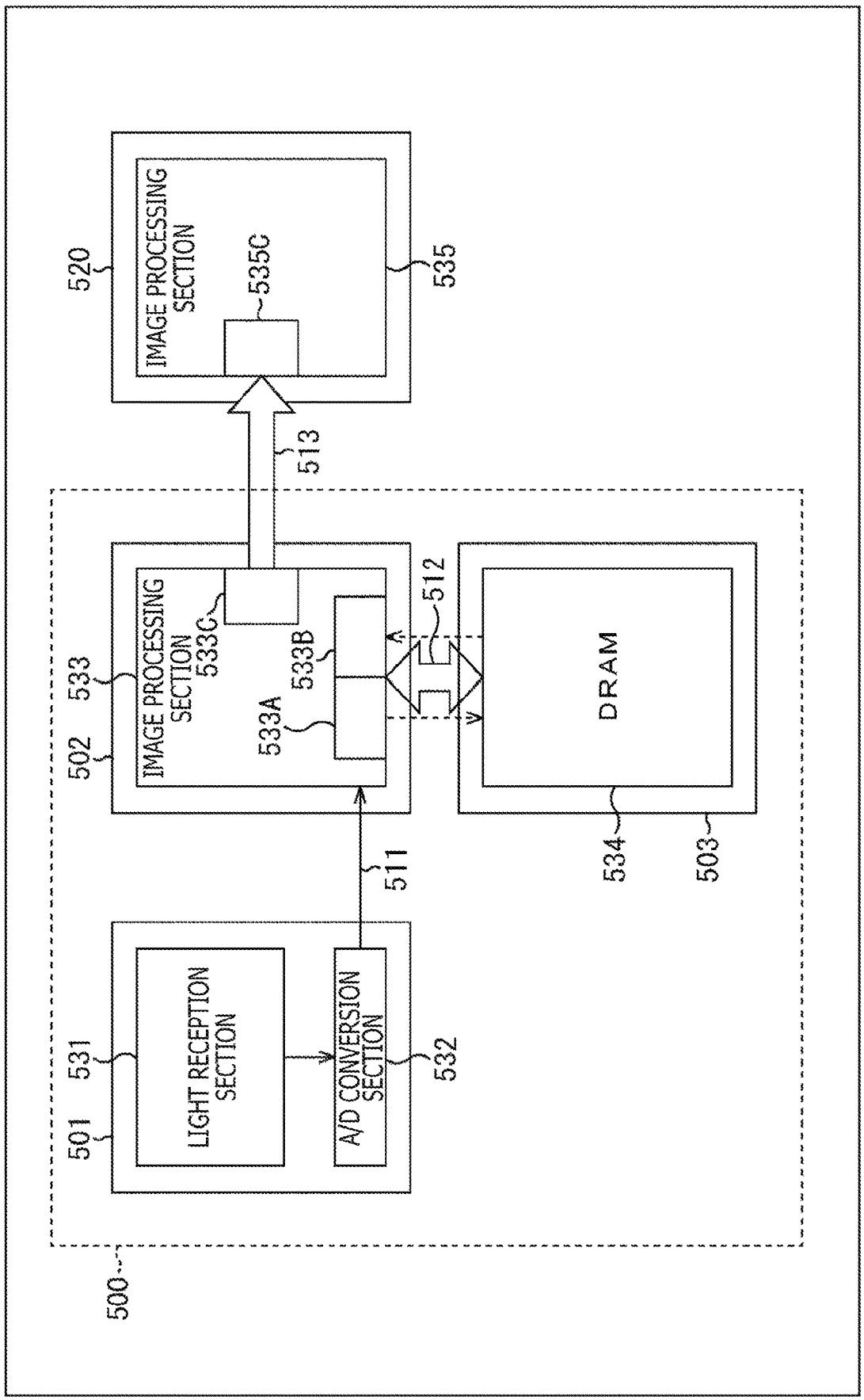
FIG. 39 is a view depicting an example of principal components of the stacked image sensor.

An example of a circuit configuration formed in each semiconductor substrate is depicted in FIG. 39. Although, in FIG. 39, the semiconductor substrate 501 to the semiconductor substrate 503 are arranged side by side on a plane for the convenience of description, actually they are stacked one on top of another as depicted in FIG. 38.

In the semiconductor substrate 501 in the top layer, a light reception section 531, an A/D conversion section 532, and so forth are formed. The light reception section 531 includes a plurality of unit pixels each having a photoelectric conversion device such as, for example, a photodiode, and photoelectrically converts incident light at each unit pixel and outputs a charge corresponding to the incident light as an electric signal (pixel signal) to the A/D conversion section 532.

The A/D conversion section 532 A/D converts the pixel signals supplied from the light reception section 531 to generate pixel data of digital data. The A/D conversion section 532 supplies a set of pixel data of the unit pixels generated in this manner as image data to the semiconductor substrate 502 through the bus 511.

In the semiconductor substrate 502 in the middle layer, an image processing section 533 that is a logic circuit that performs the image process and so forth is formed. When the image processing section 533 acquires image data supplied from the semiconductor substrate 501 through the bus 511, the image processing section 533 performs a predetermined image process for the image data. The contents of the image process are optional. For example, this image process may include defective pixel correction, phase difference detection for autofocusing, pixel addition, digital gain, noise reduction, and so forth. As a matter of course, any other processes may be included in the image process.

In the semiconductor substrate 503 in the bottom layer, a DRAM 534 (Dynamic Random Access Memory) is formed. This DRAM 534 can store data and so forth supplied from the semiconductor substrate 502 (image processing section 533) through the bus 512. Further, the DRAM 534 can read out data and so forth stored therein in response to a request from the semiconductor substrate 502 (image processing section 533) or the like and supply the data and so forth to the semiconductor substrate 502 through the bus 512. In other words, the image processing section 533 can perform an image process, using the DRAM 534, for example, causing image data during an image process to be temporarily retained. For example, by capturing an image at a high frame rate, storing a captured image of each frame into the DRAM 534, and reading out and outputting the captured image at a low frame late, so-called slow motion imaging can be implemented.

In utilization of such a DRAM 534 as described above, the image processing section 533 encodes (compresses) image data, stores the generated encoded data into the DRAM 534, reads out the encoded data from the DRAM 534, and decoded (decompressed) the encoded data, thereby generating image data (decoded image data). For example, the image processing section 533 includes an encoding section 533A and a decoding section 533B. The encoding section 533A encodes the image data and supplies the generated encoded data to the DRAM 534 to be stored. The decoding section 533B decodes encoded data read out from the DRAM 534 to generate image data (decoded image data). By storing image data as encoded data (compressed data) into the DRAM 534 in this manner, the data amount to be stored into the DRAM 534 can be reduced. Accordingly, the utilization efficiency of the storage region of the DRAM 534 and the band of the bus 512 can be improved. Accordingly, increase of the capacity of the DRAM 534 and the bandwidth of the bus 512 can be suppressed, and increase of the manufacturing cost can be suppressed.

As the encoding section 533A, the encoding section 101 described above may be applied. Further, as the decoding section 533B, the decoding section 104 described above may be applied. By doing such a manner, in writing of data into the DRAM 534 and reading out of data from the DRAM 534, the advantageous effects described above in the first to the fourth embodiments can be achieved.

Further, such a configuration as described above with reference to FIG. 30 may be formed by providing the components from the reliability information generation section 401 to the lens controlling section 403 in the image processing section 533. By doing such a manner, the advantageous effects described above in the fourth embodiment and so forth can be achieved on the basis of encoding and decoding in transfer of data to and from the DRAM 534.

Further, an image processing section 535 that is a logic circuit for performing an image process and so forth is formed in the circuit board 520. When the image processing section 535 acquires image data supplied from the semiconductor substrate 502 (image processing section 533) of the stacked image sensor 500 through the interface 513, the image processing section 535 performs a predetermined image process for the image data. The contents of this image process are optional.

In particular, the image processing section 533 can supply data and so forth to the image processing section 535 through the interface 513 (can output data and so forth to the outside of the stacked image sensor 500). Upon such outputting, the image processing section 533 encodes (compresses) the image data and outputs the image data as encoded data. For example, the image processing section 533 includes an encoding section 533C, and the image processing section 535 includes a decoding section 535C. The encoding section 533C encodes image data and outputs encoded data of the image data through the interface 513. The decoding section 535C decodes the encoded data supplied through the interface 513 and generates image data (decoded image data). The image processing section 535 performs an image process for the generated decoded image data.

By transmitting encoded data (compressed data) through the interface 513 in this manner, the data amount to be transferred can be reduced. Accordingly, the utilization efficiency of the band of the interface 513 can be improved. In other words, increase of the bandwidth of the interface 513 can be suppressed, and increase of the manufacturing cost can be suppressed.

As the encoding section 533C, the encoding section 101 described above may be applied. Further, as the decoding section 535C, the decoding section 104 described above may be applied. By doing such a manner, in outputting of data to the outside of the stacked image sensor 500, the advantageous effects described above in the first to fourth embodiments and so forth can be achieved.

Further, the components from the reliability information generation section 401 to the lens controlling section 403 may be provided in the image processing section 533 so as to form such a configuration as described above with reference to FIG. 30. By doing such a manner, the advantageous effects described above in the fourth embodiment and so forth can be achieved on the basis of encoding and decoding in data outputting to the outside of the stacked image sensor 500.

8. Appendix

<Computer>

While the series of processes described above can be executed by hardware, it can be executed also by software. In a case where the series of processes is executed by software, a program that constitutes the software is installed into a computer. The computer here includes a computer incorporated in hardware for exclusive use, a personal computer, for example, for universal use that can execute various kinds of functions by installing various kinds of programs into the personal computer, and so forth.

FIG. 40 is a block diagram depicting an example of a hardware configuration of a computer that executes the series of processes described above according to a program.

In the computer 900 depicted in FIG. 40, a CPU (Central Processing Unit) 901, a ROM (Read Only Memory) 902, and a RAM (Random Access Memory) 903 are connected to one another by a bus 904.

An input/output interface 910 is also connected to the bus 904. An inputting section 911, an outputting section 912, a storage section 913, a communication section 914, and a drive 915 are connected to the input/output interface 910.

The inputting section 911 includes, for example, a keyboard, a mouse, a microphone, a touch panel, an input terminal, and so forth. The outputting section 912 includes, for example, a display, a speaker, an output terminal, and so forth. The storage section 913 includes, for example, a hard disk, a RAM disk, a nonvolatile memory, or the like. The communication section 914 includes, for example, a network interface. The drive 915 drives a removable medium 921 such as a magnetic disk, an optical disc, a magneto-optical disk, or a semiconductor memory.

In the computer configured in such a manner as described above, the CPU 901 loads a program stored, for example, in the storage section 913 into the RAM 903 through the input/output interface 910 and the bus 904 and executes the program to perform the series of processes described above. Into the RAM 903, also data and so forth necessary for the CPU 901 to execute various kinds of processes are stored suitably.

The program to be executed by the computer (CPU 901) can be recorded on and applied as a removable medium 921 as, for example, a package medium. In this case, by mounting the removable medium 921 on the drive 915, the program can be installed into the storage section 913 through the input/output interface 910.

Also, it is possible to provide this program through a wired or wireless transfer medium such as a local area network, the Internet, or a digital satellite broadcast. In this case, the program can be received by the communication section 914 and installed into the storage section 913.

Alternatively, it is also possible to install this program in the ROM 902 or the storage section 913 in advance.

<Application Target of Present Technology>

The present technology can be applied to a freely selected image encoding and decoding method. In particular, the specifications of various kinds of processes relating to image encoding and decoding are optional and are not limited to the examples described above unless they are not contradictory to the present technology described above.

Further, although the foregoing description is directed to cases in which the present technology is applied to an imaging apparatus, the present technology can be applied not only to an imaging apparatus but a freely selected apparatus (electronic equipment). For example, the present technology can be applied also to an image processing apparatus and so forth that perform an image process for a captured image obtained by high digital gain imaging performed by another apparatus.

In addition, the present technology can be carried out also as any configuration to be incorporated in a freely selected apparatus or an apparatus configuring a system, for example, a processor as a system LSI (Large Scale Integration) or the like (for example, a video processor), a module that uses a plurality of processors and so forth (for example, a video module), a unit that uses a plurality of modules and so forth (for example, a video unit), a set in which some other functions are added to a unit (for example, a video set) and so forth (namely, a configuration of part of an apparatus).

Furthermore, for example, the present technology can be applied also to a network system including a plurality of apparatuses. For example, the present technology can be applied also to a cloud service that provides a service relating to an image (moving image) to a freely selected terminal such as, for example, a computer, AV (Audio Visual) equipment, a portable information processing terminal, an IoT (Internet of Things) device.

It is to be noted that a system, an apparatus, a processing section, and so forth to which the present technology are applied can be used in any fields, for example, traffics, medical care, crime prevention, agriculture, livestock industry, mining, beauty, factories, home appliances, weather, natural surveillance, and the like. Also, the use of them is optional.

For example, the present technology can be applied to a system and a device used for provision of appreciation content and so forth. Further, for example, the present technology can be applied also to a system and a device used for traffics such as supervision of traffic conditions and automatic operation control. Furthermore, for example, the present technology can be applied also to a system and a device used for security. Further, for example, the present technology can be applied to a system and a device used for automatic control of machines, and so forth. Furthermore, for example, the present technology can be applied also to a system and a device used for agriculture and livestock industry. Further, the present technology can be applied also to a system and a device for supervising, for example, natural states of a volcano, woods, a coast, wildlife, and so forth. Furthermore, for example, the present technology can be applied also to a system and a device used for sports.

<Others>

It is to be noted that the term "flag" in the present specification signifies information for identifying a plurality of states and includes not only information to be used when two states of the true (1) or the false (0) are to be identified, but also information capable of identifying three or more states. Accordingly, the value that can be taken by the "flag" may be, for example, two values of I/O or may be three values or more. In other words, the bit number configuring the "flag" is freely selected and may be 1 bit or a plurality of bits. Further, the identification information (including a flag) is assumed to have not only a form in which the identification information is included in a bit stream, but also a form in which difference information of the identification information from information that becomes a certain reference is included in a bit stream. Therefore, in the present specification, the "flag" and the "identification information" include not only such information as described above, but also difference information from the information serving as the reference information.

Further, various kinds of information (metadata and so forth) relating to encoded data (bit stream) may be transferred or recorded in any form as long as they are associated with the encoded data. Here, the term "associate" signifies that, for example, when one piece of the data is to be processed, the other piece of the data can be used (linked). More specifically, pieces of data associated with each other may be put together as one piece of data or may be individual separate pieces of data. For example, information associated with encoded data (image) may be transferred on a transfer path different from that of the encoded data (image). Further, for example, information associated with encoded data (image) may be recorded on another recording medium separate from that of the encoded data (image) (or in a recording area of the same recording medium). It is to be noted that this "association" may be not of the whole data but of part of such data. For example, an image and information corresponding to the image may be associated with each other in a freely selected unit such as a plurality of frames, one frame, or a portion in a frame.

It is to be noted that, in the present specification, such terms as "synthesize," "multiplex," "add," "integrate," "include," "store," "put in," "interleave," and "insert" signify to combine multiple things into one, for example, combine encoded data and metadata into one piece of data, and signifies one method of the "association" described above.

Further, the embodiment of the present technology is not limited to the embodiments described above and allows various alterations without departing from the subject matter of the present technology.

Further, for example, the present technology can be carried out also as any configuration that configures an apparatus or a system, for example, as a processor such as a system LSI (Large Scale Integration), a module that uses a plurality of processors and so forth, a unit that uses a plurality of modules and so forth, a set in which some other functions are added to a unit and so forth (namely, a configuration of part of an apparatus).

It is to be noted that, in the present specification, the term, "system" is used to signify an aggregation of a plurality of components (devices, modules (parts), and so forth) and it does not matter whether or not all components are accommodated in the same housing. Accordingly, a plurality of apparatuses accommodated in separate housings and connected to each other through a network is a system, and also one apparatus in which a plurality of modules is accommodated in a single housing is a system.

In addition, for example, the configuration described as one apparatus (or one processing section) may be divided so as to configure a plurality of apparatuses (or processing sections). Conversely, the configurations described as a plurality of apparatuses (or processing sections) in the foregoing description may be put together so as to configure a single apparatus (or processing section). Further, a configuration not described above may be added to the configuration of the apparatus (or processing sections) as a matter of course. Furthermore, if a configuration or operation as an entire system is substantially same, some of the components of a certain apparatus (or processing section) may be included in the configuration of another apparatus (or another processing section).

Further, for example, the present technology can take a configuration for cloud computing by which one function is shared and processed cooperatively by a plurality of apparatuses through a network.

Further, for example, the program described above can be executed by a freely selected apparatus. In this case, it is sufficient if the apparatus has necessary functions (functional blocks and so forth) and can obtain necessary information).

Further, for example, each of the steps of the flow charts described above can be executed by a single apparatus or can be shared and executed by a plurality of apparatuses. Further, in a case where a plurality of processes is included in one step, the plurality of processes included in the one step can be executed by one apparatus or may be shared and executed by a plurality of apparatuses. In other words, it is also possible to execute a plurality of processes included in one step as a process of a plurality of steps. Conversely, also it is possible to execute a process described as a plurality of steps collectively as one step.

It is to be noted that, in a program to be executed by a computer, processes of steps that describe the program may be executed in a time series in the order as described in the present specification or may be executed in parallel or executed individually at necessary timings such as, when a call is made. In short, the processes in the steps may be executed in an order different from the order described above as far as no contradiction arises. Further, the processes at the steps that describe this program may be executed in parallel to processes of another program or may be executed in combination with processes of another program.

It is to be noted that a plurality of present technologies described in the present specification can be carried out independently on an individual basis as far as no contradiction arises. As a matter of course, it is also possible to carry out any of a plurality of present technologies in combination. For example, it is also possible to carry out part or whole of the present technology described in any of the embodiments in combination with part or whole of the present technology described in another embodiment. Further, it is also possible to carry out part or whole of any of the present technology together with another technology that is not described above.

It is to be noted that the present technology can take such a configuration as described below.

(1) An image processing apparatus including:
an encoding section configured to encode image data by a method according to a type of pixel.

(2) The image processing apparatus according to (1), in which
the encoding section encodes the image data by a method according to whether a processing target pixel is an image plane phase difference detection pixel or a normal pixel.

(3) The image processing apparatus according to (1), in which
the encoding section
performs simplified correction for a pixel value of an image plane phase difference detection pixel of the image data, and
encodes the image data in which the pixel value of the image plane phase difference detection pixel is simply corrected.

(4) The image processing apparatus according to (3), in which
the encoding section multiplies, as the simplified correction, the pixel value of the image plane phase difference detection pixel by a fixed value.

(5) The image processing apparatus according to (4), in which
the fixed value is a value according to a shading rate of the image plane phase difference detection pixel.

(6) The image processing apparatus according to (1), in which
in a case where a processing target pixel is a normal pixel, the encoding section encodes the image data using a prediction method according to whether an adjacent same color pixel is an image plane phase difference detection pixel.

(7) The image processing apparatus according to (6), in which
the encoding section performs prediction using a normal pixel at a position according to whether the adjacent same color pixel is an image plane phase difference detection pixel as a prediction pixel to derive a prediction value of the processing target pixel and encodes the image data using the prediction value.

(8) The image processing apparatus according to (7), in which in a case where the adjacent same color pixel is an image plane phase difference detection pixel, the encoding section sets the nearest same color normal pixel as the prediction pixel.

(9) The image processing apparatus according to (6), in which in a case where the adjacent same color pixel is an image plane phase difference detection pixel, the encoding section sets a value obtained by correcting a pixel value of the image plane phase difference detection pixel that is the adjacent same color pixel as a prediction value of the processing target pixel and encodes the image data using the prediction value.

(10) The image processing apparatus according to (9), in which the encoding section sets a value obtained by multiplying the pixel value of the image plane phase difference detection pixel that is the adjacent same color pixel by a fixed value as the prediction value.

(11) The image processing apparatus according to (10), in which the fixed value is a value according to a shading rate of the image plane phase difference detection pixel that is the adjacent same color pixel.

(12) The image processing apparatus according to (1), in which in a case where a processing target pixel is an image plane phase difference detection pixel, the encoding section encodes the image data using a prediction method according to whether an adjacent same color pixel is a normal pixel.

(13) The image processing apparatus according to (12), in which the encoding section performs prediction using an image plane phase difference detection pixel at a position according to whether the adjacent same color pixel is a normal pixel as a prediction pixel to derive a prediction value of the processing target pixel and encodes the image data using the prediction value.

(14) The image processing apparatus according to (13), in which in a case where the adjacent same color pixel is a normal pixel, the encoding section sets the nearest same color image plane phase difference detection pixel as the prediction pixel.

(15) The image processing apparatus according to (12), in which in a case where the adjacent same color pixel is a normal pixel, the encoding section sets a value obtained by correcting a pixel value of the normal pixel that is the adjacent same color pixel as a prediction value of the processing target pixel and encodes the image data using the prediction value.

(16) The image processing apparatus according to (15), in which the encoding section sets a value obtained by multiplying the pixel value of the normal pixel that is the adjacent same color pixel by a fixed value as the prediction value.

(17) The image processing apparatus according to (16), in which the fixed value is a value according to a shading rate of the image plane phase difference detection pixel that is the processing target pixel.

(18) The image processing apparatus according to (12), in which the encoding section encodes the image data without performing prediction of a processing target pixel an adjacent same color pixel of which is a normal pixel.

(19) The image processing apparatus according to (1), in which the encoding section includes
a quantization section configured to quantize the image data,
a difference derivation section configured to perform prediction to derive a difference between a pixel value of the image data quantized by the quantization section and a prediction value,
a variable length encoding section configured to perform variable length encoding on the difference derived by the difference derivation section to generate encoded data, and
an adjustment section configured to adjust a code amount of the encoded data generated by the variable length encoding section.

(20) An image processing method including:
encoding image data by a method according to a type of pixel.

(21) An image processing apparatus, including:
a decoding section configured to decode encoded data of image data by a method according to a type of pixel.

(22) The image processing apparatus according to (21), in which the decoding section decodes the encoded data by a method according to whether a processing target pixel is an image plane phase difference detection pixel or a normal pixel.

(23) The image processing apparatus according to (21), in which the decoding section
decodes the encoded data to generate the image data, and
performs simplified correction for a pixel value of the image plane phase difference detection pixel of the generated image data.

(24) The image processing apparatus according to (23), in which the decoding section divides the pixel value of the image plane phase difference detection pixel by a fixed value as the simplified correction.

(25) The image processing apparatus according to (24), in which the fixed value is a value according to a shading rate of the image plane phase difference detection pixel.

(26) The image processing apparatus according to (21), in which in a case where a processing target pixel is a normal pixel, the decoding section decodes the encoded data using a prediction method according to whether an adjacent same color pixel is an image plane phase difference detection pixel.

(27) The image processing apparatus according to (26), in which the decoding section performs prediction using a normal pixel at a position according to whether the adjacent same color pixel is an image plane phase difference detection pixel as a prediction pixel to derive a prediction value of the processing target pixel and decodes the encoded data using the prediction value.

(28) The image processing apparatus according to (27), in which in a case where the adjacent same color pixel is an image plane phase difference detection pixel, the decoding section sets the nearest same color normal image as the prediction pixel.

(29) The image processing apparatus according to (28), in which in a case where the adjacent same color pixel is an image plane phase difference detection pixel, the decoding section sets a value obtained by correcting the pixel value of the image plane phase difference detection pixel that is the adjacent same color pixel as a prediction value of the processing target pixel and decodes the encoded data using the prediction value.

(30) The image processing apparatus according to (29), in which the decoding section sets, as the prediction value, a value obtained by multiplying a pixel value of the image plane phase difference detection pixel that is the adjacent same color pixel by a value according to a shading rate of the image plane phase difference detection pixel that is the adjacent same color pixel.

(31) The image processing apparatus according to (21), in which in a case where a processing target pixel is an image plane phase difference detection pixel, the decoding section decodes the encoded data using a prediction method according to whether an adjacent same color pixel is a normal pixel.

(32) The image processing apparatus according to (31), in which the decoding section performs prediction using an image plane phase difference detection pixel at a position according to whether the adjacent same color pixel is a normal image as a prediction pixel to derive a prediction value of the processing target pixel and decodes the encoded data using the prediction value.

(33) The image processing apparatus according to (32), in which in a case where the adjacent same color pixel is a normal pixel, the decoding section sets the nearest same color image plane phase difference detection pixel as the prediction pixel.

(34) The image processing apparatus according to (31), in which in a case where the adjacent same color pixel is a normal pixel, the decoding section sets a value obtained by correcting a pixel value of the normal pixel that is the adjacent same color pixel as a prediction value of the processing target pixel and decodes the encoded data using the prediction value.

(35) The image processing apparatus according to (34), in which the decoding section sets, as the prediction value, a value obtained by multiplying the pixel value of the normal pixel that is the adjacent same color pixel by a value according to a shading rate of the image plane phase difference detection pixel that is the processing target pixel.

(36) The image processing apparatus according to (31), in which the decoding section decodes the encoded data without performing prediction of the processing target pixel the adjacent same color pixel of which is a normal pixel.

(37) The image processing apparatus according to (21), further including:

a phase difference detection section configured to perform, on the basis of error information indicative of an error by encoding and decoding of the image data, phase difference detection of image data generated by decoding of the encoded data by the decoding section.

(38) The image processing apparatus according to (37), further including:

a reliability information generation section configured to generate reliability information indicative of a reliability degree of a result of the phase difference detection on the basis of the error information, in which the phase difference detection section performs the phase difference detection on the basis of the reliability information generated by the reliability information generation section.

(39) The image processing apparatus according to (31), in which the decoding section includes a reverse adjustment section configured to perform, for the encoded data, reverse adjustment for undoing adjustment of a code amount performed upon encoding, a variable length decoding section configured to perform variable length decoding on the encoded data whose code amount is reversely adjusted by the reverse adjustment section and generate a difference between a pixel value of quantized image data and a prediction value, a generation section configured to perform prediction and add the prediction value to the difference generated by the variable length decoding section to generate the quantized image data, and a dequantization section configured to dequantize the quantized image data generated by the generation section.

(40) An image processing method, including:

decoding encoded data of image data by a method according to a type of pixel.

REFERENCE SIGNS LIST

100 Image processing apparatus, 101 Encoding section, 102 Transmission section, 103 Reception section, 104 Decoding section, 111 Pixel type decision section, 112 Multiplication section, 113 Encoding section, 121 Decoding section, 122 Pixel type decision section, 123 Division section, 151 Quantization section, 152 DPCM processing section, 153 Variable length encoding section, 154 Compression rate adjustment section, 161 Compression rate reverse adjustment section, 162 Variable length decoding section, 163 Reverse DPCM processing section, 164 Dequantization section, 401 Reliability information generation section, 402 Phase difference detection section, 403 Lens controlling section, 411 Integration section, 412 Threshold value processing section, 450 Imaging apparatus, 451 Lens, 452 Image sensor, 453 Signal processing section, 454 Outputting section, 455 Storage section, 461 Light reception section, 462 ADC, 471 Phase difference detection section, 472 Lens controlling section, 473 Image processing section, 500 Stacked image sensor, 501 to 503 Semiconductor substrate, 520 Circuit board, 531 Light reception section, 532 A/D conversion section, 533 Image processing section, 534 DRAM, 535 Image processing section

The invention claimed is:

1. An image processing apparatus, comprising:
an encoder configured to encode, in a case where a processing target pixel in image data is a normal pixel, the image data by a prediction method that is based on whether an adjacent same color pixel adjacent to the processing target pixel in the image data is an image plane phase difference detection pixel.

2. The image processing apparatus according to claim 1, wherein the encoder is further configured to:
correct a pixel value of the image plane phase difference detection pixel of the image data, and
encode the image data in which the pixel value of the image plane phase difference detection pixel is corrected.

3. The image processing apparatus according to claim 1, wherein the encoder is further configured to:
perform, in a case where the adjacent same color pixel is the image plane phase difference detection pixel, prediction using the normal pixel at a specific position as a prediction pixel to derive a prediction value of the processing target pixel, and
encode the image data using the prediction value.

4. The image processing apparatus according to claim 1, wherein the encoder is further configured to:
in a case where the adjacent same color pixel is the image plane phase difference detection pixel, set a value obtained by correction of a pixel value of the image plane phase difference detection pixel as a prediction value of the processing target pixel, and
encode the image data using the prediction value.

5. The image processing apparatus according to claim 1, wherein in a case where the processing target pixel is the image plane phase difference detection pixel, the encoder is further configured to encode the image data using a prediction method that is based on whether the adjacent same color pixel is the normal pixel.

6. The image processing apparatus according to claim 5, wherein the encoder is further configured to:
perform, in a case where the adjacent same color pixel is the normal pixel, prediction using the image plane phase difference detection pixel at a specific position as a prediction pixel to derive a prediction value of the processing target pixel, and
encode the image data using the prediction value.

7. The image processing apparatus according to claim 5, wherein the encoder is further configured to:
in a case where the adjacent same color pixel is the normal pixel, set a value obtained by correction of correcting a pixel value of the normal pixel as a prediction value of the processing target pixel, and
encode the image data using the prediction value.

8. The image processing apparatus according to claim 5, wherein the encoder is further configured to encode the image data without performing prediction of the processing target pixel in a case where the adjacent same color pixel is the normal pixel.

9. An image processing method, comprising:
encoding, in a case where a processing target pixel in image data is a normal pixel, the image data by a method that is based on whether an adjacent same color pixel adjacent to the processing target pixel in the image data is an image plane phase difference detection pixel.

10. An image processing apparatus, comprising:
a decoder configured to decode, in a case where a processing target pixel in image data is a normal pixel, encoded data of the image data by a prediction method that is based on whether an adjacent same color pixel adjacent to the processing target pixel in the image data is an image plane phase difference detection pixel.

11. The image processing apparatus according to claim 10, wherein the decoder is further configured to:
decode the encoded data to generate the image data, and
correct a pixel value of the image plane phase difference detection pixel of the generated image data.

12. The image processing apparatus according to claim 10, wherein the decoder is further configured to:
perform, in a case where the adjacent same color pixel is the image plane phase difference detection pixel, prediction using the normal pixel at a specific position as a prediction pixel to derive a prediction value of the processing target pixel, and
decode the encoded data using the prediction value.

13. The image processing apparatus according to claim 10, wherein the decoder is further configured to:
in a case where the adjacent same color pixel is the image plane phase difference detection pixel, set a value obtained by correction of a pixel value of the image plane phase difference detection pixel as a prediction value of the processing target pixel, and
decode the encoded data using the prediction value.

14. The image processing apparatus according to claim 10, wherein in a case where the processing target pixel is the image plane phase difference detection pixel, the decoder is further configured to decode the encoded data using a prediction method that is based on whether the adjacent same color pixel is the normal pixel.

15. The image processing apparatus according to claim 14, wherein the decoder is further configured to:
perform, in a case where the adjacent same color pixel is the normal pixel, prediction using the image plane phase difference detection pixel at a specific position as a prediction pixel to derive a prediction value of the processing target pixel, and
decode the encoded data using the prediction value.

16. The image processing apparatus according to claim 14, wherein the decoder is further configured to:
in a case where the adjacent same color pixel is the normal pixel, set a value obtained by correction of a pixel value of the normal pixel as a prediction value of the processing target pixel, and
decode the encoded data using the prediction value.

17. The image processing apparatus according to claim 14, wherein the decoder is further configured to decode the encoded data without performing prediction of the processing target pixel in a case where the adjacent same color pixel is the normal pixel.

18. An image processing method, comprising:
decoding, in a case where a processing target pixel in image data is a normal pixel, encoded data of the image data by a prediction method that is based on whether an adjacent same color pixel adjacent to the processing target pixel in the image data is an image plane phase difference detection pixel.

* * * * *